United States Patent
Funabashi et al.

(10) Patent No.: US 9,836,864 B2
(45) Date of Patent: Dec. 5, 2017

(54) IMAGE PROCESSING METHOD, RECORDING MEDIUM AND APPARATUS FOR REPLACING FACE COMPONENTS

(71) Applicant: FUJITSU LIMITED, Kawasaki-shi, Kanagawa (JP)

(72) Inventors: Ryoichi Funabashi, Kawasaki (JP); Ryuta Tanaka, Machida (JP); Atsuko Tada, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 579 days.

(21) Appl. No.: 14/067,379

(22) Filed: Oct. 30, 2013

(65) Prior Publication Data

US 2014/0133779 A1    May 15, 2014

(30) Foreign Application Priority Data

Nov. 15, 2012 (JP) ................................ 2012-251237

(51) Int. Cl.
| | |
|---|---|
| *G06K 9/20* | (2006.01) |
| *G06T 11/60* | (2006.01) |
| *G11B 27/031* | (2006.01) |
| *G11B 27/28* | (2006.01) |

(52) U.S. Cl.
CPC ............ *G06T 11/60* (2013.01); *G11B 27/031* (2013.01); *G11B 27/28* (2013.01)

(58) Field of Classification Search
None
See application file for complete search history.

(56) References Cited

U.S. PATENT DOCUMENTS 7,796,787 B2 * 9/2010 Wang ...................... G06T 11/60
382/115
8,265,410 B1 * 9/2012 Konoplev .......... G06K 9/00228
382/118

(Continued)

FOREIGN PATENT DOCUMENTS

| JP | 11-507797 | 7/1999 |
|---|---|---|
| JP | 2002-56381 | 2/2002 |
| JP | 2006-148425 | 6/2006 |

(Continued)

OTHER PUBLICATIONS

F. Min, N. Sang and Z. Wang, "Automatic Face Replacement in Video Based on 2D Morphable Model," Pattern Recognition (ICPR), 2010 20th International Conference on, Istanbul, 2010, pp. 2250-2253.*

(Continued)

*Primary Examiner* — Andrae S Allison
(74) *Attorney, Agent, or Firm* — Staas & Halsey LLP

(57) ABSTRACT

An image processing method includes: computing difference values between a boundary equivalent to an outer edge of a synthesis target region of an $N^{th}$ frame of a video image, and a boundary equivalent to an outer edge of a synthesis target region of an $N-1^{th}$ frame of the video image; generating a difference image such that whilst pixel values at a boundary of the difference image maintain the difference values, a region inside the boundary of the difference image matches a specific gradient condition; and deriving, an image that is the generated difference image added to the synthesized result image derived for the $N-1^{th}$ frame that is equivalent to a result of synthesizing a synthesis image onto the synthesis target region in the $N-1^{th}$ frame, and substituting the synthesized result image derived for the $N^{th}$ frame for an image of the synthesis target region in the $N^{th}$ frame.

18 Claims, 36 Drawing Sheets

(56) References Cited

U.S. PATENT DOCUMENTS

| | | | | |
|---|---|---|---|---|
| 2003/0223622 | A1* | 12/2003 | Simon | G06K 9/00281 382/118 |
| 2007/0183663 | A1* | 8/2007 | Wang | G06K 9/00234 382/173 |
| 2007/0237421 | A1* | 10/2007 | Luo | G06T 11/60 382/284 |
| 2008/0187224 | A1* | 8/2008 | Wang | G06T 11/60 382/190 |
| 2011/0091113 | A1* | 4/2011 | Ito | G06K 9/00248 382/197 |
| 2011/0158541 | A1* | 6/2011 | Watanabe | G06T 5/003 382/195 |
| 2011/0206282 | A1* | 8/2011 | Aisaka | G06T 11/60 382/195 |
| 2013/0127844 | A1* | 5/2013 | Koeppel | G06T 15/205 345/419 |
| 2013/0314604 | A1* | 11/2013 | Tada | H04N 9/643 348/649 |

FOREIGN PATENT DOCUMENTS

| | | |
|---|---|---|
| JP | 2008-204466 | 9/2008 |
| WO | WO 97/00582 | 1/1997 |

OTHER PUBLICATIONS

Y. Liang, "Image Based Face Replacement in Video", Master's Thesis, CSEI Department, National Taiwan University, 2009.*
H. Li and K. N. Ngan, "Automatic video segmentation and tracking for content-based applications," in IEEE Communications Magazine, vol. 45, No. 1, pp. 27-33, Jan. 2007.*
Patent Abstracts of Japan, Publication No. 2006-148425, Published Jun. 8, 2006.
Abstract of Publication No. 11-507797, Published Jul. 6, 1999.
Patent Abstracts of Japan, Publication No. 2002-056381, Published Feb. 20, 2002.
Patent Abstracts of Japan, Publication No. 2008-204466, Published Sep. 4, 2008.

* cited by examiner

FIG.8

| 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 3 | 2 | 2 | 3 | 3 | 3 | 1 | 2 | 0 | 0 | 0 |
| 0 | 0 | 1 | 1 | 3 | 5 | 0 | 0 | 0 | 0 | 0 | 0 | 2 | 2 | 3 | 0 | 0 |
| 0 | 0 | 1 | 0 | 0 | 0 | 0 | 0 | 0 | 0 | 0 | 0 | 0 | 0 | 1 | 0 |
| 2 | 2 | 3 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 | 0 | 0 |

IMAGE PROCESSING METHOD, RECORDING MEDIUM AND APPARATUS FOR REPLACING FACE COMPONENTS

CROSS-REFERENCE TO RELATED APPLICATION

This application is based upon and claims the benefit of priority of the prior Japanese Patent Application No. 2012-251237, filed on Nov. 15, 2012, the entire contents of which are incorporated herein by reference.

FIELD

The embodiments discussed herein are related to an image processing method, a recording medium and an image processing apparatus.

BACKGROUND

As technology to protect the privacy of a person captured as the subject in an image, image processing is known in which a mosaic is applied to the face region of the person in an image, or the eye region of the person is masked with a rectangular shape, so that the person is rendered unidentifiable. However, images that have had such image processing performed on them are images that can be clearly determined at a glance to have been doctored, and they create an un-natural impression for a viewer of these images.

In order to resolve this issue there has been a proposal for a technology in which a mask image is synthesized at a synthesis target region such as a face region in an image by employing gradient data of a mask image to solve a Poisson equation, with the edge of the synthesis target region (the synthesis boundary with the mask image) employed as a boundary condition. In such technology, an initial value image is applied to the synthesis target region, and then iterative computation is performed until differences of each the pixels from the initial value image converge to values that satisfy the gradient data of the mask image and the boundary condition of the edge, thereby generating a synthesized result image that corresponds to a result of synthesizing the mask image at the synthesis target region.

Note that when the synthesis target region is the face region, an image representing the face of another person or an image representing an average face of plural persons may, for example, be employed as the mask image. Moreover, an image in which the whole area is whited out, or an image in which the whole area is blacked out may, for example, be employed as the initial value image.

RELATED PATENT DOCUMENT

Japanese Laid-Open Patent Publication No. 2008-204466

RELATED NON-PATENT DOCUMENTS

Patrick Perez, Michel Gangnet, Andrew Blake, "Poisson Image Editing", Microsoft Research UK, 2003
P. Viola and M. Jones, "Rapid object detection using a boosted cascade of simple features," in Proc. IEEE Computer Vision and Pattern Recognition, pp. I_511-I_518, 2001

SUMMARY

According to an aspect of the embodiments, an image processing method includes: (a) computing difference values between a boundary equivalent to an outer edge of a synthesis target region corresponding to an $N^{th}$ frame of a video image, and a boundary equivalent to an outer edge of a synthesis target region corresponding to an $N-1^{th}$ frame of the video image; (b) generating a difference image such that whilst pixel values at a boundary of the difference image maintain the computed difference values, a region inside the boundary of the difference image matches a specific gradient condition; and (c) by a processor, deriving, as a synthesized result image for the $N^{th}$ frame, an image that is the generated difference image added to a synthesized result image derived for the $N-1^{th}$ frame that is equivalent to a result of synthesizing a synthesis image at the synthesis target region in the $N-1^{th}$ frame, and substituting the synthesized result image derived for the $N^{th}$ frame for an image of the synthesis target region in the $N^{th}$ frame.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an image illustrating an example of a computation result of a boundary difference;

DESCRIPTION OF EMBODIMENTS

Detailed explanation follows regarding an exemplary embodiment of technology disclosed herein, with reference to the drawings.

First Exemplary Embodiment

Figure 1:
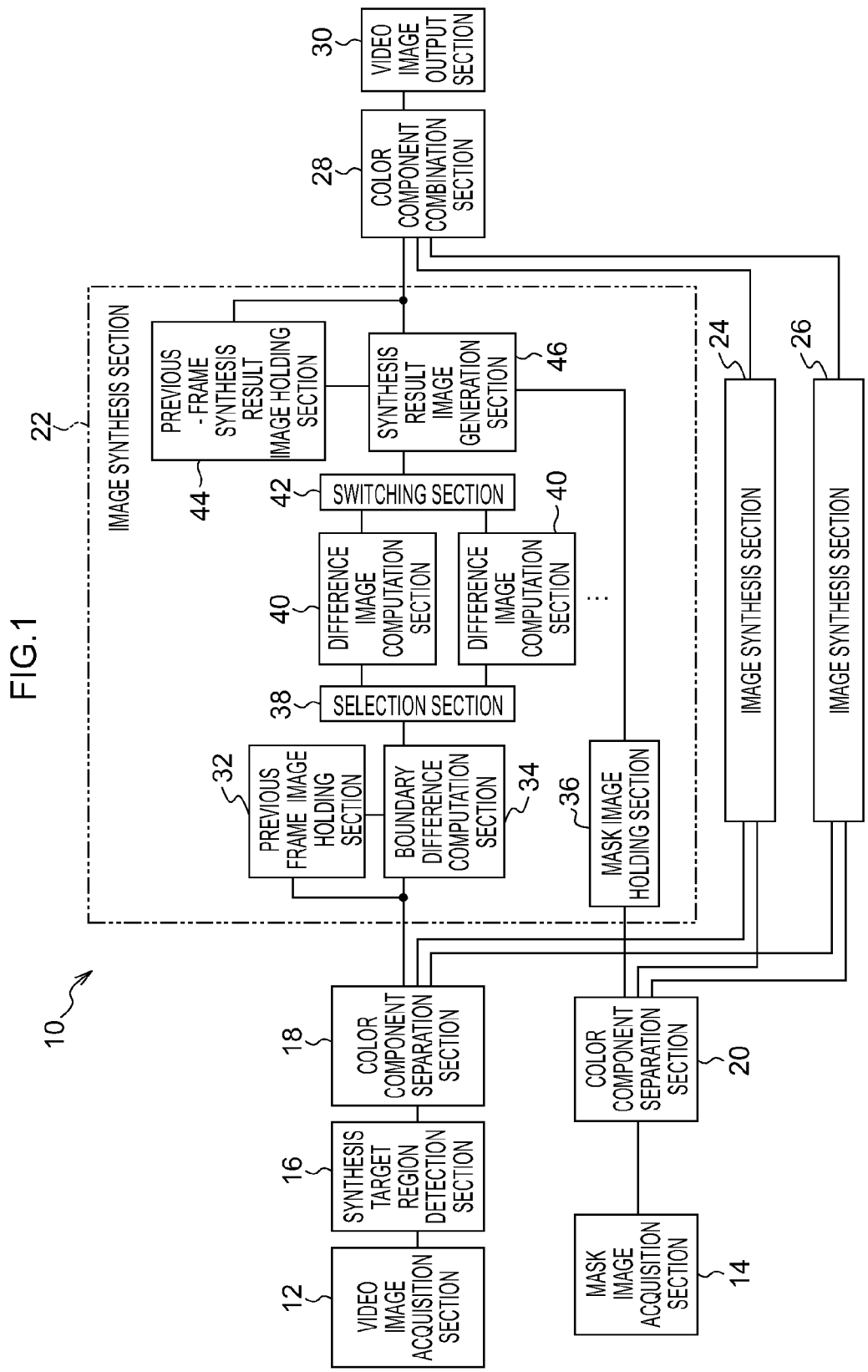
FIG. 1 is a functional block diagram of an image processing apparatus according to a first exemplary embodiment.

FIG. 1 illustrates an image processing apparatus 10 according to a first exemplary embodiment. The image processing apparatus 10 is an apparatus that performs mask synthesis processing by synthesizing a pre-set mask image at a synthesis target region of a video image, such as a face region of a person present in each frame, to protect the privacy of the person captured as the subject in the video image. The image processing apparatus 10 includes a video image acquisition section 12, a mask image acquisition section 14, a synthesis target region detection section 16, two individual color component separation sections 18, 20, three individual image synthesis sections 22, 24, 26, a color component combination section 28 and a video image output section 30. The image synthesis sections 22, 24, 26 have similar configurations to each other, and each include a previous frame image holding section 32, a boundary difference computation section 34, a mask image holding section 36, a selection section 38, plural difference image computation sections 40 and a switching section 42. The image synthesis sections 22, 24, 26 also each include a previous-frame synthesis result image holding section 44 and a synthesis result image generation section 46.

The video image acquisition section 12 acquires a video image, obtained by capturing a subject with an image capture apparatus equipped with a video image capture function, in frame units either from the image capture apparatus or from a storage section that stores the video image. Note that the video image acquisition section 12 may be configured to include the above-described image capture apparatus. Moreover, the image processing apparatus 10 may itself be installed in the above-described image capture apparatus. Moreover, in cases in which the image capture apparatus is connected via a communication cable to a data processing machine that functions as the image processing apparatus 10, for example, the video image acquisition section 12 may be configured as a communication unit provided to the data processing machine to acquire image data from the image capture apparatus via a communication cable.

The mask image acquisition section 14 acquires a mask image for synthesizing at the synthesis target region, such as a face region of a person present in each frame of the video image. As mentioned above, the mask synthesis processing according to the present exemplary embodiment is directed towards protecting the privacy of a person captured as the subject in a video image, for example, and the mask image is pre-set to achieve a video image in which it is difficult to identify the person in a video image in which the mask image has been synthesized. For example, when the synthesis target region is a person's face region, an image representing the face of a person other than the person captured as the subject in the video image, or an image representing an average face of plural people, may be preset as the mask image. The mask image acquisition section 14 may acquire the mask image by performing processing such as reading a mask image stored in a preset storage section from the storage section.

The synthesis target region detection section 16 takes an image of each frame of a video image acquired by the video image acquisition section 12 and sequentially detects synthesis target regions present in each frame of the image. The synthesis target region detection section 16 then sequentially outputs the position and size of each of the detected synthesis target regions on the image, together with each frame of the video image. The color component separation section 18 separates the images of each frame of the video image acquired by the video image acquisition section 12 into plural color components for each pixel, and the color component separation section 20 separates the mask image acquired by the mask image acquisition section 14 into plural color components for each pixel. Color components defined in any suitable color space are applicable as the plural color components, and, for example, any of R, G, B or H, S, V or Y, U, V or L*, a*, b* may be employed for the color space.

The image synthesis sections 22, 24, 26 correspond to different color components from each other, and frame images of each respective different color component are input thereto from the color component separation sections 18, 20. Processing is performed in the image synthesis sections 22, 24, 26 to synthesize the input mask image at the synthesis target region in the input frame images for each of the respectively different color components.

Namely, the previous frame image holding section 32 holds a frame image (the N-1$^{th}$ frame image) that is one frame previous to the frame image to be subjected to processing (the N$^{th}$ frame image) out of the particular color component frame images input from the color component separation section 18. Note that the previous frame image holding section 32 may be configured, for example, by a First-In-First-Out (FIFO) memory capable of holding data for two frames worth of image, for example. The boundary difference computation section 34 computes difference values of the particular color component between a boundary corresponding to an outer edge of the synthesis target region present in the N$^{th}$ frame image and a boundary corresponding to an outer edge of the synthesis target region present in the N-1$^{th}$ frame image held in the previous frame image holding section 32. Note that the boundary difference computation section 34 is an example of a difference value computation section according to the technology disclosed herein, and the processing executed by the boundary difference computation section 34 is an example of difference value computation according to the technology disclosed herein.

The mask image holding section 36 holds a mask image of the particular color component input from the color component separation section 20. The selection section 38 selectively outputs the difference value of the particular color component at the boundary of the synthesis target region computed by the boundary difference computation section 34 to one of the plural difference image computation sections 40. The plural difference image computation sections 40 operate in parallel to each other, and when a difference value for the particular color component of the synthesis target region boundary is input from the selection section 38, the difference image computation sections 40 generate difference images of the particular color component such that the second order differential values (twice differentiated values) of a region inside the boundary are 0 under the condition of preserving the difference values of the input boundary. The number of the difference image computation sections 40 may, for example, be set in the image processing apparatus 10 to the same number as the number of frames input as a video image within the processing time used for one difference image computation section 40 to process one frame image in a video image.

Note that generation of difference images by the difference image computation sections 40 is described in detail later; however, in brief, it is implemented by iterative computation using a Poisson equation. The difference image computation section 40 is an example of a difference image generation section according to the technology disclosed herein, and the processing executed by the difference image computation section 40 is an example of difference image generation in the technology disclosed herein.

The switching section 42 outputs, to the synthesis result image generation section 46, the generated particular color component difference image each time the difference image of the particular color component is generated by one or other of the plural difference image computation sections 40. The previous-frame synthesis result image holding section 44 holds the synthesized result image of the particular color component generated by the synthesis result image generation section 46 for the N-1$^{th}$ frame image.

When the frame number N=1, under the condition of preserving the synthesis target region boundary present in the N$^{th}$ frame image, the synthesis result image generation section 46 generates by computation a synthesized result image of the particular color component that matches the second order differential values of the region inside the boundary to the second order differential value of the mask image. Then image synthesis processing is performed to substitute the generated synthesized result image of the particular color component for the image of the synthesis target region in the N$^{th}$ frame image. Moreover, when the frame number N≥2, the synthesis result image generation section 46 adds the difference image of the particular color component input from the switching section 42 to the synthesized result image of the particular color component for the N-1$^{th}$ frame image held in the previous-frame synthesis result image holding section 44. Then, image synthesis processing is performed to substitute the image obtained by this addition for the image of the synthesis target region in the N$^{th}$ frame image, as the synthesized result image of the particular color component for the N$^{th}$ frame image. Note that the synthesis result image generation section 46 is an example of an image synthesizing section according to the technology disclosed herein, and the processing executed by the synthesis result image generation section 46 is an example of image synthesizing according to the technology disclosed herein.

Each time a given frame image of the mutually different color components synthesized with the synthesized result image is output from the image synthesis sections 22, 24, 26, the color component combination section 28 combines the frame images output from the image synthesis sections 22, 24, 26 of each of the color components into a single frame image and outputs the single frame image. The video image output section 30 outputs the single frame image output from the color component combination section 28 as a one-frame image of a video image synthesized with the mask image.

Figure 2:
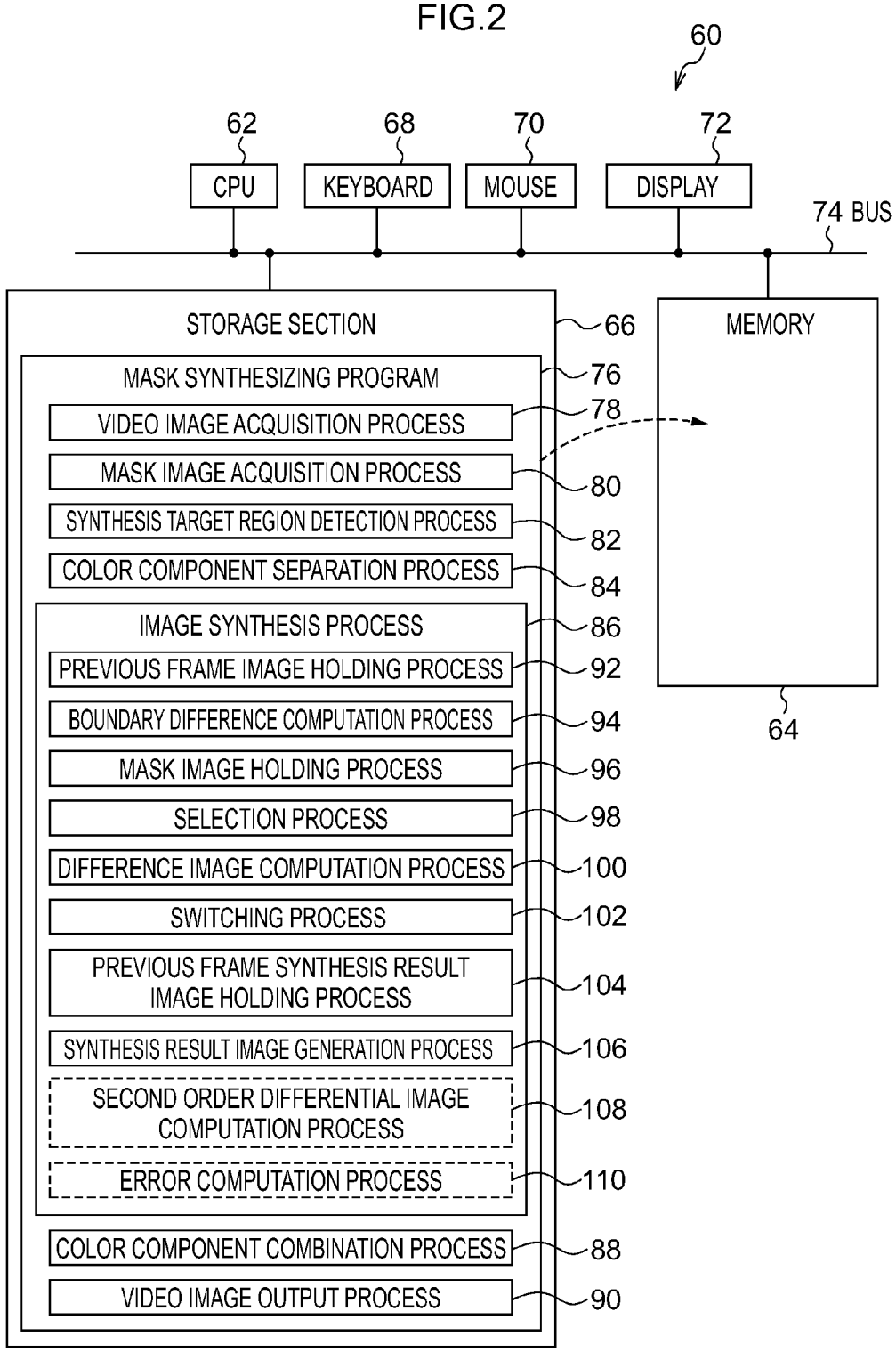
FIG. 2 is a schematic block diagram of a computer that functions as an image processing apparatus.
Figure 3:
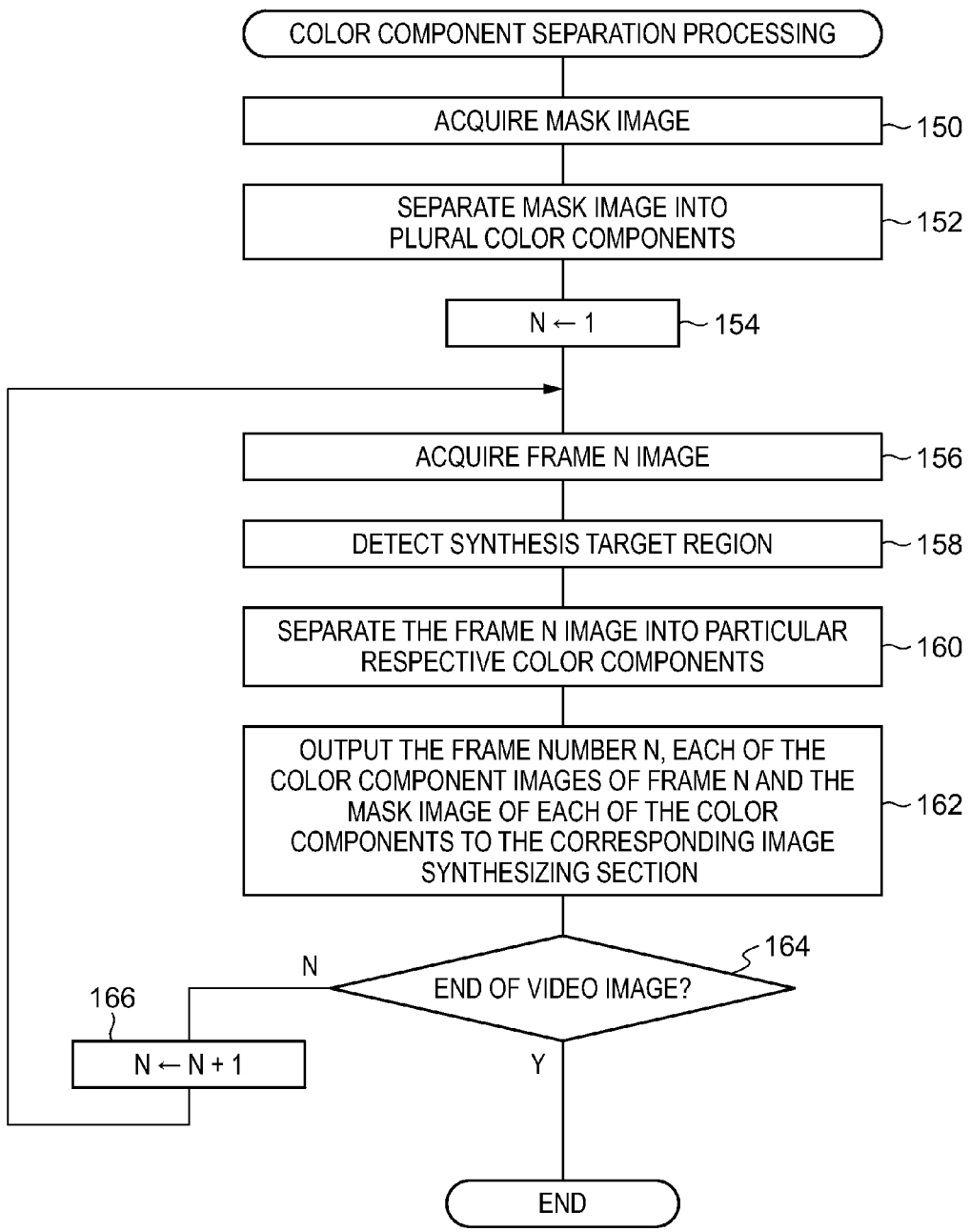
FIG. 3 is a flow chart illustrating an example of color element separation processing according to a first exemplary embodiment.

The image processing apparatus 10 may, for example, be implemented by a computer 60 illustrated in FIG. 2. The computer 60 includes a CPU 62, a memory 64, a non-volatile storage section 66, a keyboard 68, a mouse 70 and a display 72, with these sections connected together through a bus 74.

The non-volatile storage section 66 may be implemented by a Hard Disk Drive (HDD) or a flash memory. A mask synthesizing program 76 for causing the computer 60 to function as the image processing apparatus 10 is stored in the storage section 66 serving as a recording medium. The CPU 62 reads the mask synthesizing program 76 from the storage section 66, expands the mask synthesizing program 76 into the memory 64, and sequentially executes processes of the mask synthesizing program 76.

The mask synthesizing program 76 includes a video image acquisition process 78, a mask image acquisition process 80, a synthesis target region detection process 82, a color component separation process 84, an image synthesis process 86, a color component combination process 88 and a video image output process 90. The CPU 62 operates as the video image acquisition section 12 illustrated in FIG. 1 by executing the video image acquisition process 78. The CPU 62 operates as the mask image acquisition section 14 illustrated in FIG. 1 by executing the mask image acquisition process 80. The CPU 62 operates as the synthesis target region detection section 16 illustrated in FIG. 1 by executing the synthesis target region detection process 82. The CPU 62 operates as the color component separation sections 18, 20 illustrated in FIG. 1 by executing the color component separation process 84. The CPU 62 operates as the image synthesis sections 22, 24, 26 illustrated in FIG. 1 by executing the image synthesis process 86. The CPU 62 operates as the color component combination section 28 illustrated in FIG. 1 by executing the color component combination process 88. The CPU 62 operates as the video image output section 30 illustrated in FIG. 1 by executing the video image output process 90.

The image synthesis process 86 includes a previous-frame image holding process 92, a boundary difference computation process 94, a mask image holding process 96, a selection process 98, a difference image computation process 100 and a switching process 102. Moreover, the image synthesis process 86 includes a previous-frame synthesis result image holding process 104 and a synthesis result image generation process 106. The CPU 62 operates as the previous-frame image holding section 32 illustrated in FIG. 1 by executing the previous-frame image holding process 92. The CPU 62 operates as the boundary difference computation section 34 illustrated in FIG. 1 by executing the boundary difference computation process 94. The CPU 62 operates as the mask image holding section 36 illustrated in FIG. 1 by executing the mask image holding process 96. The CPU 62 operates as the selection section 38 illustrated in FIG. 1 by executing the selection process 98. The CPU 62 operates as each of the difference image computation sections 40 illustrated in FIG. 1 by executing the difference image computation process 100. The CPU 62 operates as the switching section 42 illustrated in FIG. 1 by executing the switching process 102. The CPU 62 operates as the previous-frame synthesis result image holding section 44 illustrated in FIG. 1 by executing the previous-frame synthesis result image holding process 104. The CPU 62 operates as the synthesis result image generation section 46 illustrated in FIG. 1 by executing the synthesis result image generation process 106.

The computer 60 executing the mask synthesizing program 76 accordingly functions as the image processing apparatus 10. Note that the storage section 66 storing the mask synthesizing program 76 is an example of a recording medium in the technology disclosed herein.

Note that the image processing apparatus 10 may be implemented, for example, by a semiconductor integrated circuit, and more specifically by an Application Specific Integrated Circuit (ASIC).

Figure 33:
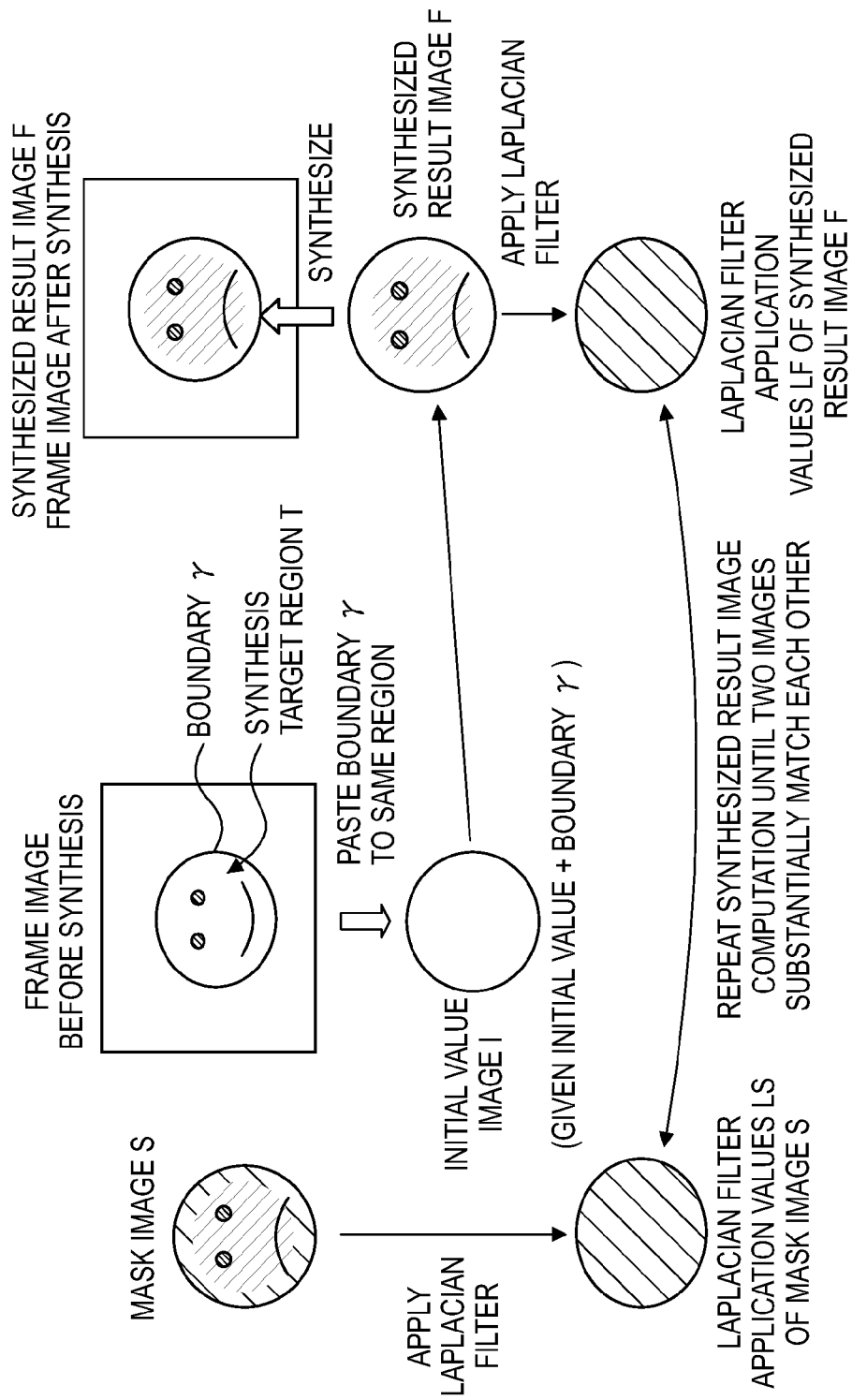
FIG. 33 is a schematic diagram to explain the synthesis of a mask image employing a Poisson equation in a comparative example.

Now, before explanation regarding operation of the first exemplary embodiment, explanation follows regarding conventional synthesis of a mask image (computation of a synthesized result image). Conventional mask image synthesis employs gradient data (second order differential values) of a mask image, and derives and generates a synthesized result image by solving a Poisson equation, with edges of a synthesis target region (the synthesis boundary with the mask image) as boundary conditions. More specifically, the following computation processing is executed, for example (see also FIG. 33).

Namely, when S (width W, height H) is a mask image, T (width W, height H) is a synthesis target region, I (width W, height H) is an initial value image, and F (width W, height H) is a synthesized result image, Laplacian filter application values LS of a mask image S are represented by the following Equation (1).

$$LS(x, y)=S(x-1, y)+S(x+1, y)+S(x, y-1)+S(x, y+1)-4S(x, y)$$ Equation (1)

However, since the edge of the image cannot be a computation destination, then $0<x<W$, $0<y<H$, wherein the width of the mask image S is denoted W, and the height is denoted H. The outside edge of the image are pixel values (boundary γ) of the synthesis target region (see the following Equation (2)).

$$F(x, y)=T(x, y) \text{ (when } x=0 \text{ or } y=0 \text{ or } x=W \text{ or } y=H)$$ Equation (2)

Moreover, the Laplacian filter application values LF of the synthesized result image F are matched to the Laplacian filter application values LS of the mask image S (see the following Equation (3)).

$$LF(x, y)=LS(x, y)$$ Equation (3)

Solving Equation (2) and Equation (3) above enables values of the synthesized result image F (x, y) to be obtained for the entire region of the synthesis target region T.

The above equations can be solved as set out below. Namely, the Laplacian filter application values LF of the synthesized result image F are represented by the following Equation (4).

$$LF(x, y)=F(x-1, y)+F(x+1, y)+F(x, y-1)+F(x, y+1)-4F(x, y)$$ Equation (4)

Moreover, the following Equation (5) is obtained from Equation (3).

$$F(x, y)=\{F(x-1, y)+F(x+1, y)+F(x, y-1)+F(x, y+1)-LS(x, y)\}/4$$ Equation (5)

To numerically solve the synthesized result image F, Equation (5) is transformed into a recurrence formula of the following Equation (6), and after applying initial values for the synthesized result image F, iterative computation (Gauss-Seidel method) is then performed to converge the values of synthesized result image F.

$$Fi+1(x, y)=\{Fi(x-1, y)+Fi(x+1, y)+Fi(x, y-1)+Fi(x, y+1)-LS(x, y)\}/4$$ Equation (6)

In Equation (6), i is a variable identifying each time of computation. Moreover, the initial values are normally:

$$F0(x, y)=T(x, y) \text{ (when } x=0 \text{ or } y=0 \text{ or } x=W \text{ or } y=H)$$

$$F0(x, y)=0 \text{ (other than when } x=0 \text{ or } y=0 \text{ or } x=W \text{ or } y=H)$$

Convergence conditions are one of the following.
(convergence condition A) |Fi+1−Fi| is a threshold value or lower
(convergence condition B) Laplacian filter application values LF of the synthesized result image F are computed and |LF−LS| is a threshold value or lower.
Accordingly, based on the mask image S the synthesized result image F is generated from the boundary γ between the initial value image I and the synthesis target region T.

Moreover, it is possible to derive the synthesized result image F using the following Equation (7) in place of Equation (6) (an SOR method).

$$Fi+1(x, y)=(1-\omega) Fi(x, y)+\omega\{Fi(x-1, y)+Fi(x+1, y)+Fi(x, y-1)+Fi(x, y+1)-LS(x, y)\}/4$$ Equation (7)

Equation (7) converges at ω=1 to 2. Note that it is possible to view Equation (6) as being Equation (7) with ω=1. It is known that good convergence characteristics are obtained by using a value of ω=about 1.95.

However, there is the disadvantage that there is a very large number of iterations in the iterative computation to compute the synthesized result image F as described above, and there is a very large computational load. A possible approach to reduce this disadvantage is to employ the synthesized result image $F_{N-1}$ computed for the frame image of one frame previous as the initial value image (see the following Equation (8) and FIG. 34).

$F0(x, y)=T(x, y)$ (when $x=0$ or $y=0$ or $x=W$ or $y=H$)

$F0(x, y)=F_{N-1}(x, y)$ (other than when $x=0$ or $y=0$ or $x=W$ or $y=H$)      Equation (8)

Figure 35:
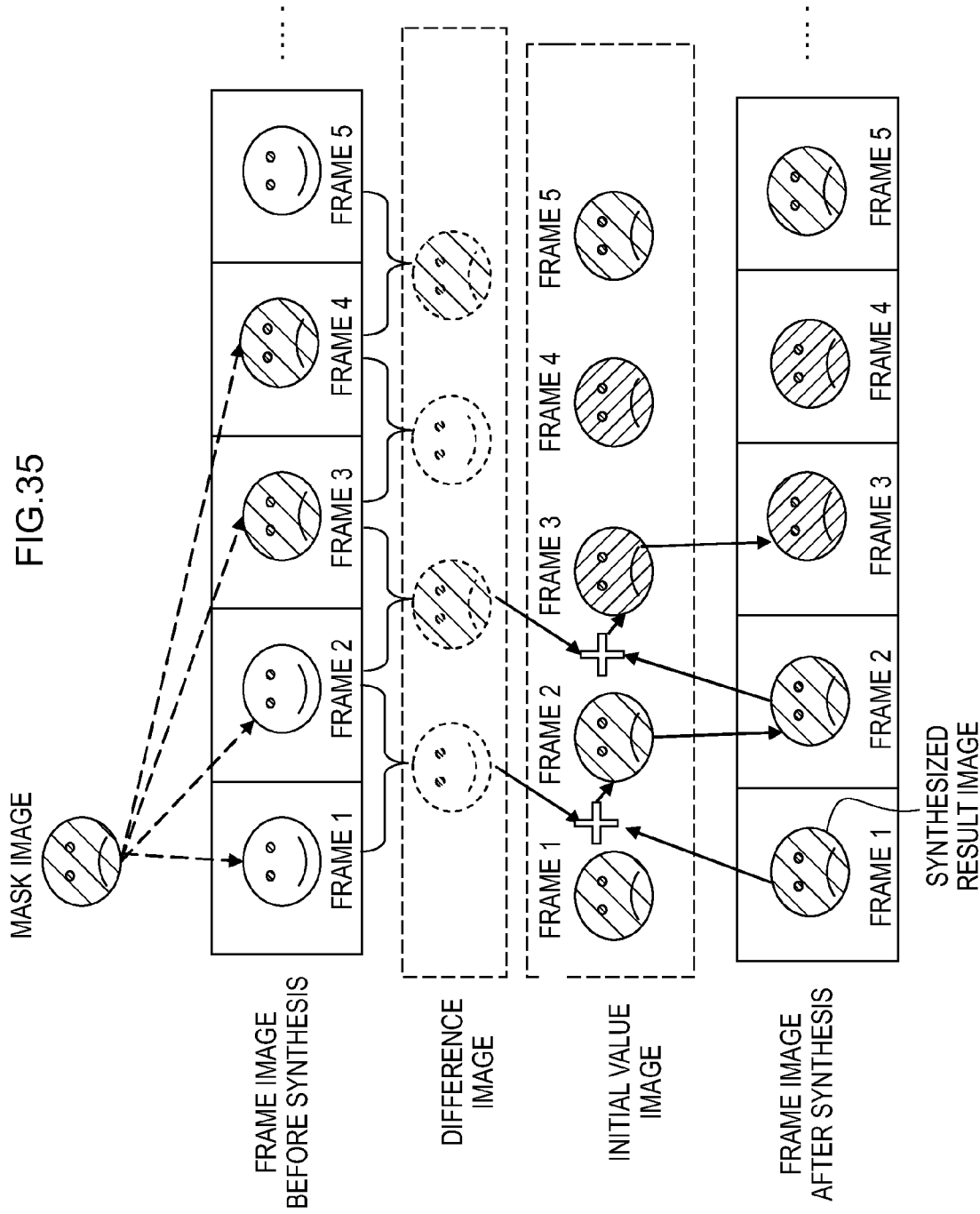
FIG. 35 is a schematic diagram to explain another example of generating a synthesized result image in a comparative example.

As a method of further reducing the number of times of computational iteration, a possible approach is to employ, as the initial value image, a result of adding to the synthesized result image $F_{N-1}$ the difference between the synthesis target region T and the synthesis target region $T_{N-1}$ in the frame image one frame previous (see the following Equation (9) and FIG. 35).

$F0(x, y)=T(x, y)$ (when $x=0$ or $y=0$ or $x=W$ or $y=H$)

$F0(x, y)=F_{N-1}(x, y)+T(x, y)-T_{N-1}(x, y)$ (other than when $x=0$ or $y=0$ or $x=W$ or $y=H$)      Equation (9)

Figure 34:
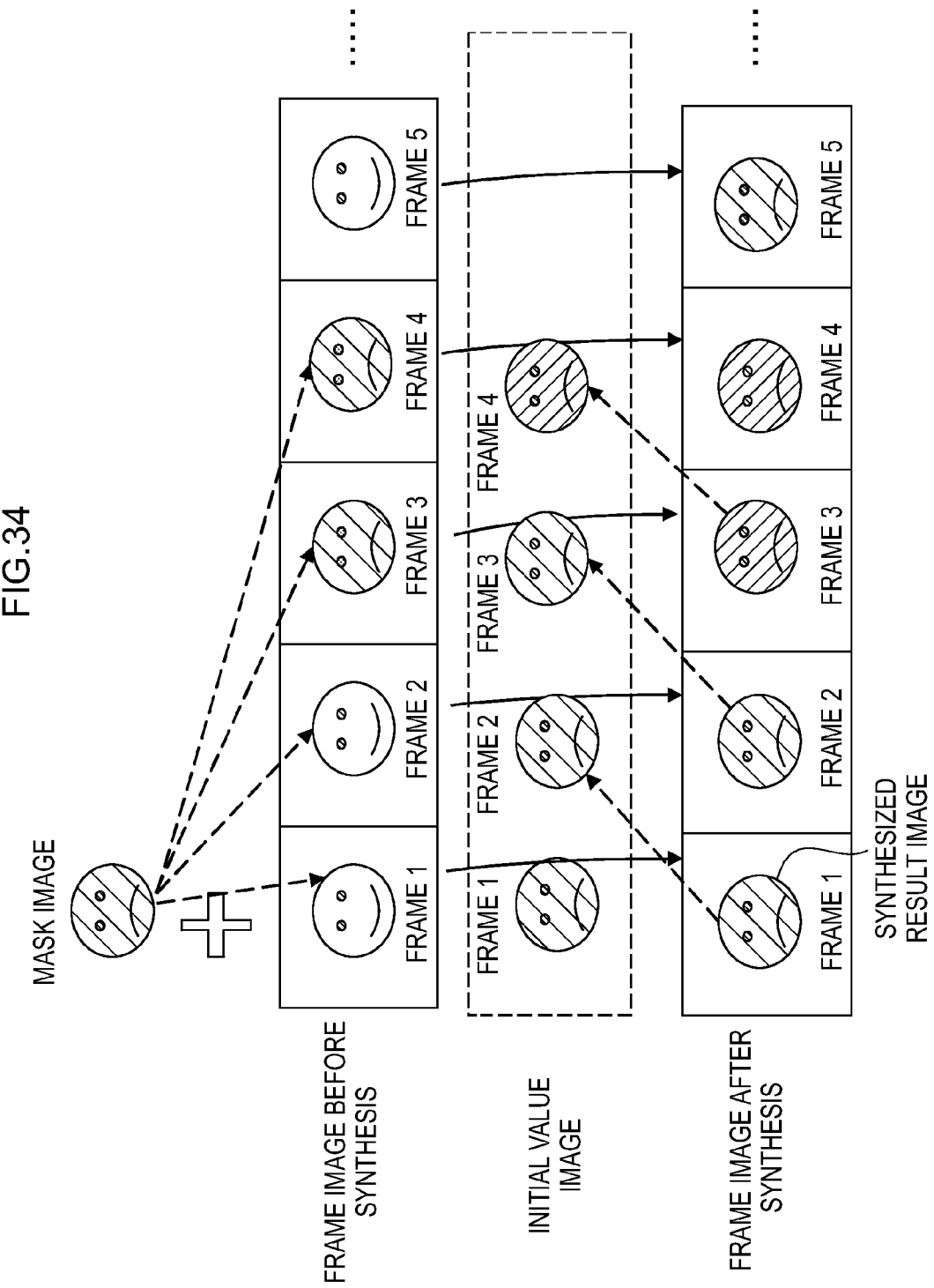
FIG. 34 is a schematic diagram to explain an example of generating a synthesized result image in a comparative example.
Figure 36:
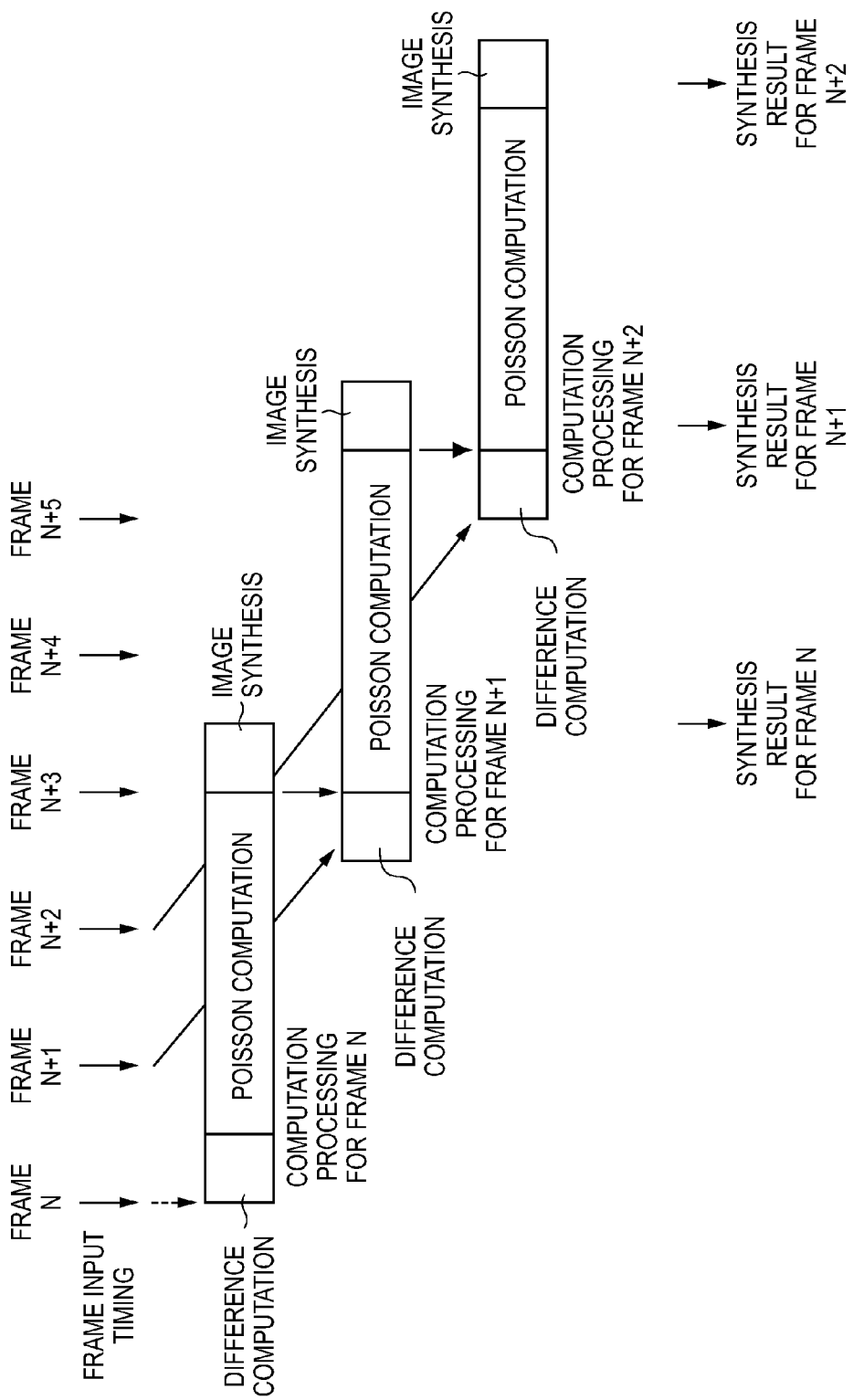
FIG. 36 is a timing chart illustrating an example of timings of processing on each frame of a video image in a comparative example.

However, in the computation methods illustrated in FIG. 34 and FIG. 35, although a reduction in the number of iterations is enabled in both iterative computations, the synthesized result image $F_{N-1}$ for the frame image one frame previous needs to be computed in order to compute the synthesized result image F of the frame image that is subjected to processing. Thus, as illustrated in FIG. 36, in the computational method illustrated in, for example, FIG. 35, the iterative computation for the next frame image can only be started after the iterative computation for the frame image one frame previous has been completed (denoted by "Poisson computation" in FIG. 36). Accordingly, the output rate of mask image synthesized results is lower than the input frame rate of the video image, making it difficult to perform real time synthesis of the mask image on each frame of the video image.

The following Equation (10) is obtained by solving synthesized result image F(x, y) for individual frames of the video image so as to satisfy Equation (3).

$LF_N(x, y)-LF_{N-1}(x, y)=0$      Equation (10)

Note that $LF_N(x, y)$ are Laplacian filter application values (second order differential values) of the synthesized result image F for the $N^{th}$ frame, and $LF_{N-1}(x, y)$ are Laplacian filter application values (second order differential values) of the synthesized result image F for the $N-1^{th}$ frame.

In the above Equation (10), the image corresponding to the difference between the synthesized result images F of two successive frames (referred to below as the difference image D (x, y) of these images) means an image (gradation image) in which the second order differential values are 0. As stated above, the synthesized result image F of each of the frames is computable by iterative computation using a Poisson equation under the boundary condition of preserving the pixel values (boundary γ) of the synthesis target region. Thus, the difference image D (x, y) is computable by deriving a difference (boundary difference) of pixel values (boundary γ) of synthesis target regions of the $N-1^{th}$ frame image and the $N^{th}$ frame image, and performing iterative computation using a Poisson equation under the boundary condition that the derived boundary difference is preserved. Then the synthesized result image F of the $N^{th}$ frame is obtained by adding the computed difference image D (x, y) to the synthesized result image F of the $N-1^{th}$ frame.

Based on the above, in the first exemplary embodiment, on instruction to the image processing apparatus 10 to execute mask synthesis processing, mask synthesis processing including the processing illustrated in FIG. 3 to FIG. 7 is performed in the image processing apparatus 10. Note that execution of this mask synthesis processing is instructed, for example, in cases in which a need arises to protect the privacy of a person captured as a subject in a video image, in order, for example, to distribute, or broadcast or publish on a network a video image captured by an image capture apparatus.

When the mask synthesis processing is executed, the video image to be subjected to processing is specified, and a mask image of a synthesis target is also specified. As a result, in the image processing apparatus 10 according to the first exemplary embodiment, the video image acquisition section 12, the mask image acquisition section 14, the synthesis target region detection section 16 and the two individual color component separation sections 18, 20 execute the color component separation processing illustrated in FIG. 3.

Figure 9:
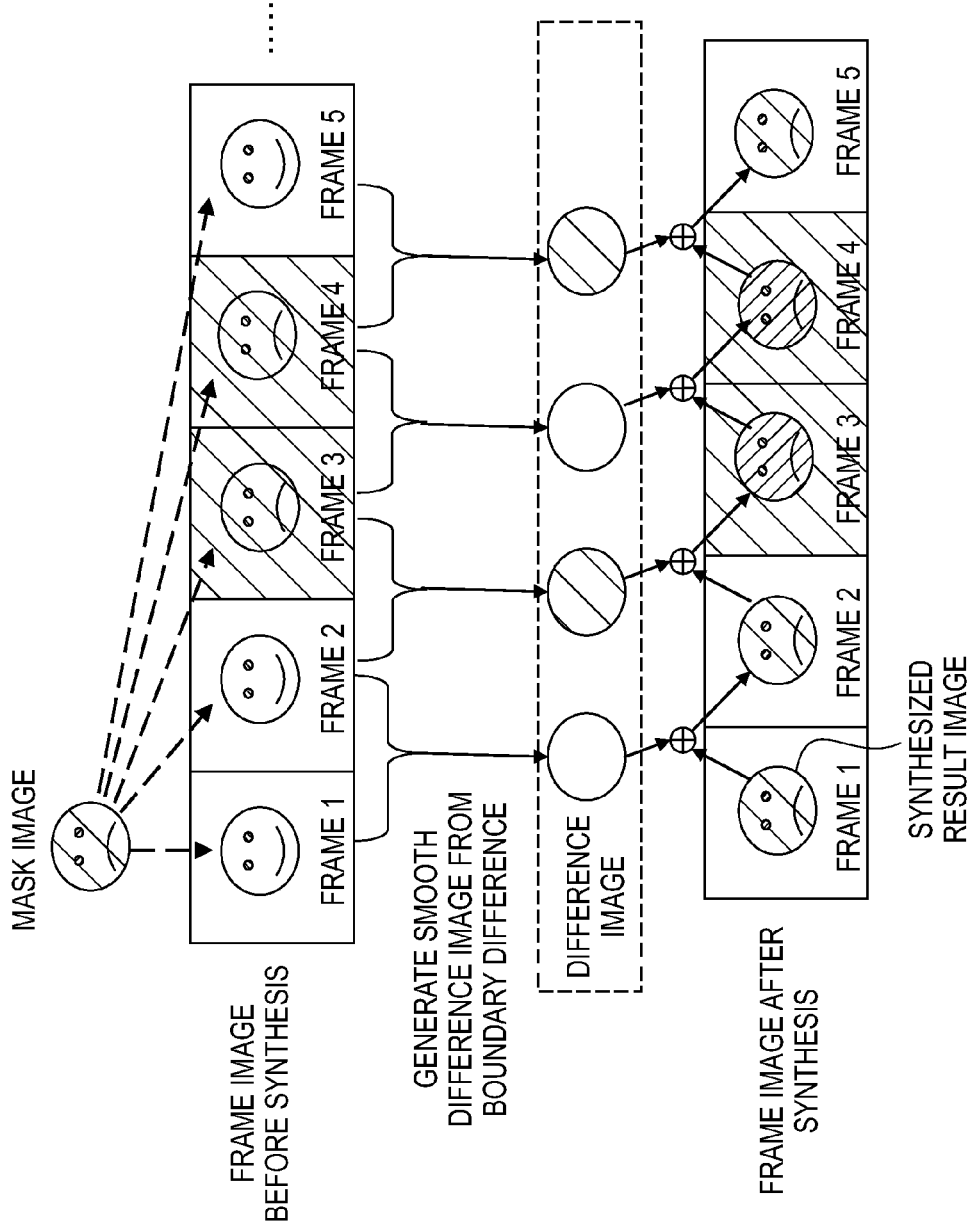
FIG. 9 is a schematic diagram to explain the generation of a synthesized result image in the first exemplary embodiment.

At step 150 of the color component separation processing, the mask image acquisition section 14 acquires the mask image specified for synthesis from among plural mask images pre-stored, for example, in the storage section 66. Note that in cases in which the whole face region of a person captured as a subject in a video image is employed as the synthesis target region for synthesizing the mask image at, a face image representing the face of a person (the face of another person or an average face of plural people) is employed as the mask image, such as illustrated in FIG. 9, for example. In step 152, the color component separation section 20 separates the mask image acquired by the mask image acquisition section 14 into plural color components.

At step 154, the video image acquisition section 12 sets a variable N, for discriminating each frame of the video image specified as subject to processing, to 1. Then at step 156, the video image acquisition section 12 acquires the $N^{th}$ frame image out of the video images subject to processing. At step 158 the synthesis target region detection section 16 detects a synthesis target region inside the $N^{th}$ frame image acquired by the video image acquisition section 12, and detects the position and size of the synthesis target region in the $N^{th}$ frame image.

Note that in cases in which a face region is applied as the synthesis target region, any appropriate method may be applied to detect the face region, such as, for example, a method employing a Haar classifier (see P. Viola and M. Jones, "Rapid object detection using a boosted cascade of simple features," in Proc. IEEE Computer Vision and Pattern Recognition, pp. I_511-I_518, 2001). Moreover, there is no limitation to the detection of the synthesis target region using the synthesis target region detection section 16. For example, in cases of synthesizing a mask image only for some people out of plural persons captured as subjects in a video image, a synthesis target region of a person subject to processing may be specified at the beginning. In such cases, the synthesis target region detection section 16 may be configured to perform processing to track the synthesis target region that was initially specified in the video image.

At step 160, the color component separation section 18 separates the $N^{th}$ frame image acquired by the video image acquisition section 12 into plural color components. At step 162, the color component separation section 18 outputs the $N^{th}$ frame image for each respective color component, together with the frame number N, to each of the image synthesis sections 22, 24, 26, and the color component separation section 20 outputs each of the respective color component mask images to each of the image synthesis sections 22, 24, 26. Note that the mask images of each of the color components output from the color component separation section 20 are held in the respective mask image holding section 36 of each of the image synthesis sections 22, 24, 26. Moreover the $N^{th}$ frame image output from the color component separation section 18 is held in the previous-frame image holding section 32.

Next, at step 164, the video image acquisition section 12 determines whether or not all the frame images of the video image subject to processing have been acquired. Processing proceeds to step 166 when negative determination is made at step 164, the video image acquisition section 12 increments the value of the variable N by 1 and then processing returns to step 156. The processing of step 156 to step 166 is accordingly repeated until affirmative determination is made at step 164. The color component separation processing is then ended when affirmative determination is made at step 164.

Figure 4:
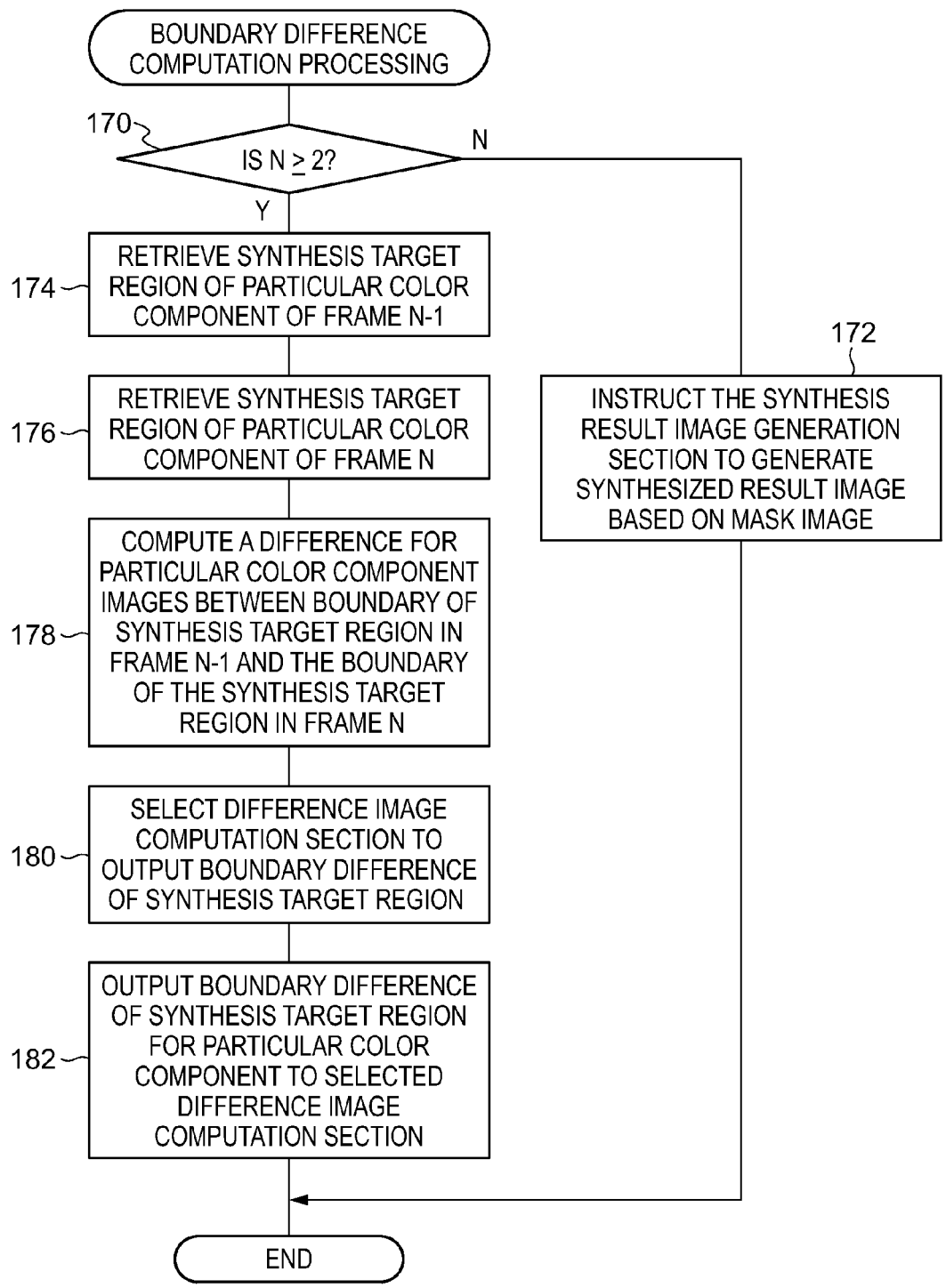
FIG. 4 is a flow chart illustrating an example of boundary difference computation processing according to the first exemplary embodiment.

In each of the image synthesis sections 22, 24, 26 of the image processing apparatus 10, the boundary difference computation processing illustrated in FIG. 4 is executed by the boundary difference computation section 34 and the selection section 38 each time an $N^{th}$ frame of a particular color component image is input from the color component separation section 18. At step 170 of the boundary difference computation processing, the boundary difference computation section 34 determines whether or not the value of the variable N is 2 or more. Since the value of the variable N is 1 at the start, negative determination is made at step 170 and processing proceeds to step 172. At step 172, the boundary difference computation section 34 instructs the synthesis result image generation section 46 to generate a synthesized result image of a particular color component corresponding to the $N(=1)^{th}$ frame image based on the mask image of the particular color component held in the mask image holding section 36.

Affirmative determination is made at step 170 when the value of the variable N is 2 or greater, and processing proceeds to step 174. At step 174, the boundary difference computation section 34 retrieves data of the synthesis target region detected by the synthesis target region detection section 16 from the particular color component image of the $N-1^{th}$ frame held in the previous-frame image holding section 32. Then, in the next step 176, the boundary difference computation section 34 retrieves the data of the synthesis target region detected by the synthesis target region detection section 16 from the particular color component of the $N^{th}$ frame image input by the color component separation section 18.

At step 178, the boundary difference computation section 34 computes the difference (boundary difference γ D) of pixel values between the boundary of the synthesis target region in the $N-1^{th}$ frame image of the particular color component and the boundary of the synthesis target region in the $N^{th}$ frame image of the particular color component. Note that when the boundary of the synthesis target region in the $N-1^{th}$ frame image is denoted $\gamma T_{N-1}$, and the boundary of the synthesis target region in the $N^{th}$ frame image is denoted $\gamma T_N$, the boundary difference γ D can be computed accordingly to the following Equation (11)

$$\gamma D_N(x, y) = \gamma T_N(x, y) - \gamma T_{N-1}(x, y) \quad \text{Equation (11)}$$

Thereby, as in an example illustrated in FIG. 8, the boundary difference γ D is obtained, which represents the difference between pixel values at a boundary of the synthesized boundary region in two successive frames, and having a one-pixel width along the peripheral edge of the synthesis target region. Note that although only positive "+ (plus)" boundary differences are illustrated in FIG. 8, negative "− (minus)" boundary differences are also possible.

In the next step 180, the selection section 38 selects, from out of the plural difference image computation sections 40, one of the difference image computation sections 40 to which to output the boundary difference γ D of the synthesis target region computed by the boundary difference computation section 34. The present exemplary embodiment is configured such that the plural difference image computation sections 40 perform computation processing in parallel to each other, and at step 180, the difference image computation section 40 to which to output the boundary difference γ D of the synthesis target region is selected cyclically from out of the plural difference image computation sections 40. Then at step 182, the selection section 38 outputs the boundary difference γ D of the synthesis target region for the particular color component computed by the boundary difference computation section 34, to the difference image computation section 40 selected at step 180.

Figure 5:
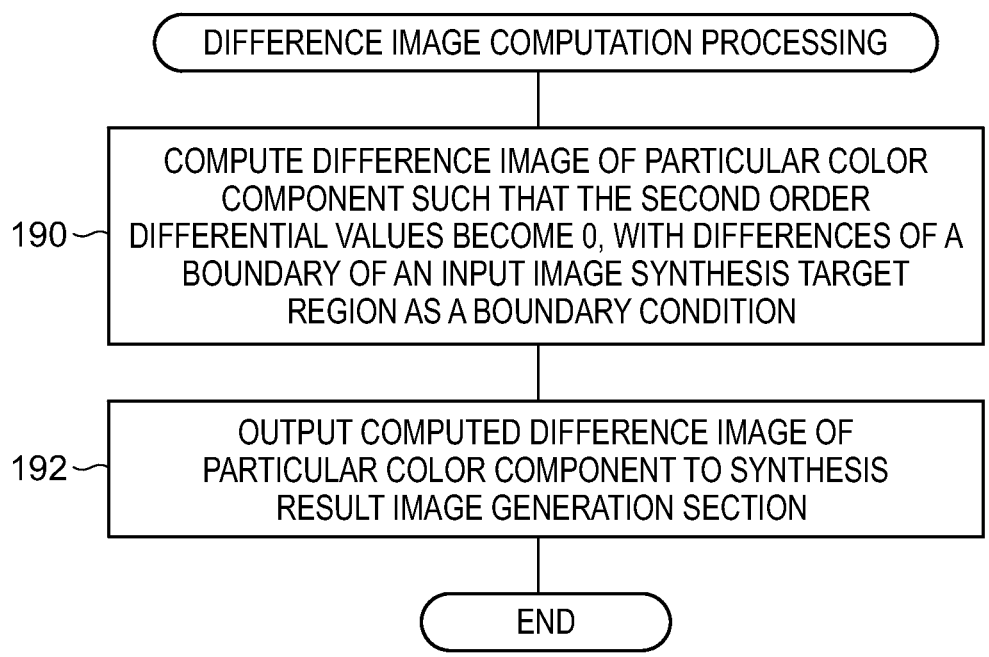
FIG. 5 is a flow chart illustrating an example of difference image computation processing according to the first exemplary embodiment.

In each of the image synthesis sections 22, 24, 26 of the image processing apparatus 10, the difference image computation processing illustrated in FIG. 5 is executed by the difference image computation section 40 each time the boundary difference of the synthesis target region for the $N^{th}$ frame of the particular color component is input from the selection section 38. At step 190 of the difference image computation processing, the difference image computation section 40 computes the difference image D (x, y) of the particular color component such that the second order differential values become 0, with the boundary difference of the input synthesis target region employed as a boundary condition (a condition to preserve the pixel values of the boundary difference). This computation may be implemented by performing computations of the following Equation (12) to Equation (17) in which difference image D is substituted into the synthesized result image F in Equation (2) to Equation (7).

Namely, the outer edge of the difference image D is taken as the boundary difference γ D of the synthesis target region (see the following Equation (12)).

$$D(x, y) = \gamma D(x, y) \text{ (when } x=0, \text{ or } y=0, \text{ or } x=W, \text{ or } y=H) \quad \text{Equation (12)}$$

Moreover, the Laplacian filter application values LD of the difference image D are 0 (see the following Equation (13))

$$LD(x, y) = 0 \quad \text{Equation (13)}$$

Values for the difference image D (x, y) are obtainable by solving Equation (12) and Equation (13) over the entire region of synthesis target region T.

The above Equations may be solved as follows. Namely, the Laplacian filter application values LD of the difference image D are represented by the following Equation (14).

$$LD(x, y) = D(x-1, y) + D(x+1, y) + D(x, y-1) + D(x, y+1) + 4D(x, y) \quad \text{Equation (14)}$$

Moreover, the following Equation (15) is obtained from Equation (13).

$$D(x, y) = \{D(x-1, y) + D(x+1, y) + D(x, y-1) + D(x, y+1)\}/4 \quad \text{Equation (15)}$$

To numerically solve the difference image D, Equation (15) is transformed into the recursive equation of the following Equation (16), and after giving the initial values for the difference image D, iterative computation (Gauss-Seidel method) is then performed to converge the values of the difference image D.

$$Di+1(x, y)=\{Di(x-1, y)+Di(x+1, y)+Di(x, y-1)+Di(x, y+1)\}/4 \quad \text{Equation (16)}$$

In the equation, i is a variable that identifies the number of times of computation. Moreover, the initial values are normally $$D0(x, y)=\gamma D(x, y) \text{ (when } x=0, \text{ or } y=0, \text{ or } x=W, \text{ or } y=H)$$

$$D0(x, y)=0 \text{ (other than when } x=0 \text{ or } y=0 \text{ or } x=W \text{ or } y=H)$$

Moreover, convergence conditions are any of the following.
(convergence condition A) |Di+1−Di| is a threshold value or lower
(convergence condition B) The Laplacian filter application values LD of the difference image D are computed, and in cases in which LD is approximately=0, as illustrated in FIG. 9, the difference image D, which is a gradation image in which the second order differential values are 0, is generated from the boundary difference γ D.

It is also possible to derive the difference image D by using Equation (17) (an SOR method) in place of Equation (16).

$$Di+1(x, y)=(1-\omega)Di(x, y)+\omega\{Di(x-1, y)+Di(x+1, y)+Di(x, y-1)+Di(x, y+1)\}/4 \quad \text{Equation (17)}$$

The Equation (17) converges at ω=1 to 2. It is known that good convergence characteristics are obtained by using a value of ω=about 1.95.

Although computation of the difference image D by the difference image computation sections 40 is also iterative computation employing a Poisson equation, the brightness difference of the synthesis target region is small in successive frames of the video image, and hence the value of the boundary difference itself is also small. Thus the number of times of iterative computation in the iterative computation of step 190 is comparatively fewer than when the synthesized result image F is computed based on Equation (1) to Equation (7), and computation converges within a shorter period of time.

In the next step 192, the switching section 42 outputs the difference image D of the particular color component computed by the difference image computation section 40 to the synthesis result image generation section 46, thereby ending the difference image computation processing.

Figure 6:
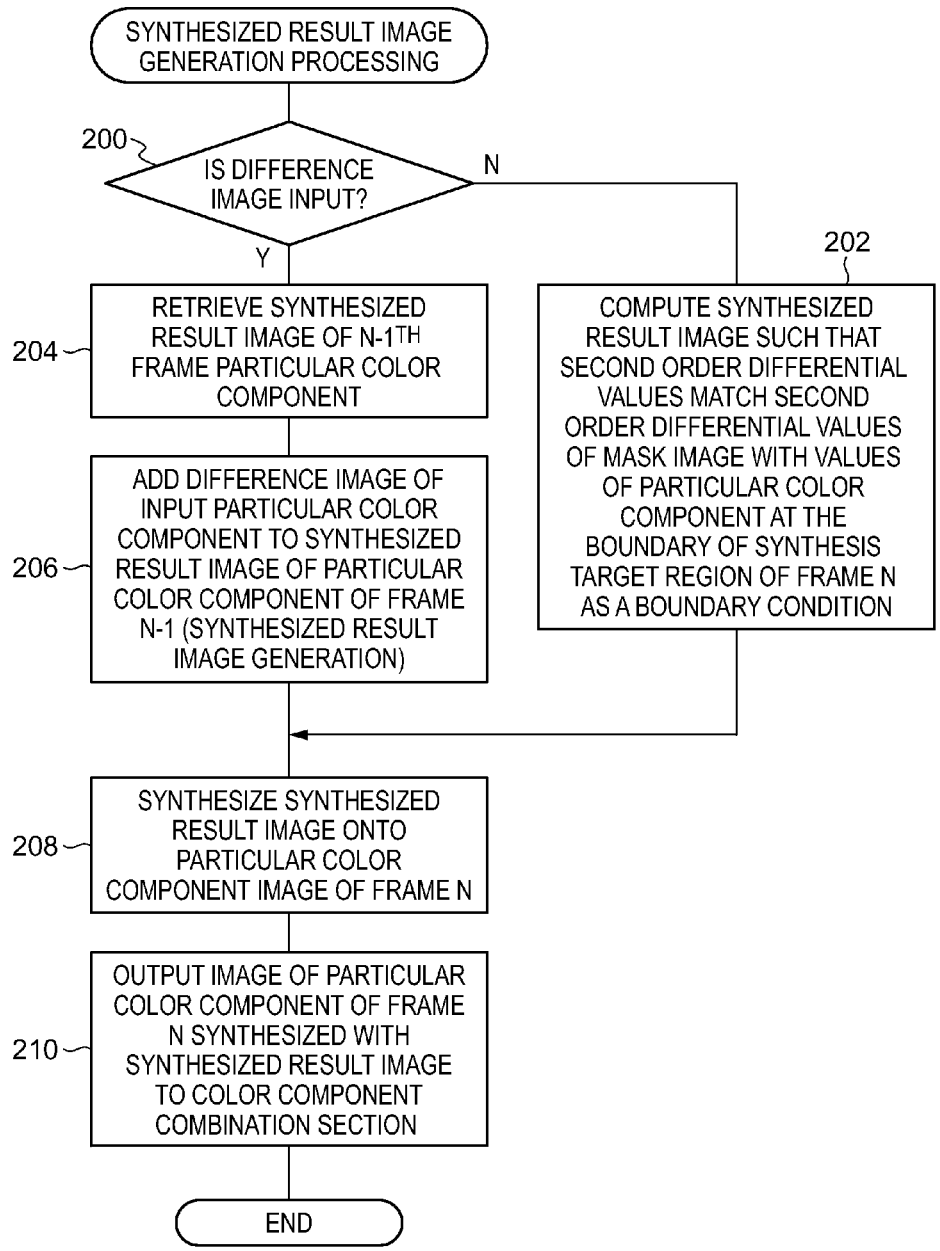
FIG. 6 is a flow chart illustrating an example of synthesized result image generation processing according to the first exemplary embodiment.

Moreover, in each of the image synthesis sections 22, 24, 26 of the image processing apparatus 10, synthesized result image generation processing illustrated in FIG. 6 is performed by the synthesis result image generation section 46. Note that the synthesized result image generation processing is executed when generation of the synthesized result image F is instructed by the boundary difference computation section 34, or each time the difference image D is input from the switching section 42 for the particular color component of the $N^{th}$ frame.

At step 200 of the synthesized result image generation processing, the synthesis result image generation section 46 determines whether or not a difference image D has been input from the switching section 42. Negative determination is made at step 200 when generation of synthesized result image F is instructed by the boundary difference computation section 34, and processing proceeds to step 202. At step 202, the synthesis result image generation section 46 computes the synthesized result image F such that the second order differential values match the second order differential values of the mask image S, employing the values of the particular color component at the boundary of the synthesis target region of the $N^{th}$ frame (wherein N=1) as a boundary condition. Such computation is executed by iterative computation employing the Poisson equation based on Equation (1) to Equation (7). The synthesized result image F is computed at step 202 and processing proceeds to step 208.

Moreover, affirmative determination is made at step 200 when the difference image D for the $N^{th}$ frame for the particular color component is input from the switching section 42, and processing proceeds to step 204. At step 204, the synthesis result image generation section 46 retrieves the synthesized result image F of the $N-1^{th}$ frame of the particular color component held in the previous-frame synthesis result image holding section 44. In the next step 206, the synthesis result image generation section 46 adds the difference image D for the $N^{th}$ frame image of the particular color component input from the switching section 42 to the synthesized result image of the particular color component corresponding to the $N-1^{th}$ frame image. Such addition generates the synthesized result image F of the particular color component corresponding to the $N^{th}$ frame image, as illustrated in FIG. 9.

In the next step 208, the synthesis result image generation section 46 synthesizes the synthesized result image F obtained by the above processing at the synthesis target region in the $N^{th}$ frame of the particular color component image. Then, at step 210, the synthesis result image generation section 46 outputs the $N^{th}$ frame of the particular color component image synthesized with the synthesized result image F to the color component combination section 28, and the synthesized result image generation processing is ended.

Figure 7:
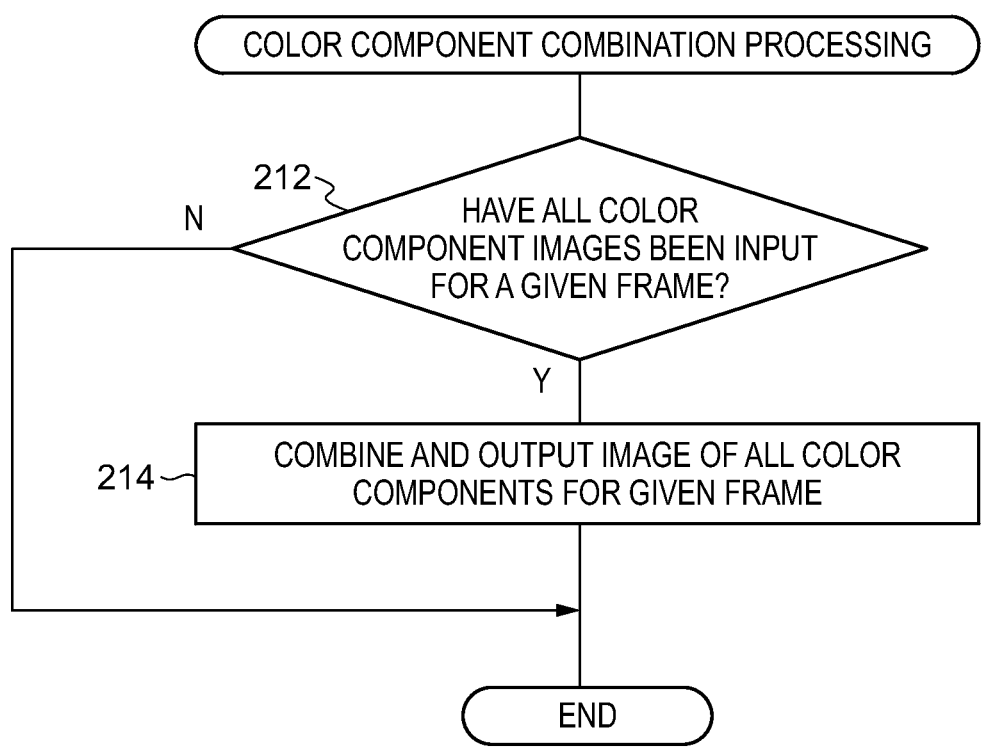
FIG. 7 is a flow chart illustrating an example of color component combination processing according to the first exemplary embodiment.

The image processing apparatus 10 uses the color component combination section 28 and the video image output section 30 to perform the color component combination processing illustrated in FIG. 7 each time the synthesized result image F is input from the synthesis result image generation section 46 of one of the image synthesis sections 22, 24, 26. At step 212 of the color component combination processing, the color component combination section 28 determines whether or not all the color component images for a given frame have been input from the image synthesis sections 22, 24, 26. The input synthesized result image F is stored, in the memory 64, for example, when negative determination is made at step 212, and the color component combination processing is ended for the time being.

However, affirmative determination is made at step 212 when all the color component images for a given frame have been input from the image synthesis sections 22, 24, 26, and processing proceeds to step 214. At step 214, the color component combination section 28 combines all the color component images of a given frame into a single full-color image (a combined image of the synthesized result images F). The video image output section 30 outputs the image generated by the color component combination section 28 together with the $N^{th}$ frame image of the video image in which the mask image is synthesized.

Figure 10:
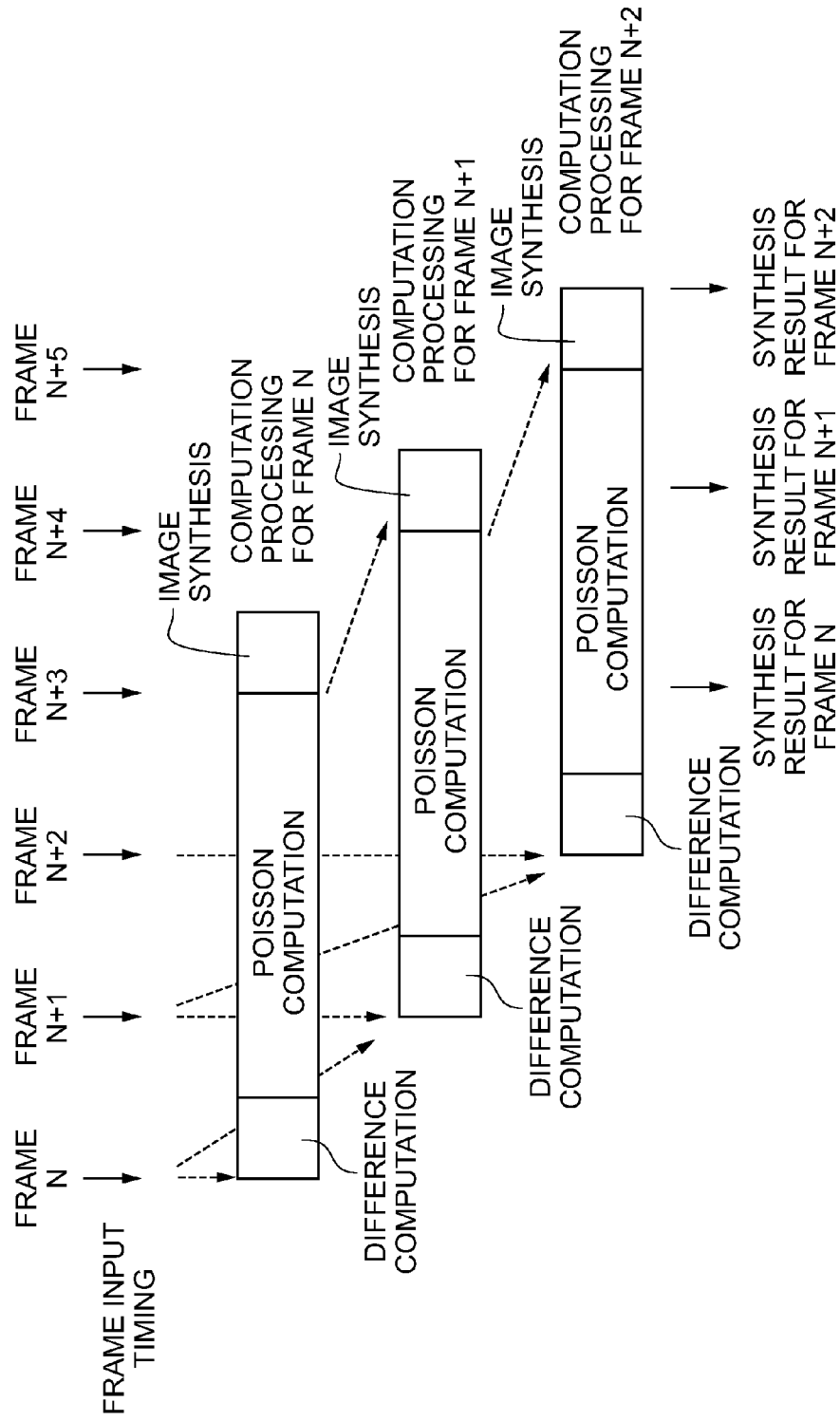
FIG. 10 is a timing chart illustrating an example of timings in processing for each frame of a video image.

Within a single cycle of the processing described above, the longest processing time is that for the computing of the difference image D by the difference image computation sections 40, this being iterative computation employing a Poisson equation. However, in the present exemplary embodiment, plural of the difference image computation sections 40 are provided, and the synthesized result image F for the N−1$^{th}$ frame image is not needed in order to compute the difference image D corresponding to the N$^{th}$ frame image. Consequently, in the present exemplary embodiment, as illustrated in the example in FIG. 10, computation of the difference images D corresponding to each frame of the video image can be performed in parallel by the plural difference image computation sections 40, and the processing to compute the synthesized result image F of each of the frames can be performed as a pipeline. Thus, as is clear from FIG. 10, it is possible to output each of the frame images in which the mask image is synthesized at the same cycle time as the frame rate of the video image input to the image processing apparatus 10, thereby enabling real time processing to be achieved.

Second Exemplary Embodiment

Explanation follows regarding a second exemplary embodiment of the technology disclosed herein. Note that portions similar to those of the first exemplary embodiment are allocated the same reference numerals and further explanation thereof is omitted, with explanation only given of the portions that differ from those of the first exemplary embodiment.

Figure 11:
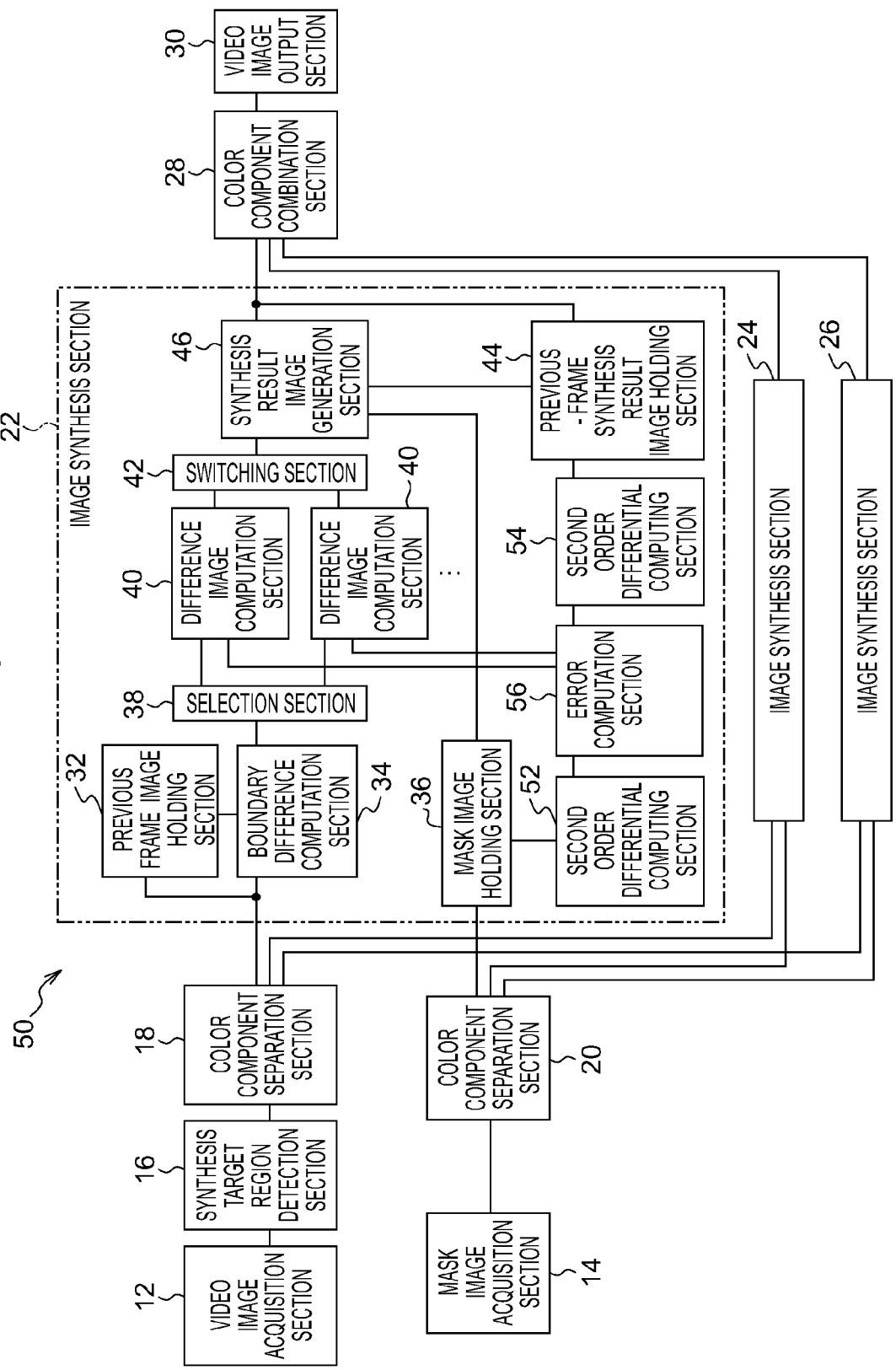
FIG. 11 is functional block diagram of an image processing apparatus according to a second exemplary embodiment.

An image processing apparatus 50 according to the second exemplary embodiment is illustrated in FIG. 11. In the image processing apparatus 50 according to the second exemplary embodiment, image synthesis sections 22, 24, 26 further include second order differential computing sections 52, 54 and an error computation section 56. The second order differential computing section 52 computes a second order differential image of a mask image S (Laplacian filter application values LS of the mask image S) based on the mask image S of the particular color component held by the mask image holding section 36. The second order differential computing section 54 computes a second order differential image of a synthesized result image F (Laplacian filter application values LF of the synthesized result image F) based on the synthesized result image F for the N−1$^{th}$ frame image held by a previous-frame synthesis result image holding section 44.

The error computation section 56 computes, as an error image, the difference between the second order differential image of the mask image S computed by the second order differential computing section 52 and the second order differential image of the N−1$^{th}$ frame synthesized result image F computed by the second order differential computing section 54. Note that the error computation section 56 is an example of an error computation section according to the technology disclosed herein, and the processing executed by the error computation section 56 is an example of error computing according to the technology disclosed herein.

In the second exemplary embodiment, the image synthesis process 86 of the mask synthesizing program 76 further includes a second order differential image computation process 108 and an error computation process 110, as illustrated by the dash lines in FIG. 2. In the second exemplary embodiment, the CPU 62 operates as each of the second order differential computing sections 52, 54 illustrated in FIG. 11 by executing the second order differential image computation process 108. In the second exemplary embodiment the CPU 62 operates as the error computation section 56 illustrated in FIG. 11 by executing the error computation process 110.

Figure 12:
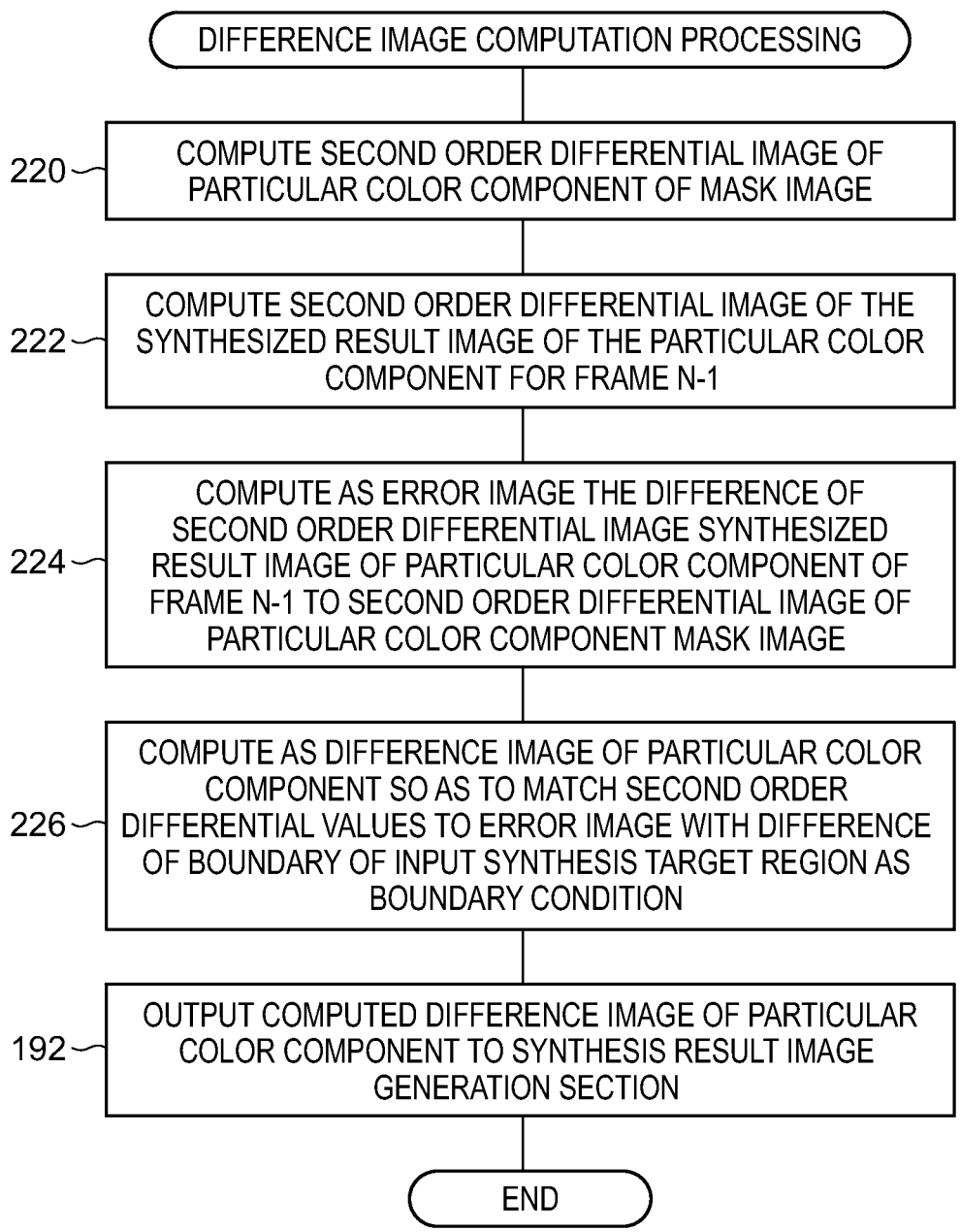
FIG. 12 is a flow chart illustrating an example of difference image computation processing according to the second exemplary embodiment.

Explanation follows regarding operation of the second exemplary embodiment, with reference to FIG. 12, for portions of the difference image computation processing according to the second exemplary embodiment that differ from the difference image computation processing explained for the first exemplary embodiment (FIG. 5). At step 220 of the difference image computation processing according to the second exemplary embodiment, the second order differential computing section 52 computes a second order differential image of the mask image S of the particular color component held in the mask image holding section 36 (the Laplacian filter application values LS of the mask image S) according to Equation (1).

Then, at step 222, the second order differential computing section 54 computes the second order differential image of the synthesized result image F for the N−1$^{th}$ frame image held in the previous-frame synthesis result image holding section 44 (the Laplacian filter application values LF of the synthesized result image F) according to Equation (4). At step 224, the error computation section 56 computes, as an error image E(x, y), the difference in the pixel values of the second order differential image of the synthesized result image F for the N−1$^{th}$ frame of the particular color component with respect to the second order differential image of the mask image S of the particular color component.

Then at step 226, the difference image computation section 40 computes a difference image D (x, y) of the particular color component that matches second order differential values to the error image E(x, y) computed by the error computation section 56, employing the boundary difference of the synthesis target region input from the selection section 38 as a boundary condition. Note that if the Laplacian filter application values of the error image E are denoted LE, then the above computation is represented by the following Equations (18) and (19).

$$LD(x, y)=LE(x, y) \qquad \text{Equation (18)}$$

$$LE(x, y)=E(x-1, y)+E(x+1, y)+E(x, y-1)+E(x, y+1)-4E(x, y) \qquad \text{Equation (19)}$$

In the first exemplary embodiment described above, after computing the synthesized result image F using the mask image S for the N=1 frame, the difference image D is then computed, and the difference image D is added to the synthesized result image F of the N−1$^{th}$ frame to compute the synthesized result image F for the N$^{th}$ frame. There is, therefore, a possibility of error accumulating with respect to the mask image S when the processing to compute the difference image D and to compute the synthesized result image F is repeated across plural frames.

Thus, in the second exemplary embodiment, as described above, the difference in the pixel values of the second order differential image of the synthesized result image F in the N−1$^{th}$ frame of the particular color component, with respect to the second order differential image of the mask image S of the particular color component, are computed as the error image E(x, y). Then the difference image D is derived such that second order differential values LD (x, y) of the difference image D match the second order differential values LE (x, y) of the error image E. Error with respect to the mask image S is thus suppressed from accumulating, and by obtaining a difference image D with smaller error, a synthesized result image F with smaller error is also obtained.

Note that in the second exemplary embodiment, the processing to compute the error image E, and the processing to derive the difference image D such that the second order differential values of the difference image D match the second order differential values of the error image E, may be performed for every frame of the video image, or may be performed each time a certain number of frames has been input. Moreover, a configuration may be adopted such that an evaluation value is computed to evaluate the magnitude of the difference in the boundary difference computed by the boundary difference computation section 34 and the above processing performed each time the computed evaluation value is a threshold value or greater.

Third Exemplary Embodiment

Explanation follows regarding a third exemplary embodiment of the technology disclosed herein. Note that portions similar to those of the first and the second exemplary embodiments are allocated the same reference numerals and further explanation thereof is omitted, with explanation only given of portions that differ from those of the first and the second exemplary embodiments.

Figure 13:
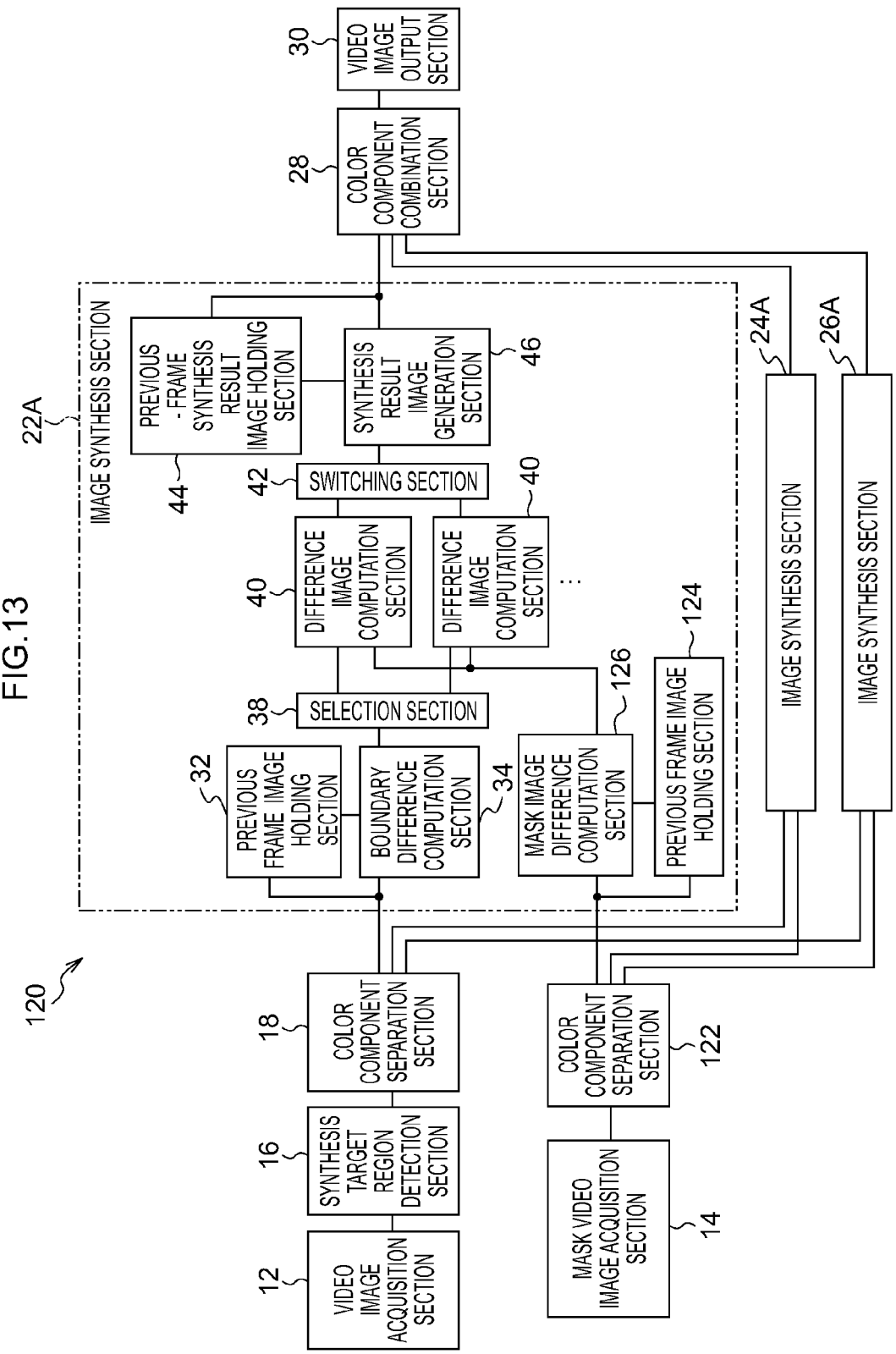
FIG. 13 is a functional block diagram of an image processing apparatus according to a third exemplary embodiment.

FIG. 13 illustrates an image processing apparatus 120 according to the third exemplary embodiment. The image processing apparatus 120 according to the third exemplary embodiment differs from the image processing apparatus 10 (FIG. 1) in that it is provided with a mask video image acquisition section 122 in place of the mask image acquisition section 14, and in the provision of a previous-frame image holding section 124 and a mask image difference computation section 126. Explanation has been given in the first and second exemplary embodiments of configurations in which each frame of a video image acquired by the video image acquisition section 12 is synthesized with the same mask image. However, in such cases, when, for example, the mask image is an image of a face region of a person, sometimes an unnatural video image results, such as a video image, after synthesis, of a person who does not blink.

Figure 18:
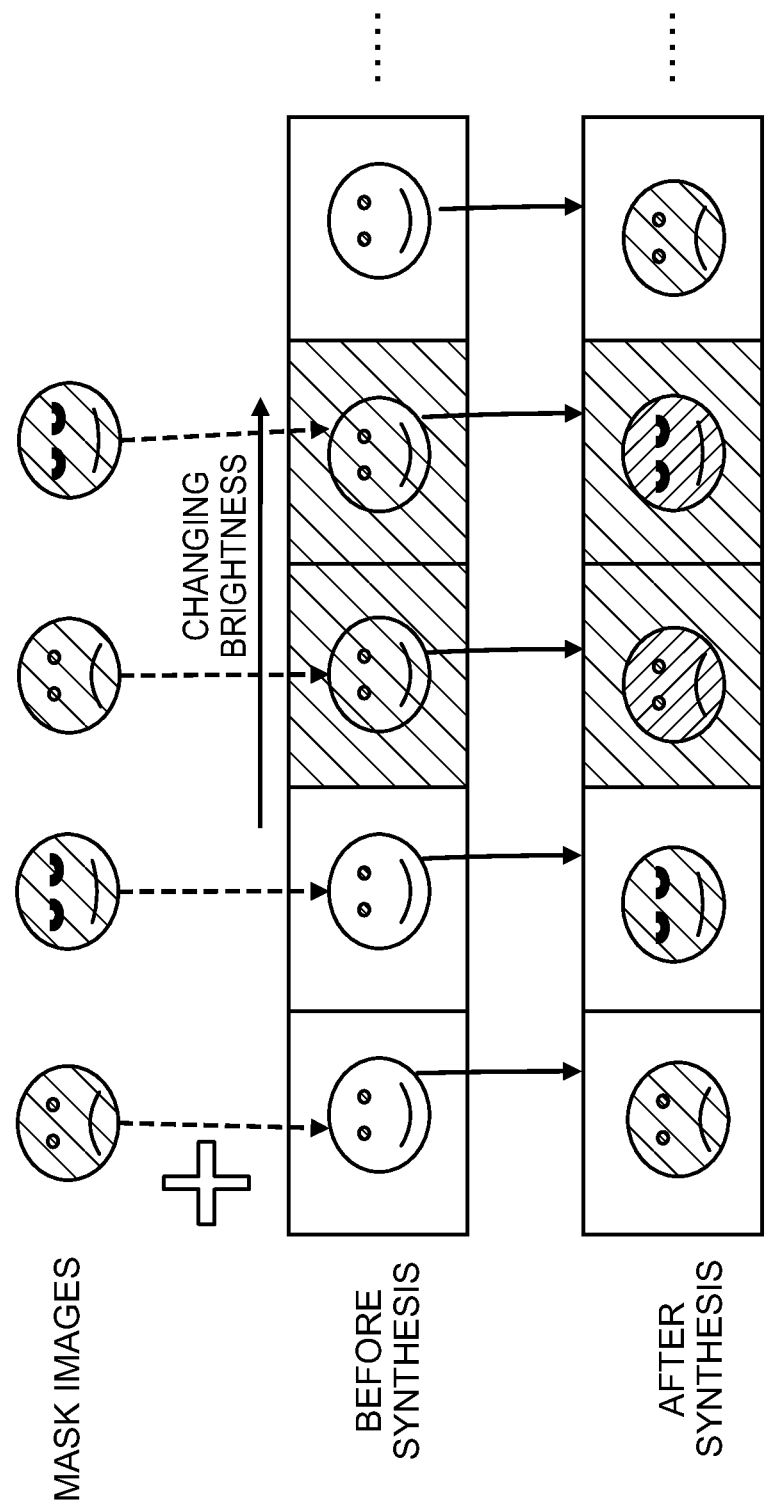
FIG. 18 is an image illustrating examples of a mask video image and synthesis of a mask video image.

Thus, in the third exemplary embodiment, as illustrated as an example in FIG. 18, a video image (mask video image) containing multiple frames is prepared as the mask image, and the image of respective frames of the mask video image is synthesized at respective frames of the video image acquired by the video image acquisition section 12. Note that when a video image of a face region of a person is applied as the mask video image, a video image may be applied as the mask video image in which, for example, there is periodic blinking (for example a video image of a few seconds to a few tens of seconds in length). In the third exemplary embodiment, the mask video image acquisition section 122 acquires the mask video image pre-stored, in a storage section, for example, in frame units. Note that when the length of the mask video image is shorter than the length of the video image acquired by the video image acquisition section 12, then the mask video image acquisition section 122 may repeatedly acquire the same mask video image in frame units.

Moreover, the previous-frame image holding section 124 is provided in each of image synthesis sections 22A to 26A. The previous-frame image holding section 124 holds, from among the mask images of the particular color component input from the color component separation section 20, the mask image for synthesizing at the N-1$^{th}$ frame image that is one frame previous to the N$^{th}$ frame image subject to processing. Note that the previous-frame image holding section 124 may be configured, for example, by a First-in First-out (FIFO) memory capable of holding, for example, 2 frames worth of image data.

The mask image difference computation section 126 is also provided in each of the image synthesis sections 22A, 24A, 26A. The mask image difference computation section 126 computes, for the respective particular color components, Laplacian filter application values (second order differential values) of a mask image for synthesizing at the N$^{th}$ frame image and Laplacian filter application values (second order differential values) of a mask image for synthesizing at an N-1$^{th}$ frame image. The difference image computation section 40 then computes, for the respective particular color components, the differences between the Laplacian filter application values (second order differential values) of a mask image for synthesizing at the N$^{th}$ frame image and the Laplacian filter application values (second order differential values) of a mask image for synthesizing at the N-1$^{th}$ frame image.

The difference image computation sections 40 of the third exemplary embodiment are each input with differences (boundary difference γ D) of the particular color component at the boundary of the synthesis target region, from the boundary difference computation section 34, and are input with differences in Laplacian filter application values of the particular color component of the mask image, from the mask image difference computation section 126. The difference image computation sections 40 generate by computation a difference image of the particular color component with a boundary condition of the difference γ D of the particular color component at the boundary of the synthesis target region, and difference LSd$_N$ of the Laplacian filter application values of the particular color component of the mask image as a gradient condition.

Figure 14:
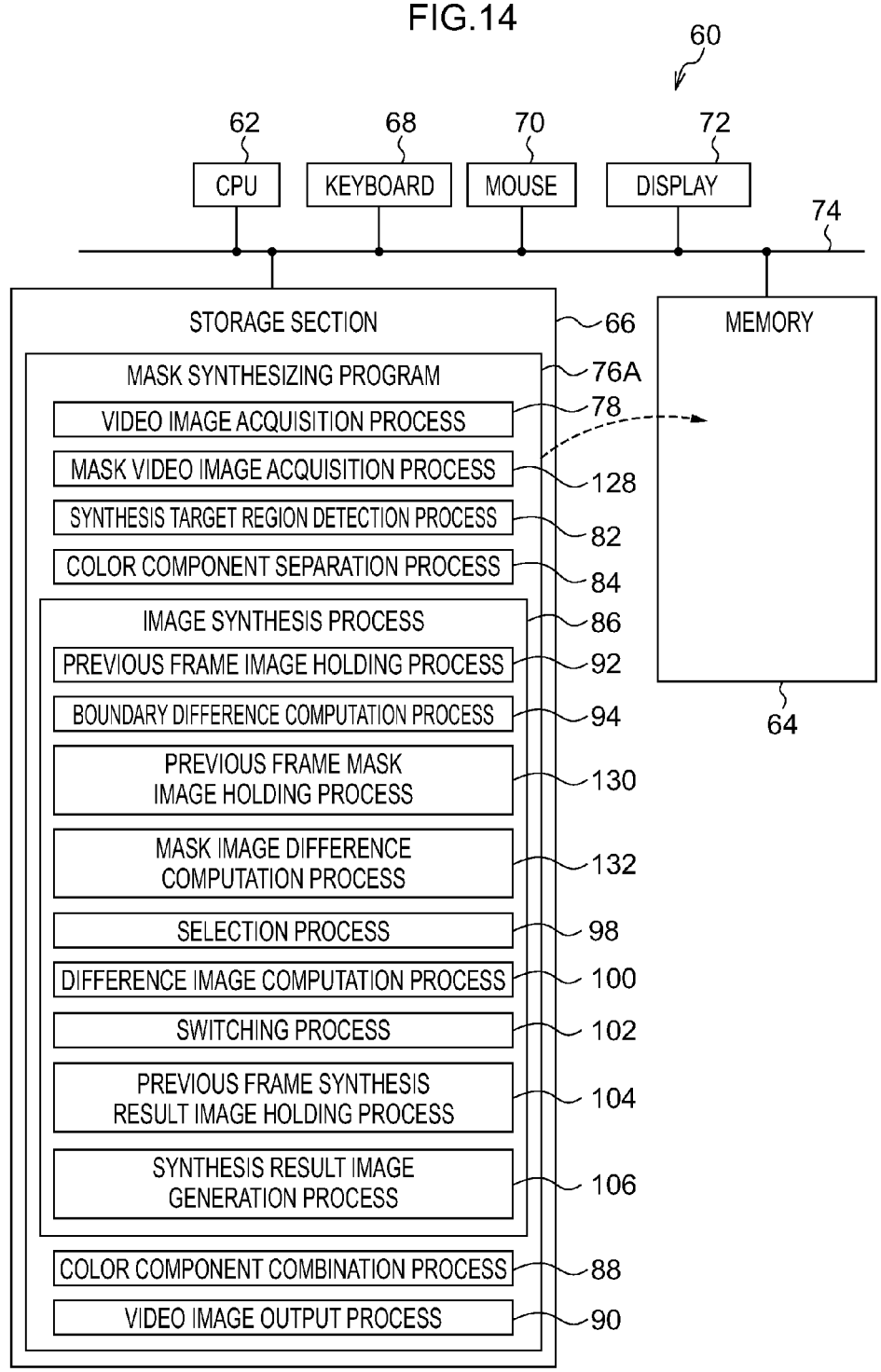
FIG. 14 a schematic block diagram of a computer that functions as the image processing apparatus of FIG. 13.

The image processing apparatus 120 may be implemented by the computer 60 illustrated in FIG. 14. A mask synthesizing program 76A for causing the computer 60 to function as the image processing apparatus 120 is stored in the storage section 66 of the computer 60 illustrated in FIG. 14. The CPU 62 reads the mask synthesizing program 76A from the storage section 66, expands the mask synthesizing program 76A into the memory 64, and sequentially executes the processes of the mask synthesizing program 76A.

The mask synthesizing program 76A includes a mask video image acquisition section 128 in place of the mask image acquisition process 80, and further includes a previous-frame mask image holding process 130, and a mask image difference computation process 132. The CPU 62 operates as the mask video image acquisition section 122 illustrated in FIG. 13 by executing the mask video image acquisition section 128. The CPU 62 operates as the previous-frame image holding section 124 illustrated in FIG. 13 by executing the previous-frame mask image holding process 130. The CPU 62 operates as the mask image difference computation section 126 illustrated in FIG. 13 by executing the mask image difference computation process 132. The computer 60 executing the mask synthesizing program 76A accordingly functions as the image processing apparatus 120. Note that the mask synthesizing program 76A is an example of an image processing program according to the technology disclosed herein.

Figure 15:
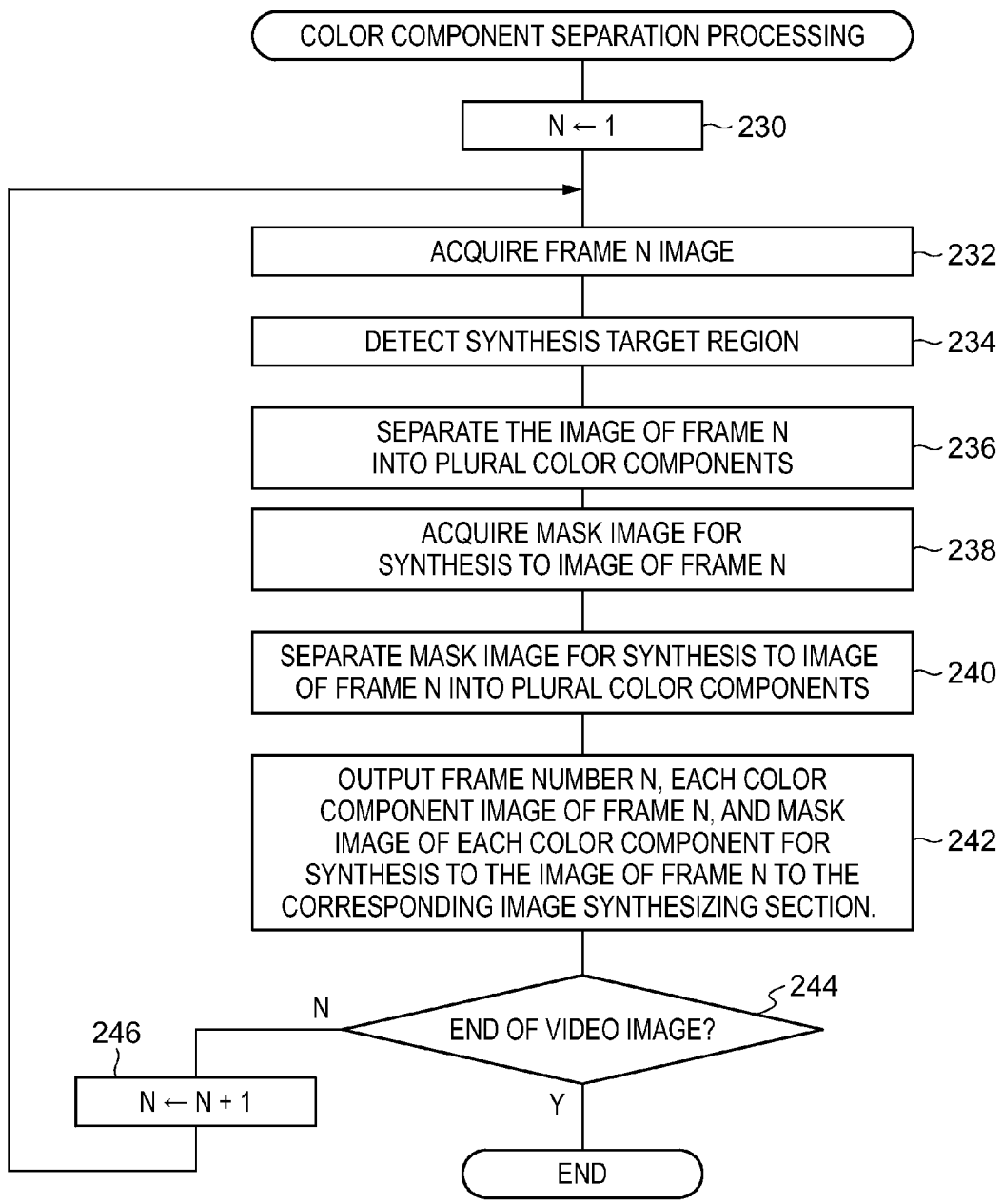
FIG. 15 is a flow chart illustrating an example of color component separation processing according to the third exemplary embodiment.

In the image processing apparatus 120 according to the third exemplary embodiment, the color component separation processing illustrated in FIG. 15 is executed by the video image acquisition section 12, the mask video image acquisition section 122, the synthesis target region detection section 16 and the two individual color component separation sections 18, 20.

At step 230 of the color component separation processing, the video image acquisition section 12 sets a variable N, for discriminating each frame of the video image specified as subject to processing, to 1. Then at step 232, the video image acquisition section 12 acquires the N$^{th}$ frame image from among the video images subject to processing. At step 234 the synthesis target region detection section 16 detects a synthesis target region in the N$^{th}$ frame image acquired by the video image acquisition section 12, and detects the position and size of the synthesis target region in the N$^{th}$ frame image.

Note that in cases in which a face region is applied as the synthesis target region, any appropriate method may be applied to detect the face region, such as a method employing a Haar classifier (see P. Viola et. al.). Moreover, there is no limitation of the detection of the synthesis target region using the synthesis target region detection section 16. For example, in cases of synthesizing a mask image only for some people out of plural people captured as subjects in a video image, configuration may be adopted such that a synthesis target region of a person subject to processing is specified at the beginning In such cases, the synthesis target region detection section 16 may be configured to perform processing to track the synthesis target region that was initially specified in the video image. At step 236, the color component separation section 18 separates the N$^{th}$ frame image acquired by the video image acquisition section 12 into plural respective color components.

At the next step 238, the mask video image acquisition section 122 acquires, from among mask video images pre-stored, for example, in the storage section 66, the mask image for synthesis at the image of the N$^{th}$ frame subject to processing. At step 240, the color component separation section 20 separates the mask image acquired by the mask video image acquisition section 122 into plural respective color components.

At step 242, the color component separation section 18 outputs the N$^{th}$ frame image for each respective color component together with the frame number N to each of the image synthesis sections 22A, 24A, 26A, and the color component separation section 20 outputs each of the respective color component mask images, to each of the image synthesis sections 22A, 24A, 26A. Note that the mask images of each of the color components output from the color component separation section 20 are held in the previous-frame image holding section 124 of each of the image synthesis sections 22A, 24A, 26A. Moreover, the N$^{th}$ frame image output from the color component separation section 18 is held in the previous-frame image holding section 32.

Next, at step 244, the video image acquisition section 12 determines whether or not all the frame images of the video image subject to processing have been acquired. Processing proceeds to step 246 when negative determination is made at step 244, and the video image acquisition section 12 increments the value of the variable N by 1 and then processing returns to step 232. The processing of step 232 to step 246 is accordingly repeated until affirmative determination is made at step 244. The color component separation processing is then ended when affirmative determination is made at step 244. According to the above color component separation processing, as illustrated as the "mask images" in FIG. 18, mask images that are not the same as each other (for example, respective images for frames of the mask video image in which there is periodic blinking) are acquired as the mask image corresponding to respective frames that are subjected to processing.

Figure 19:
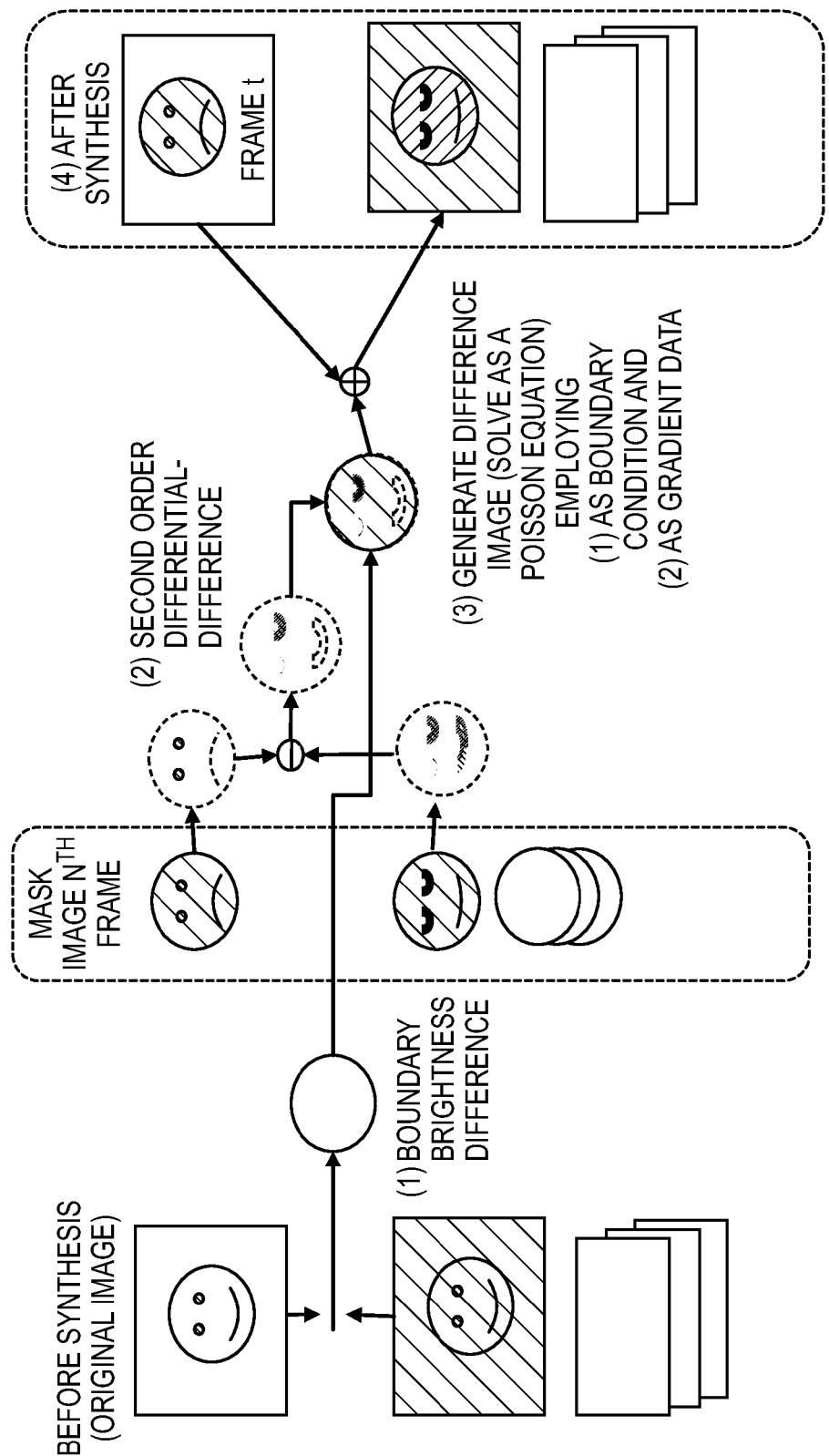
FIG. 19 is a schematic diagram to explain the generation of a synthesized result image.

Note that in the third exemplary embodiment, boundary difference computation processing (FIG. 4) executed by the boundary difference computation section 34 and the selection section 38 is similar to that of the first exemplary embodiment and so further explanation thereof is omitted (see also "(1) boundary brightness difference" illustrated in FIG. 19). Explanation next follows regarding mask image difference computation processing executed by the mask image difference computation section 126, with reference to FIG. 16.

At step 250 of the mask image difference computation processing, the mask image difference computation section 126 determines whether or not the value of the variable N is 2 or more. Since the value of the variable N is 1 at the start, negative determination is made at step 250 and the mask image difference computation processing is ended. In such cases, under instruction from the boundary difference computation section 34 at step 172 of the boundary difference computation processing (FIG. 4), a synthesized result image of a particular color component corresponding to the N(=1)$^{th}$ frame image is generated based on the mask image of the particular color component held in the previous-frame image holding section 124.

Affirmative determination is made at step 250 when the value of the variable N is 2 or greater, and processing proceeds to step 252. At step 252, the mask image difference computation section 126 retrieves data of the mask image $S_{N-1}$ of the particular color component corresponding to the N-1$^{th}$ frame held in the previous-frame image holding section 124. Then, at step 254, the mask image difference computation section 126 applies a Laplacian filter to the mask image of the particular color component corresponding to the N-1$^{th}$ frame, and computes a Laplacian filter application image (second order differential values) $LS_{N-1}$.

Then, at step 256, the mask image difference computation section 126 retrieves data of the mask image $S_N$ of the particular color component corresponding to the N$^{th}$ frame input from the color component separation section 20. Next, at step 258, the mask image difference computation section 126 applies a Laplacian filter to the mask image of the particular color component corresponding to the N$^{th}$ frame, and computes a Laplacian filter application image (second order differential values) $LS_N$.

Then, at step 260, the mask image difference computation section 126 computes the difference between the Laplacian filter application values of the mask image of the particular color component corresponding to the N-1$^{th}$ frame and the Laplacian filter application values of the mask image of the particular color component corresponding to the N$^{th}$ frame. A difference $LSd_N$ between the Laplacian filter application images of the two mask images of the particular color component can be computed according to the following Equation (20), wherein $LS_N$ is the Laplacian filter application image of the mask image $S_N$ and $LS_{N-1}$ is the Laplacian filter application image of the mask image $S_{N-1}$. Note that the computation of the following Equation (20) is an example of computation of the "(2) second order differential-difference" illustrated in FIG. 19.

$$LSd_N(x, y) = LS_N(x, y) - LS_{N-1}(x, y) \quad \text{Equation (20)}$$

Next, at step 262, the mask image difference computation section 126 selects, from among the plural difference image computation sections 40, one of the difference image computation sections 40 to which to output the difference $LSd_N$ of the Laplacian filter application values of the mask images of the particular color component. At step 262, the difference image computation section 40 to which is to be output the difference $LSd_N$ of the Laplacian filter application values of the mask images may be selected cyclically from among the plural difference image computation sections 40. At step 264, the mask image difference computation section 126 outputs the difference of the Laplacian filter application values of the mask images of the particular color component to the difference image computation section 40 selected at step 262, and the mask image difference computation processing is ended.

Figure 17:
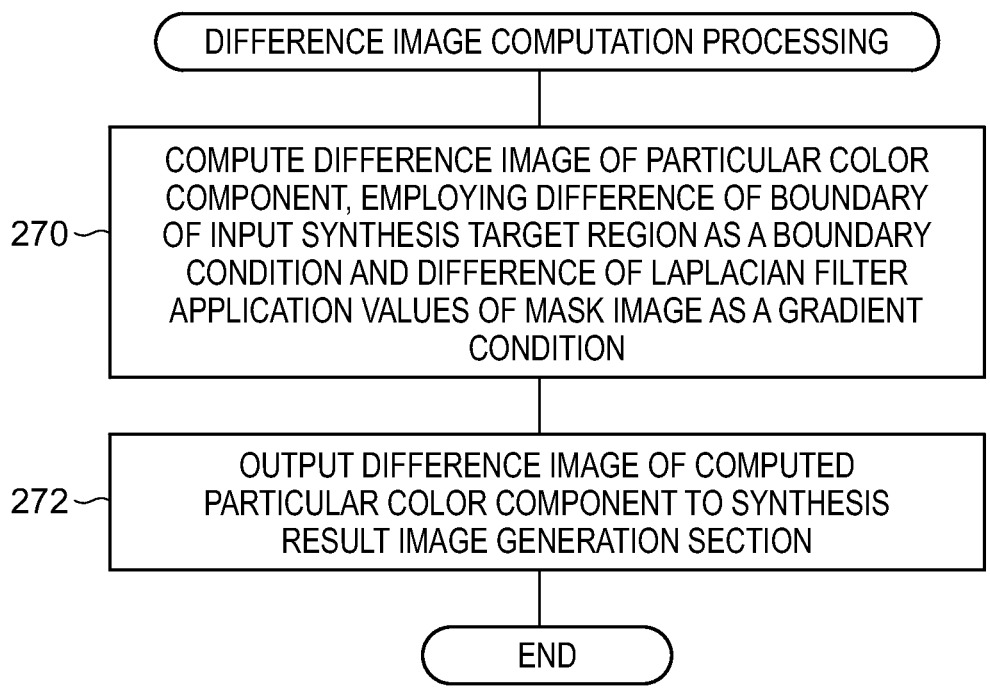
FIG. 17 is a flow chart illustrating an example of difference image computation processing according to the third exemplary embodiment.

In each of the image synthesis sections 22A, 24A, 26A of the image processing apparatus 120, the difference image computation processing illustrated in FIG. 17 is executed by the difference image computation sections 40 each time they are input with the boundary difference of the synthesis target region of the particular color component of the $N^{th}$ frame and the difference of the Laplacian filter application values of the mask images. In step 270, the difference image computation sections 40 compute a difference image $D_N$ (x, y) of the particular color component with boundary difference γ D of the input synthesis target region as a boundary condition (condition to preserve the pixel values of the boundary difference) and the input difference $LSd_N$ of the Laplacian filter application values of the mask images as a gradient condition. This computation can be computed by solving a Poisson equation with the boundary difference γ $D_N$ (x, y) of the synthesis target region employed as a boundary condition and the difference LSdN (x, y) of the Laplacian filter application values of the mask images as gradient data. A computation formula is illustrated in the following Equation (21) (see also "(3) generate difference image" as illustrated in FIG. 19).

$$D_N(x, y) = \{D_N(x-1, y) + D_N(x+1, y) + D_N(x, y-1) + D_N(x, y+1) - LSd_N(x, y))\}/4 \quad \text{Equation (21)}$$

Next, at step 272, the difference image computation section 40 then outputs, to the synthesis result image generation section 46, the computed difference image $D_N$ (x, y) of the particular color component, and the difference image computation processing is ended. In the synthesis result image generation section 46, the difference image $D_N$ of the $N^{th}$ frame is thus added to the synthesized result image $F_{N-1}$ of the N-1$^{th}$ frame to generate the synthesized result image $F_N$ of the $N^{th}$ frame (see also the following Equation (22)).

$$F_N(x, y) = F_{N-1}(x, y) + D_N(x, y) \quad \text{Equation (22)}$$

Consequently, as illustrated in FIG. 18 "after synthesis", a video image is obtained in which a mask image, for example, one in which there is periodic blinking, is synthesized at respective frames.

Accordingly, in the third exemplary embodiment, the difference image $D_N$ (x, y) between two successive image frames (the $N^{th}$ frame and the N-1$^{th}$ frame subject to processing) in the video image is computed without computing the synthesized result image by solving boundary conditions for each frame of the video image. By adding the computed difference image $D_N$ (x, y) to the synthesized result image $F_{N-1}$ (x, y) of the N-1$^{th}$ frame, the synthesized result image $F_N$ (x, y) of the $N^{th}$ frame subject to processing is computed (see also Equation (22)).

When this is performed, the difference image $D_N$ (x, y) includes a change in brightness between frames, and includes a change in characteristic between mask images. The brightness change between frames is the difference γ $D_N$ of the boundary pixels, and the change in characteristic between mask images is the difference $LSd_N$ of the Laplacian filter application values (gradient data) between the mask images according to Equation (20). Accordingly, a difference image $D_N$ (x, y) that satisfies the above two conditions can be computed by solving a Poisson equation with the difference γ $D_N$ of the boundary pixel values employed as the boundary condition and the difference $LSd_N$ of the gradient data as the second order differential characteristic (gradient condition). The difference image $D_N$ is an image that gets closer to 0 the smaller the difference γ $D_N$ of the boundary pixels between frames becomes, and the smaller the difference between mask images becomes, and so there is fast convergence of computation by computing with 0 as the initial value thereof. Consequently, computation of the difference image D is completed by the difference image computation sections 40 in a short period of time.

Moreover, plural of the difference image computation sections 40 are also provided in the third exemplary embodiment, and there is no need for the synthesized result image $F_{N-1}$ of the N-1$^{th}$ frame in order to compute the difference image $D_N$ corresponding to the $N^{th}$ frame image. In the third exemplary embodiment, it is therefore also possible to perform the computation of the difference image $D_N$ corresponding to each frame of the video image with plural difference image computation sections 40 configured in parallel to each other, thereby enabling the processing of the synthesized result images F for the respective frames to be performed as a pipeline. It is thus possible to output images for each of the frames in which the mask images are synthesized in synchronization with the input frame rate of the video image to the image processing apparatus 10, enabling real time processing to be achieved.

Fourth Exemplary Embodiment

Explanation follows regarding a fourth exemplary embodiment of the technology disclosed herein. Note that the fourth exemplary embodiment is configured similarly to the third exemplary embodiment, hence similar portions are allocated with the same reference numerals and further explanation omitted. Explanation follows regarding operation of the fourth exemplary embodiment.

Figure 16:
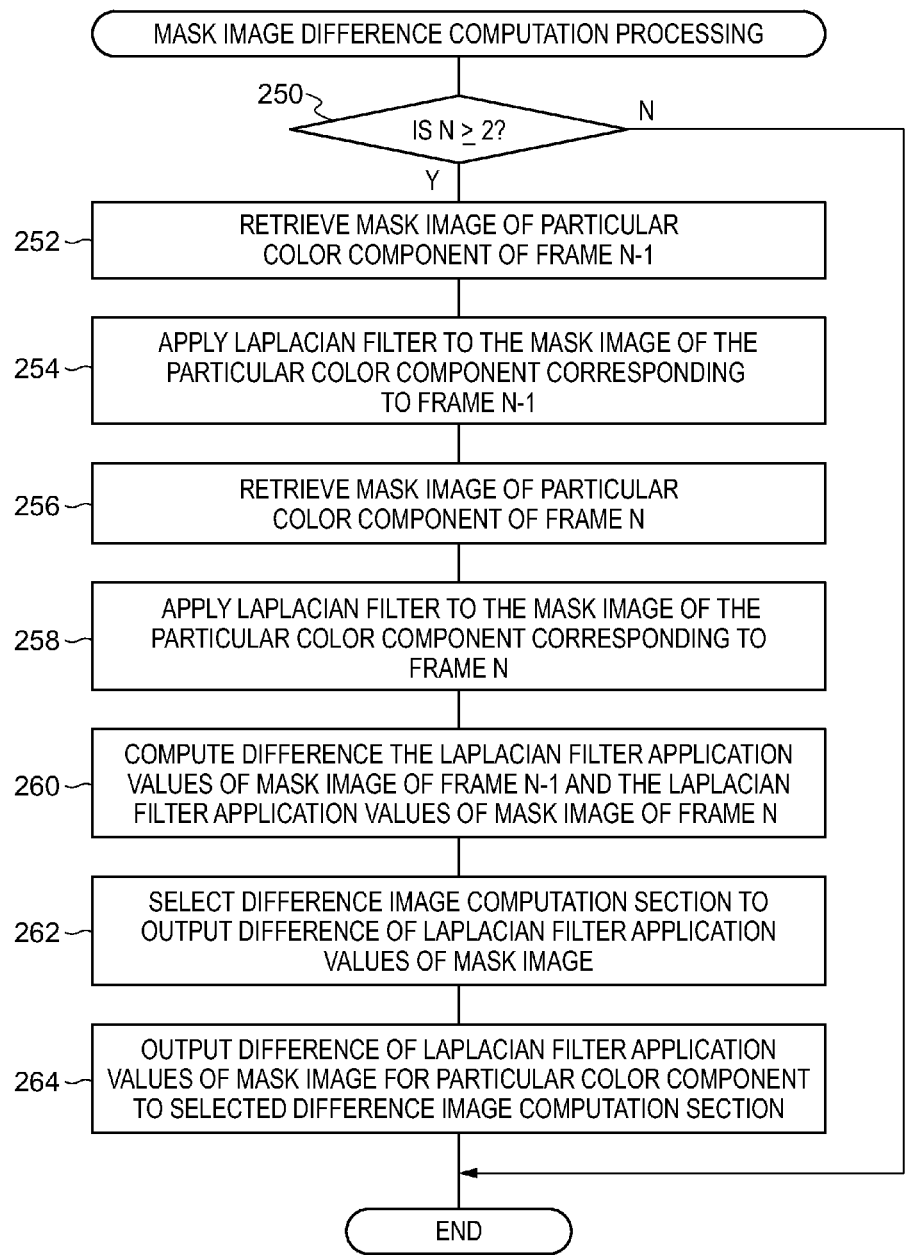
FIG. 16 is flow chart illustrating an example of mask image difference computation processing according to the third exemplary embodiment.
Figure 20:
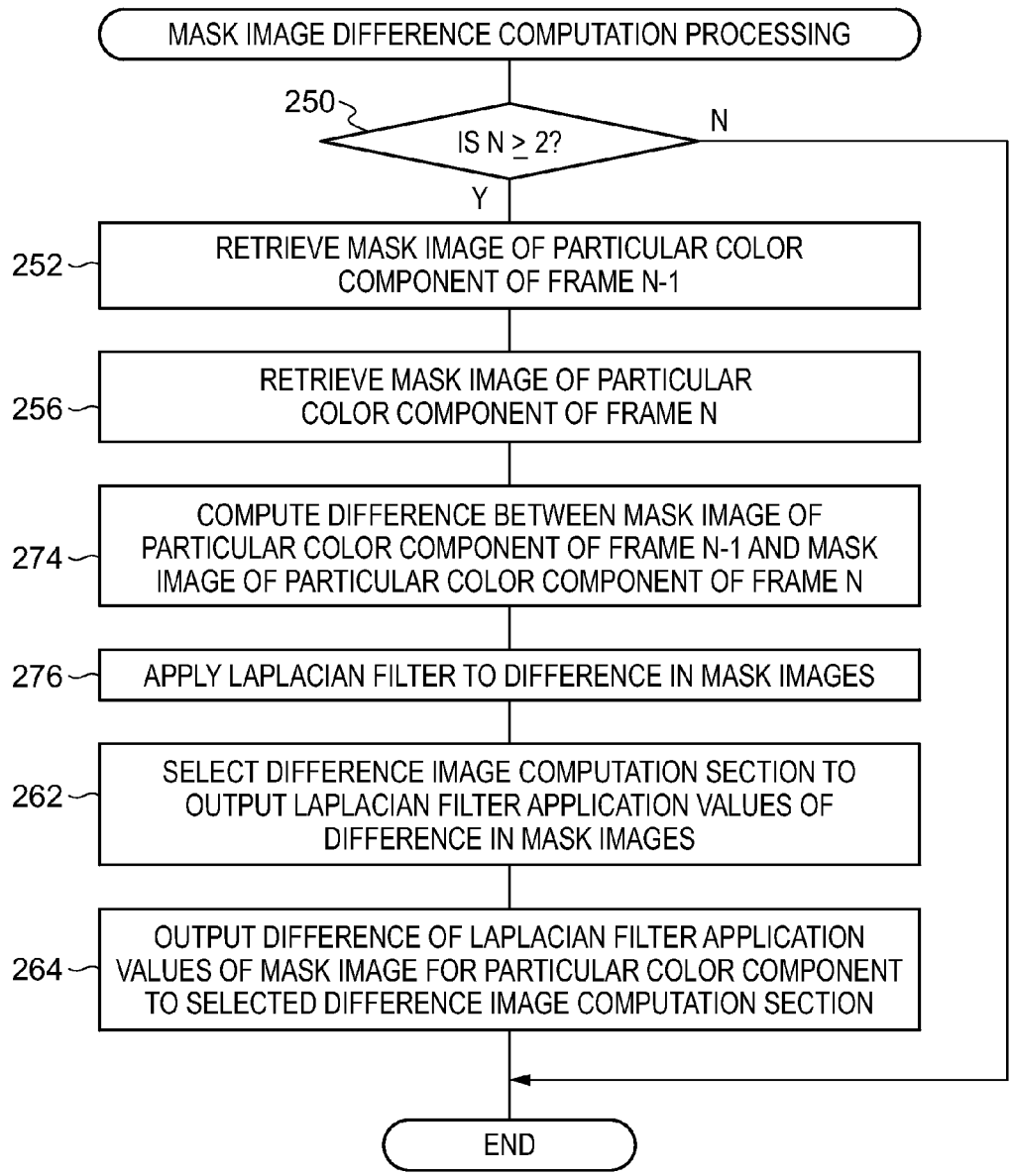
FIG. 20 is a flow chart illustrating mask image difference computation processing according to a fourth exemplary embodiment.

In the fourth exemplary embodiment, the mask image difference computation processing illustrated in FIG. 20 is performed in place of the mask image difference computation processing explained for the third exemplary embodiment (FIG. 16). At step 250 of the mask image difference computation processing according to the fourth exemplary embodiment, the mask image difference computation section 126 determines whether or not the value of the variable N is 2 or more. Since the value of the variable N is 1 at the start, negative determination is made at step 250 and the mask image difference computation processing is ended. In such cases, under instruction from the boundary difference computation section 34 at step 172 of the boundary difference computation processing (FIG. 4), a synthesized result image of a particular color component corresponding to the N(=1)$^{th}$ frame image is generated based on the mask image of the particular color component held in the previous-frame image holding section 124.

Affirmative determination is made at step 250 when the value of the variable N is 2 or greater, and processing proceeds to step 252. At step 252, the mask image difference computation section 126 retrieves data of the mask image $S_{N-1}$ of the particular color component corresponding to the N-1$^{th}$ frame held in the previous-frame image holding section 124. Then, at step 256, the mask image difference computation section 126 retrieves data of the mask image $S_N$ of the particular color component corresponding to the $N^{th}$ frame input from the color component separation section 20.

Next, at step 274, the mask image difference computation section 126 computes a difference between the mask image $S_{N-1}$ of the particular color component corresponding to the N-1$^{th}$ frame and the mask image $S_N$ of the particular color component corresponding to the $N^{th}$ frame. Then, at step 276, the mask image difference computation section 126 applies a Laplacian filter to the difference in the mask images of the particular color component between the N-1$^{th}$ frame and the $N^{th}$ frame, and computes the Laplacian filter application image $LSd_N$ (see the following Equation (23)).

$$LSd_N(x, y)=L(S_N(x, y)-S_{N-1}(x, y))\qquad\text{Equation (23)}$$

The processing for step 262 onwards is similar to the mask image difference computation processing explained for the third exemplary embodiment, and so further explanation is omitted.

Figure 21:
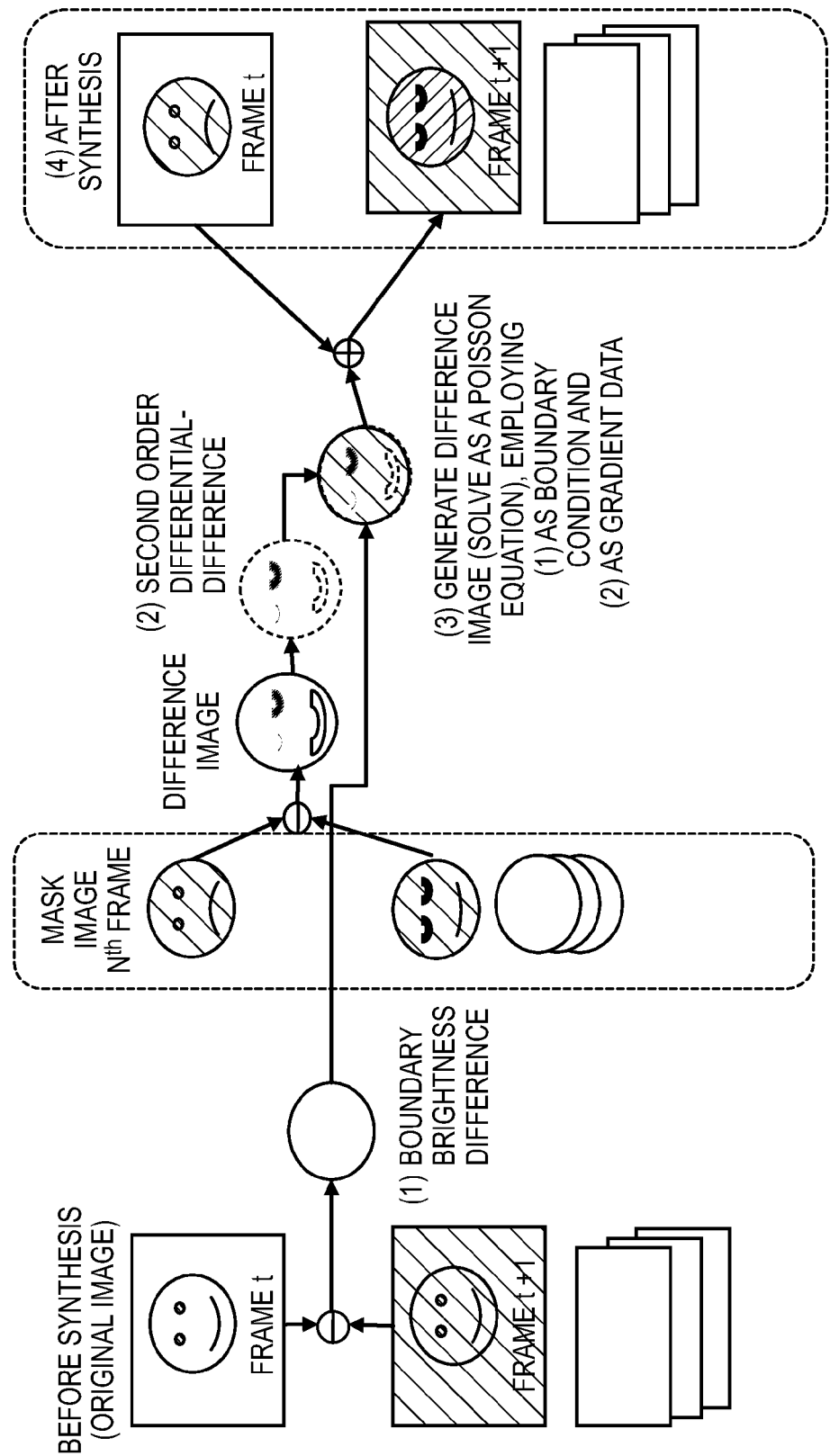
FIG. 21 is a schematic diagram to explain the generation of a synthesized result image including the mask image difference computation processing of FIG. 20.

In the third exemplary embodiment described above, the respective Laplacian filter application values LS were computed for the mask image of the particular color component corresponding to the $N-1^{th}$ frame and the mask image of the particular color component corresponding to the $N^{th}$ frame, and then a difference was computed therefrom. However, in contrast thereto, in the fourth exemplary embodiment, as illustrated in FIG. 21, first a difference is computed between the mask image of the particular color component corresponding to the $N-1^{th}$ frame and the mask image of the particular color component corresponding to the $N^{th}$ frame, and then Laplacian filter application values are computed for the computed difference. So doing enables the number of times of Laplacian filter application value computation to be reduced in comparison to the configuration of the third exemplary embodiment explained above, thereby enabling the computational load to be reduced.

Fifth Exemplary Embodiment

Explanation follows regarding a fifth exemplary embodiment of the technology disclosed herein. Note that portions similar to those of the third exemplary embodiment and the fourth exemplary embodiment are allocated the same reference numerals and further explanation is omitted. Explanation follows regarding only those portions that differ from those of the third exemplary embodiment and the fourth exemplary embodiment.

Figure 22:
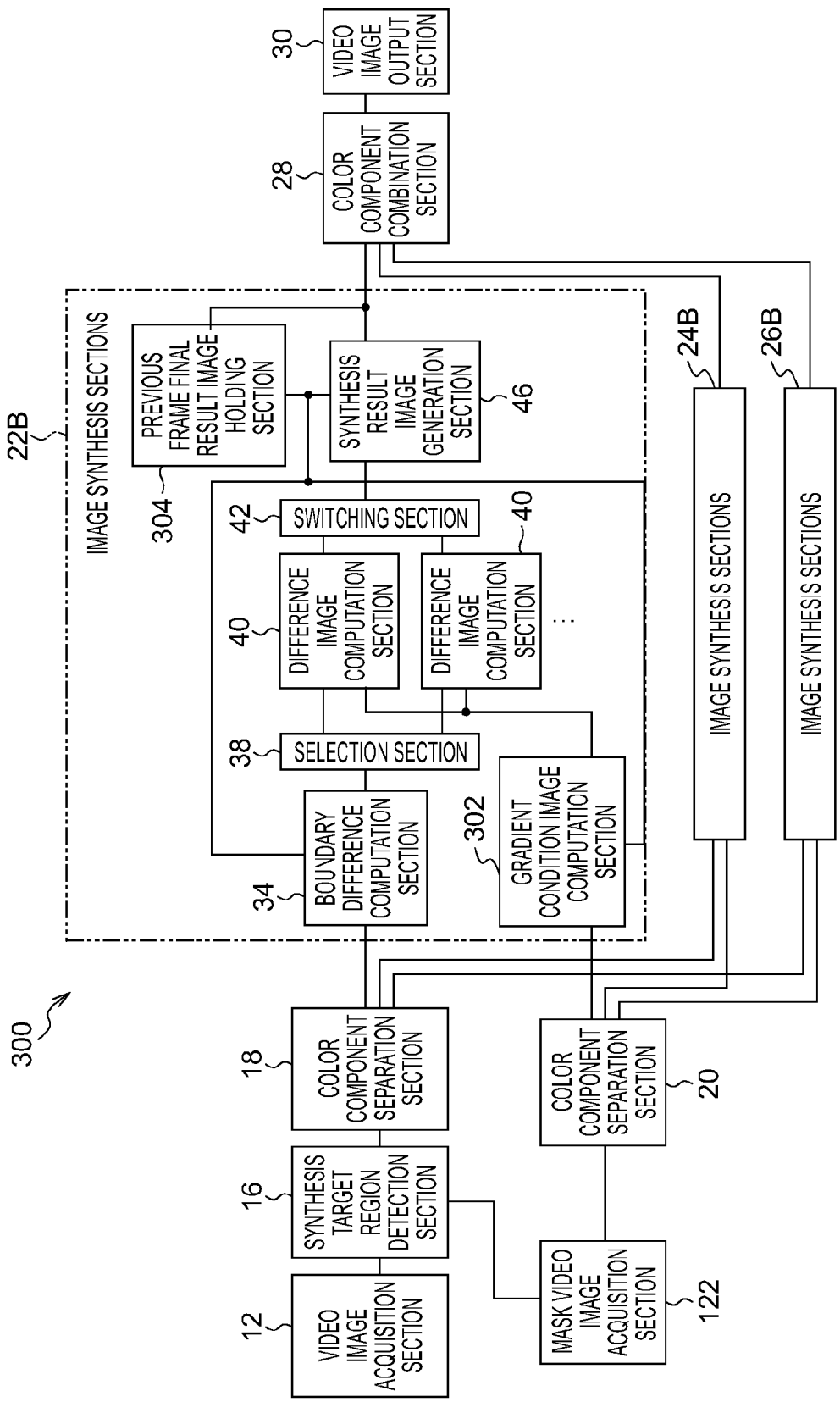
FIG. 22 is a functional block diagram of an image processing apparatus according to a fifth exemplary embodiment.

FIG. 22 illustrates an image processing apparatus 300 according to the fifth exemplary embodiment. The image processing apparatus 300 of the fifth exemplary embodiment differs with respect to the image processing apparatus 120 (FIG. 13) in that the previous-frame image holding section 32 and the previous-frame image holding section 124 are omitted, and in that a gradient condition image computation section 302 is provided. Moreover, the image processing apparatus 300 according to the fifth exemplary embodiment differs with respect to the image processing apparatus 120 (FIG. 13) in that a previous-frame final result image holding section 304 is provided in place of the previous-frame synthesis result image holding section 44.

In the third exemplary embodiment and the fourth exemplary embodiment described above, explanation has been given of configurations in which it is presupposed that the synthesis target regions in each of the frames of the video image acquired by the video image acquisition section 12 are of a fixed shape, and an image of respective frames of a mask video image is synthesized at the respective frames of the video image. However, in cases in which, for example, the synthesis target region is a face region of a person, the actual shape of the synthesis target region within each of the frames changes due to such factors as the direction the person is facing, and so an unnatural video image results when a fixed shape synthesis target region is employed.

Figure 29:
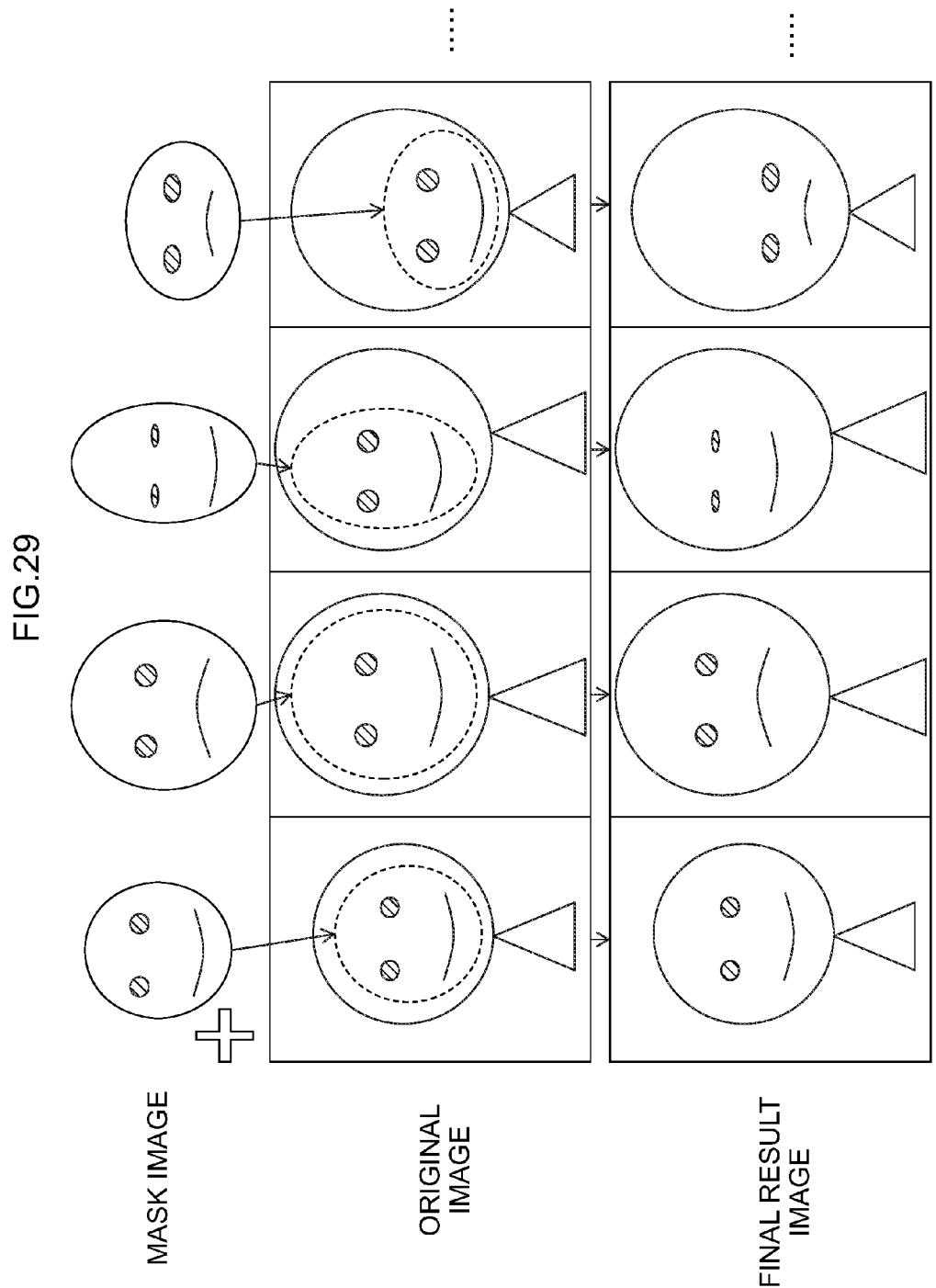
FIG. 29 is an image illustrating examples of a mask image, an original image and a final result image in the fifth exemplary embodiment.

Therefore, in the fifth exemplary embodiment, similarly to in the third exemplary embodiment and the fourth exemplary embodiment, a mask video image is prepared as the mask image, and then, as illustrated as an example in FIG. 29, plural types of mask video image are also prepared with different outline-frame shapes. Then, in the fifth exemplary embodiment, the shape of the synthesis target region in each of the frames of the video image is detected by the synthesis target region detection section 16, and a mask video image of the outline-frame shape that matches the shape of the detected synthesis target region is selected and acquired by the mask video image acquisition section 122.

The boundary difference computation section 34 computes a difference value of a particular color component between a first boundary of the $N^{th}$ frame image of the video image and a second boundary of the $N-1^{th}$ frame image of the video image. In the fifth exemplary embodiment, the first boundary is a boundary corresponding to the outer edge of the synthesis target region present in the $N^{th}$ frame image. The second boundary is a boundary that has the same shape as the first boundary but is present in the final result image in which the synthesized result image of the $N-1^{th}$ frame image has been substituted for the image of the synthesis target region present in the $N-1^{th}$ frame image (see also FIG. 30). Note that the synthesized result image of the $N-1^{th}$ frame image is held in the previous-frame final result image holding section 304, and is supplied to the boundary difference computation section 34.

Moreover, the gradient condition image computation section 302 derives, as a gradient condition image, a difference between the second order differential values of the mask image for synthesis to the $N^{th}$ frame of the video image and the second order differential values of the image that has a second boundary of the same shape as the first boundary in the final result image of the $N-1^{th}$ frame. Note that the synthesized result image of the $N-1^{th}$ frame image is also supplied from the previous-frame final result image holding section 304 to the gradient condition image computation section 302.

Figure 23:
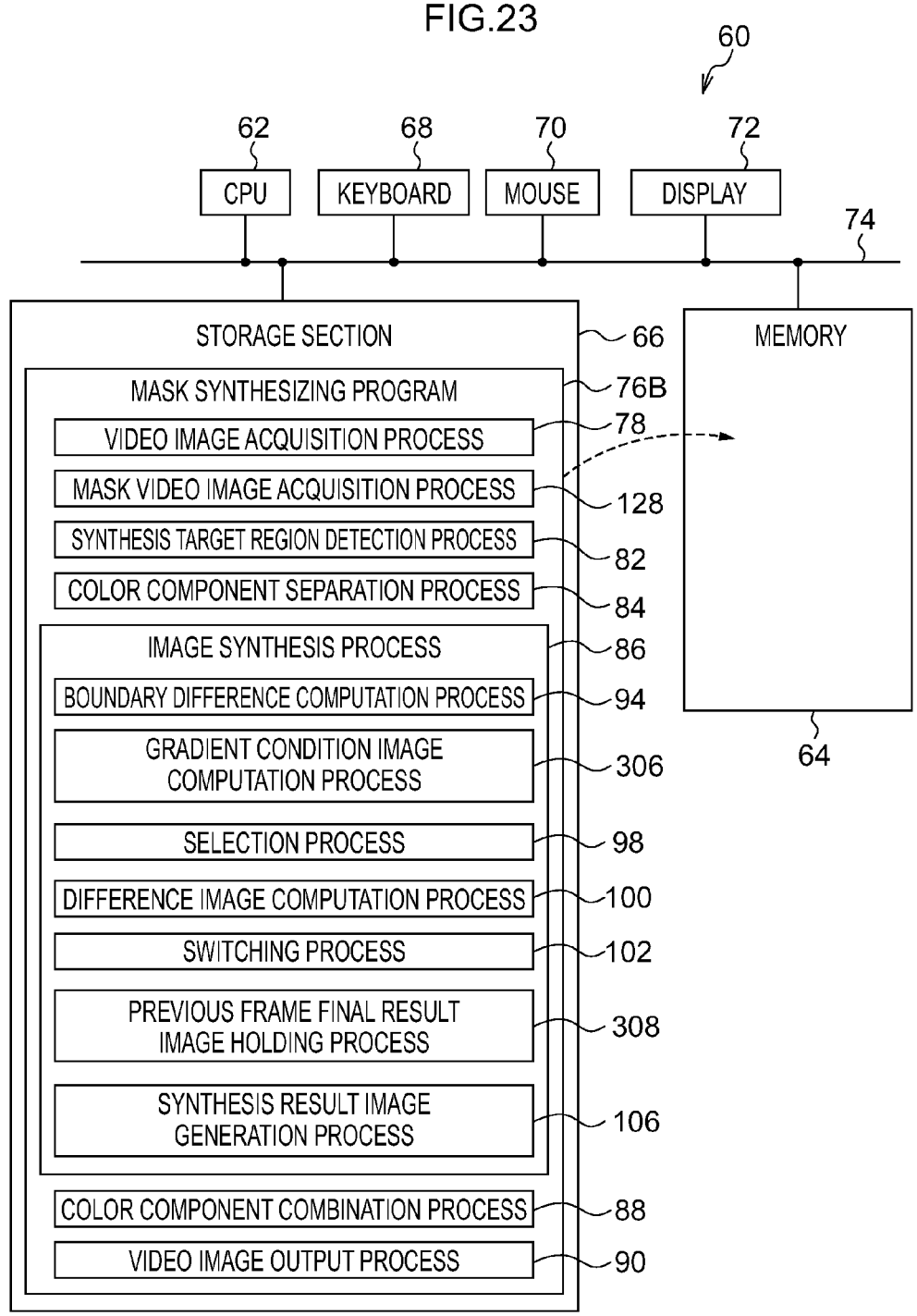
FIG. 23 is a schematic block diagram of a computer that functions as the image processing apparatus of FIG. 22.

The image processing apparatus 300 may, for example, be implemented by the computer 60 illustrated in FIG. 23. A mask synthesizing program 76B for causing the computer 60 to function as the image processing apparatus 300 is stored in the storage section 66 of the computer 60 illustrated in FIG. 23. The CPU 62 reads the mask synthesizing program 76B from the storage section 66, expands the mask synthesizing program 76B into the memory 64, and sequentially executes the processes of the mask synthesizing program 76B.

The mask synthesizing program 76B, in comparison to the mask synthesizing program 76A, omits the previous-frame image holding process 92 and the previous-frame mask image holding process 130, and includes a gradient condition image computation process 306 in place of the mask image difference computation process 132. The mask synthesizing program 76B also includes a previous-frame final result image holding process 308 in place of the previous-frame synthesis result image holding process 104. The CPU 62 operates as the gradient condition image computation section 302 illustrated in FIG. 22 by executing the gradient condition image computation process 306. The CPU 62 operates as the previous-frame final result image holding section 304 illustrated in FIG. 22 by executing the previous-frame final result image holding process 308. The computer 60 executing the mask synthesizing program 76B accordingly functions as the image processing apparatus 300. Note that the mask synthesizing program 76B is an example of an image processing program according to the technology disclosed herein.

Figure 24:
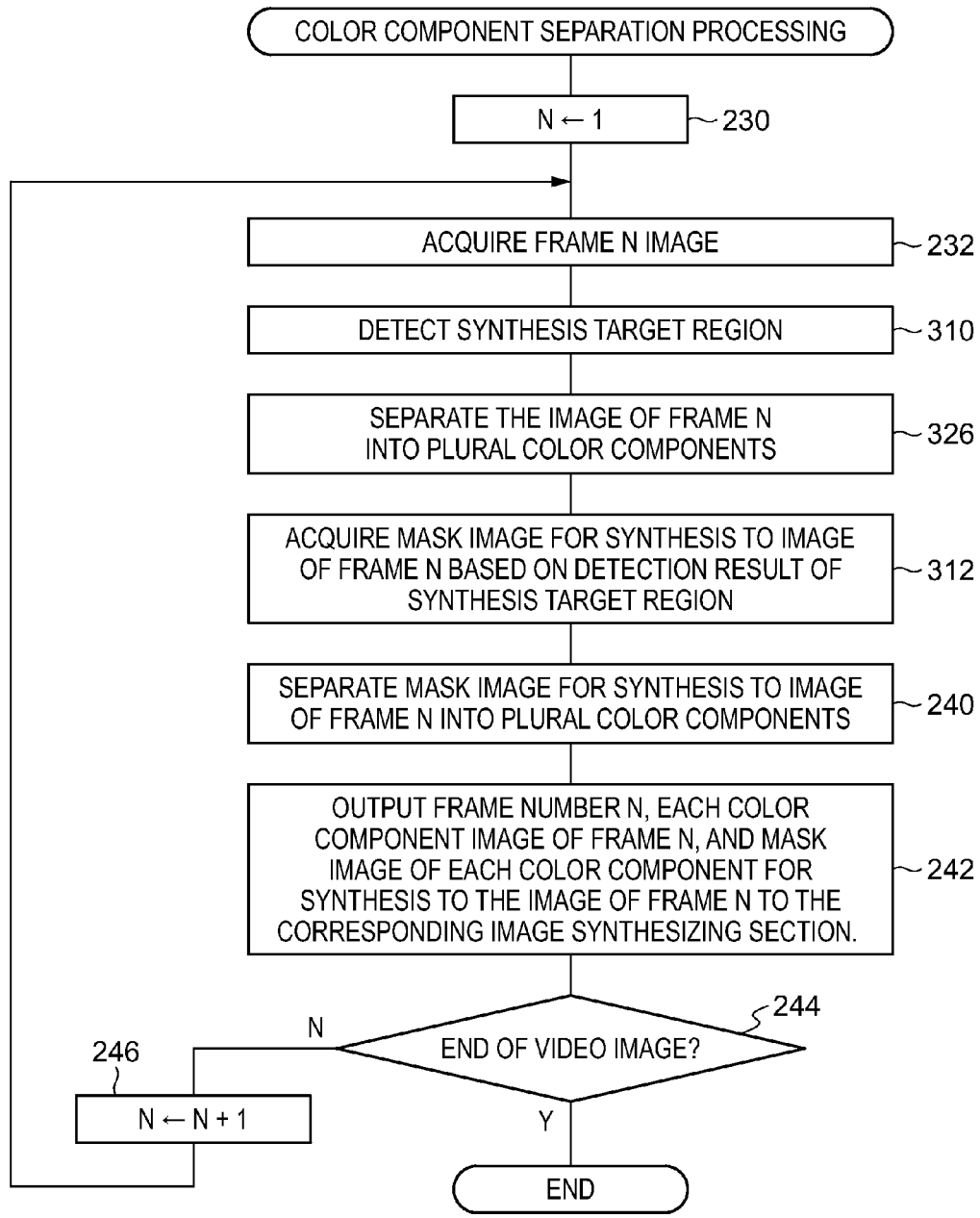
FIG. 24 is a flow chart illustrating an example of color component separation processing according to the fifth exemplary embodiment.

In the image processing apparatus 300 according to the fifth exemplary embodiment, the color component separation processing illustrated in FIG. 24 is executed by the video image acquisition section 12, the mask video image acquisition section 122, the synthesis target region detection section 16 and two individual color component separation sections 18, 20. In the following, explanation mainly focuses on the portions of the color component separation processing illustrated in FIG. 24 that differ from those of the color component separation processing explained for the third exemplary embodiment (FIG. 15).

At step 230 of the color component separation processing, the video image acquisition section 12 sets a variable N, for discriminating each frame of the video image specified as subject to processing, to 1. Then, at step 232, the video image acquisition section 12 acquires the $N^{th}$ frame image from among the video images to be subjected to processing. Next, at step 310, the synthesis target region detection section 16 detects a synthesis target region in the $N^{th}$ frame image acquired by the video image acquisition section 12, and detects the shape, in addition to the position and size, of the synthesis target region in the $N^{th}$ frame image. At step 236, the color component separation section 18 separates the image of the $N^{th}$ frame acquired by the video image acquisition section 12 into plural respective color components.

The position, size and shape of the synthesis target region detected by the synthesis target region detection section 16 is supplied to the mask video image acquisition section 122. Next, at step 312, the mask video image acquisition section 122 acquires, from among mask video images pre-stored, for example, in the storage section 66, a mask image for synthesizing at the image of the $N^{th}$ frame subject to processing. Note that the mask video image acquisition section 122, when acquiring the mask image, selects and acquires the mask video image of an outline-frame shape that matches the shape of the synthesis target region detected by the synthesis target region detection section 16.

Note that processing from the next step 240 onwards is similar to the color component separation processing explained in the third exemplary embodiment (FIG. 15) and so further explanation is omitted.

Figure 25:
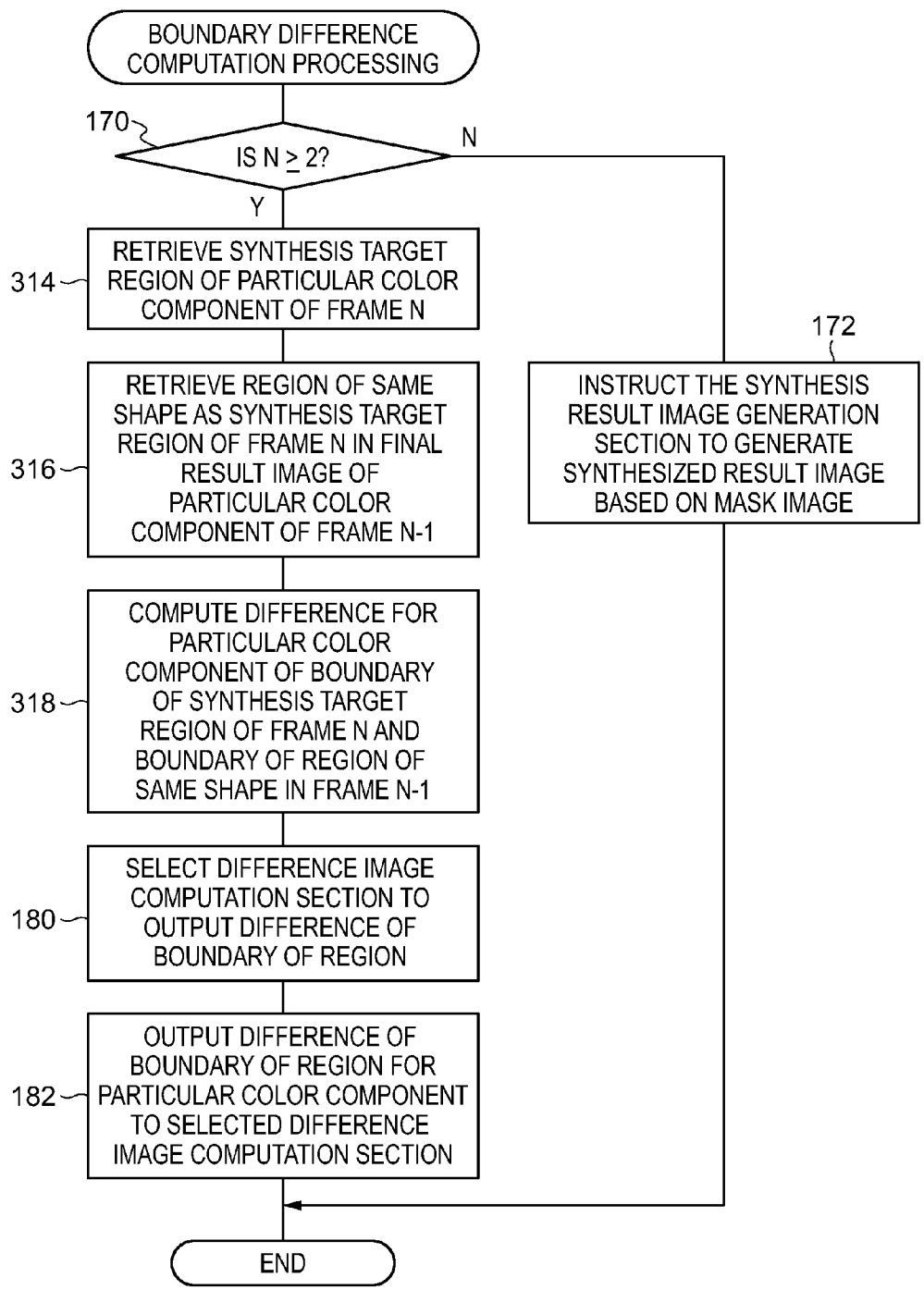
FIG. 25 is a flow chart illustrating an example of boundary difference computation processing according to the fifth exemplary embodiment.

Moreover, in each of image synthesis sections 22B, 24B, 26B of the image processing apparatus 300 according to the fifth exemplary embodiment, the boundary difference computation processing illustrated in FIG. 25 is executed by the boundary difference computation section 34 and the selection section 38 each time the image of the particular color component of the $N^{th}$ frame is input from the color component separation section 18. Explanation follows regarding the boundary difference computation processing illustrated in FIG. 25, mainly focusing on the portions that differ from the boundary difference computation processing explained in the first exemplary embodiment (FIG. 4).

Figure 30:
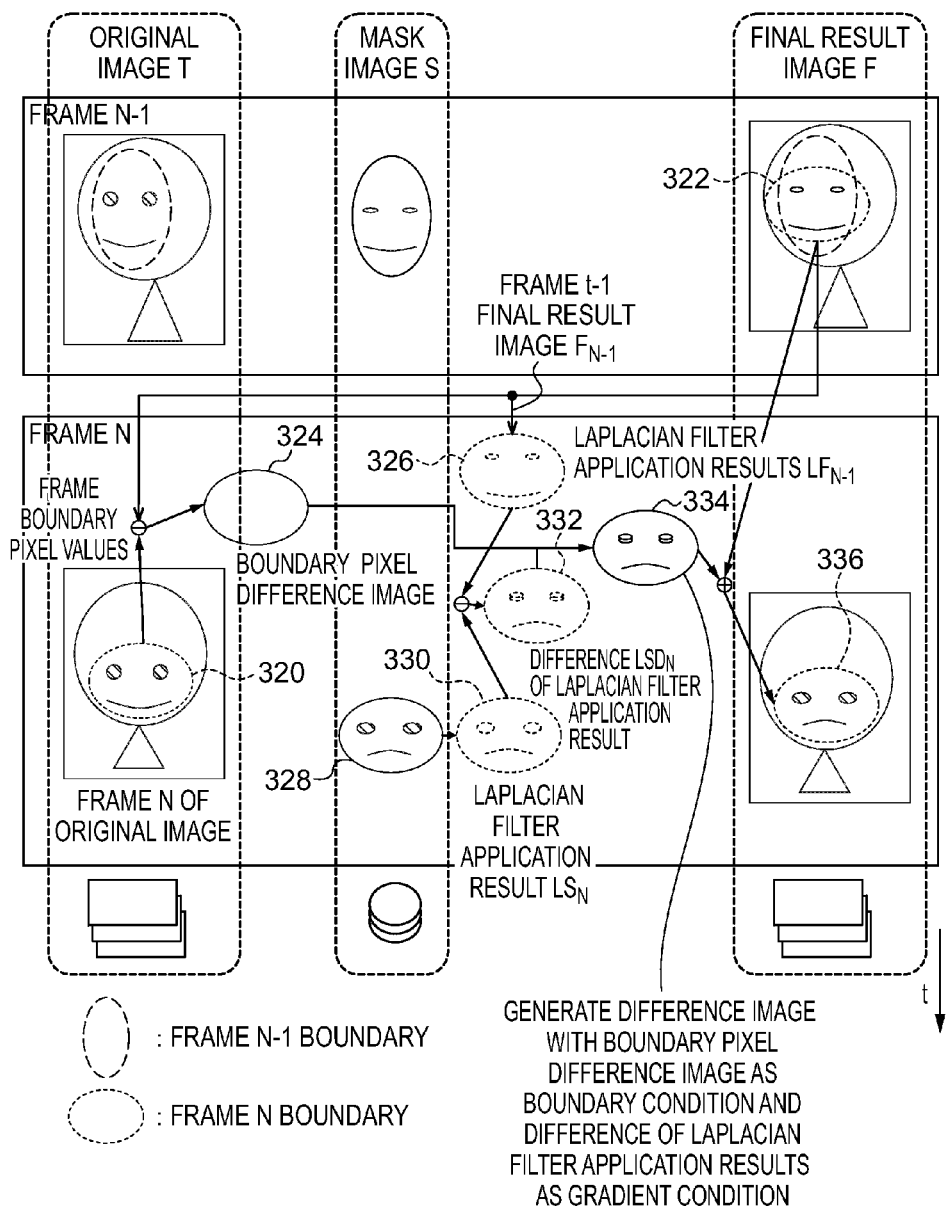
FIG. 30 is schematic diagram to explain the generation of a synthesized result image of the fifth exemplary embodiment.

At step 170 of the boundary difference computation processing, the boundary difference computation section 34 determines whether or not the value of the variable N is 2 or more. Affirmative determination is made at step 170 when the value of the variable N is 2 or greater, and processing proceeds to step 314. At step 314, the boundary difference computation section 34 retrieves data of the synthesis target region detected by the synthesis target region detection section 16 from the particular color component image of the $N-1^{th}$ frame input by the color component separation section 18. The data of the region appended with the reference numeral "320" illustrated in FIG. 30 is retrieved thereby.

Then, in the next step 316, the boundary difference computation section 34 retrieves data of a region that has the same shape as the synthesis target region of the $N^{th}$ frame, in the final result image of the particular color component of the $N-1^{th}$ frame held in the previous-frame final result image holding section 304. Data is accordingly retrieved of a region appended with the reference numeral "322" in FIG. 30, irrespective of the relationship of this region to the shape of the synthesis target region in the $N-1^{th}$ frame.

At step 318, the boundary difference computation section 34 computes the difference (boundary difference $\gamma D_N(x, y)$) in pixel values between the boundary of the synthesis target region in the $N^{th}$ frame image and the boundary of region with the same shape as the synthesis target region of the $N^{th}$ frame in the final result image of the $N-1^{th}$ frame. Note that the boundary difference $\gamma D_N(x, y)$ can be computed according to the following Equation (24), wherein the boundary of the synthesis target region in the $N^{th}$ frame image is denoted $\gamma T_N(x, y)$, and the boundary of the region in the final result image of the $N-1^{th}$ frame with the same shape as the synthesis target region in the $N^{th}$ frame image is denoted $\gamma F_{N-1}(x, y)$.

$$\gamma D_N(x, y) = \gamma T_N(x, y) - \gamma F_{N-1}(x, y) \qquad \text{Equation (24)}$$

By performing processing to compute the Equation (24), data of the boundary image difference image (boundary difference $\gamma D_N(x, y)$) is obtained as illustrated appended with the reference numeral "324" in FIG. 30.

Note that since processing from the next step 180 onwards is similar to the boundary difference computation processing explained for the first exemplary embodiment (FIG. 4) further explanation is omitted.

Figure 26:
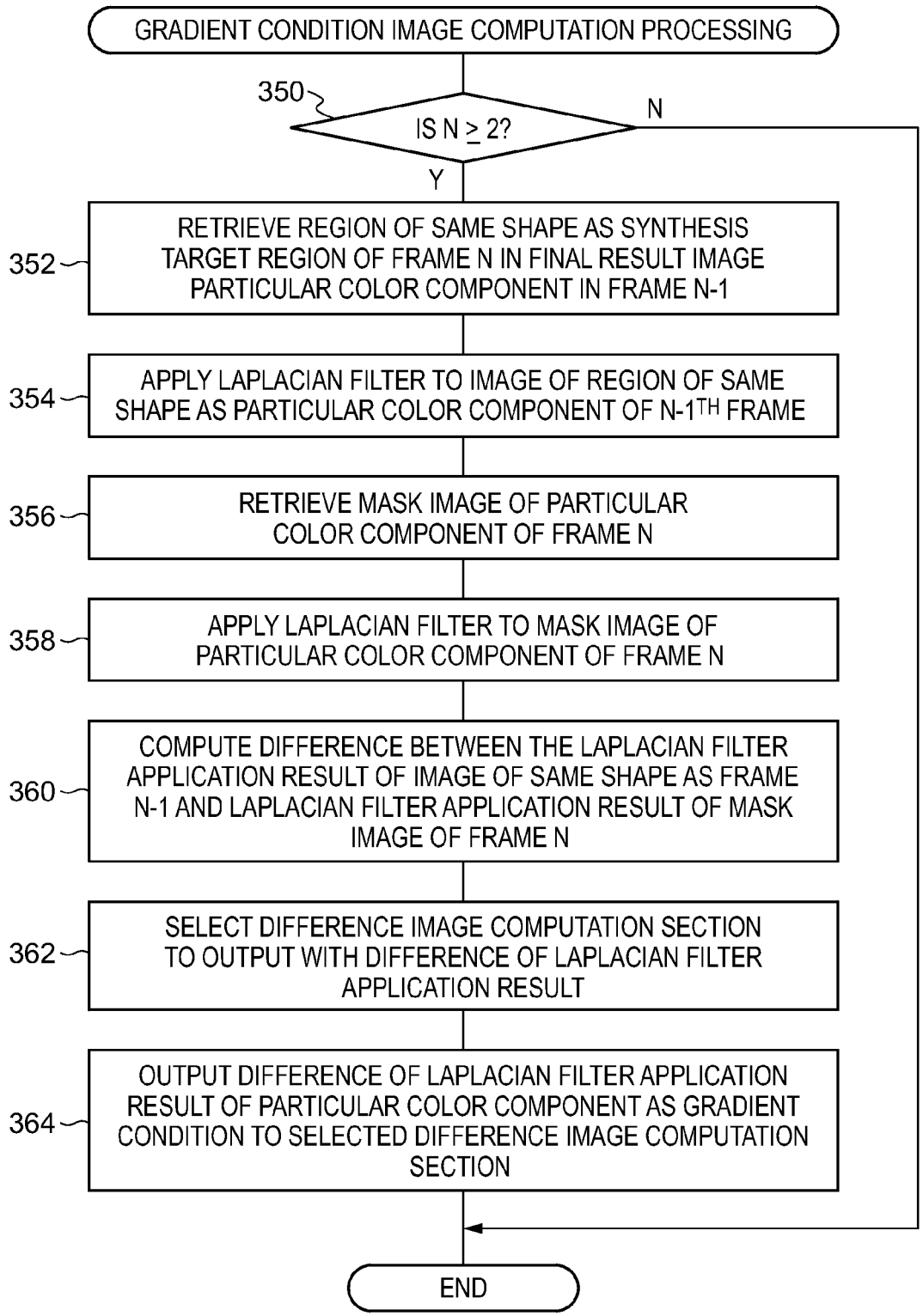
FIG. 26 is a flow chart illustrating an example of gradient condition image computation processing according to the fifth exemplary embodiment.

Explanation next follows regarding gradient condition image computation processing executed by the gradient condition image computation section 302 according to the fifth exemplary embodiment, with reference to FIG. 26.

At step 350 of the gradient condition image computation processing, the gradient condition image computation section 302 determines whether or not the value of the variable N is 2 or more. Since the value of the variable N is 1 at the start, negative determination is made at step 350 and the gradient condition image computation processing is ended. In such cases, under instruction from the boundary difference computation section 34, a synthesized result image of a particular color component corresponding to the $N(=1)^{th}$ frame image is generated based on the mask image of the particular color component.

Affirmative determination is made at step 350 when the value of the variable N is 2 or greater, and processing proceeds to step 352. At step 352, the gradient condition image computation section 302 retrieves data of a region of the same shape as the synthesis target region of the $N^{th}$ frame from the final result image of the particular color component of the $N-1^{th}$ frame held in the previous-frame final result image holding section 304. Data is accordingly retrieved of a region appended with the reference numeral "322" in FIG. 30, irrespective of the relationship to the shape of the synthesis target region in the $N-1^{th}$ frame. In the next step 354, the gradient condition image computation section 302 applies a Laplacian filter to the image of the region retrieved at step 352, and computes Laplacian filter application values (second order differential values). The image appended with the reference numeral "326" illustrated in FIG. 30 is thus generated (Laplacian filter application values $LF_{N-1}$).

At step 356, the gradient condition image computation section 302 retrieves the data of the mask image of the particular color component corresponding to the $N^{th}$ frame input from the color component separation section 20. FIG. 30 illustrates the mask image of data retrieved at step 356 appended with the reference numeral "328". Moreover, in the next step 358, the gradient condition image computation section 302 applies a Laplacian filter to the mask image of the particular color component corresponding to the $N^{th}$ frame, and computes the Laplacian filter application image (second order differential values). The image illustrated appended with the reference numeral "330" in FIG. 30 (Laplacian filter application result $LS_N$) is generated thereby.

Next, at step 360, the gradient condition image computation section 302 computes the difference between the Laplacian filter application result $LS_N$ of the image of the particular color component corresponding to the $N^{th}$ frame and the Laplacian filter application values $LF_{N-1}$ of the image of the particular color component corresponding to the $N-1^{th}$ frame. The difference $LSd_N$ of the Laplacian filter application results can be computed according to the following Equation (25).

$$LSd_N(x, y) = LS_N(x, y) - LF_{N-1}(x, y) \quad \text{Equation (25)}$$

The difference image illustrated appended with the reference numeral "332" in FIG. 30 (difference $LSd_N$ of the Laplacian filter application results) is obtained by performing computation according to Equation (25).

Next, at step 362, the gradient condition image computation section 302 selects which difference image computation section 40, out of the plural difference image computation sections 40, to which to output the difference $LSd_N$ of the Laplacian filter application results of particular color component. Then, at step 364, the gradient condition image computation section 302 outputs the difference $LSd_N$ of the Laplacian filter application result of the particular color component to the difference image computation section 40 selected at step 362, and the gradient condition image computation processing is ended.

Figure 27:
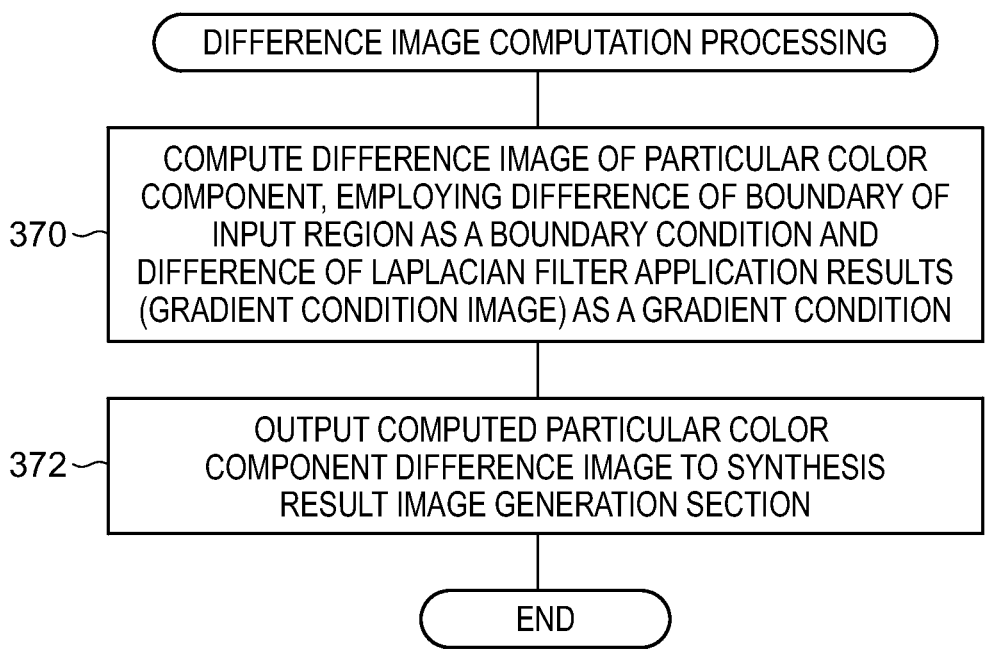
FIG. 27 is a flow chart illustrating an example of difference image computation processing according to the fifth exemplary embodiment.

In each of the image synthesis sections 22B, 24B, 26B of the image processing apparatus 300, the difference image computation processing illustrated in FIG. 27 is executed by the difference image computation section 40 each time the boundary difference $\gamma D_N(x, y)$ of the particular color component of the $N^{th}$ frame and the difference $LSd_N$ of the Laplacian filter application results are input. At step 370, the difference image computation section 40 computes the difference image $D_N(x, y)$ of the particular color component, employing the input boundary difference $\gamma D_N(x, y)$ as a boundary condition (a condition of preserving the pixel values of the boundary difference), and with the $LSd_N$ of the Laplacian filter application result as a gradient condition. This computation may be computed by solving a Poisson equation with the boundary difference $\gamma D_N(x, y)$ as a boundary condition and the difference $LSd_N(x, y)$ of the Laplacian filter application values of the mask image as gradient data (a gradient condition). The computation formula is similar to that of Equation (21). The difference image (difference image $D_N(x, y)$) illustrated appended with the reference numeral "334" is obtained by this computation.

Next, in step 372, the difference image computation section 40 outputs the computed difference image $D_N(x, y)$ of the particular color component to the synthesis result image generation section 46, and the difference image computation processing is ended.

Figure 28:
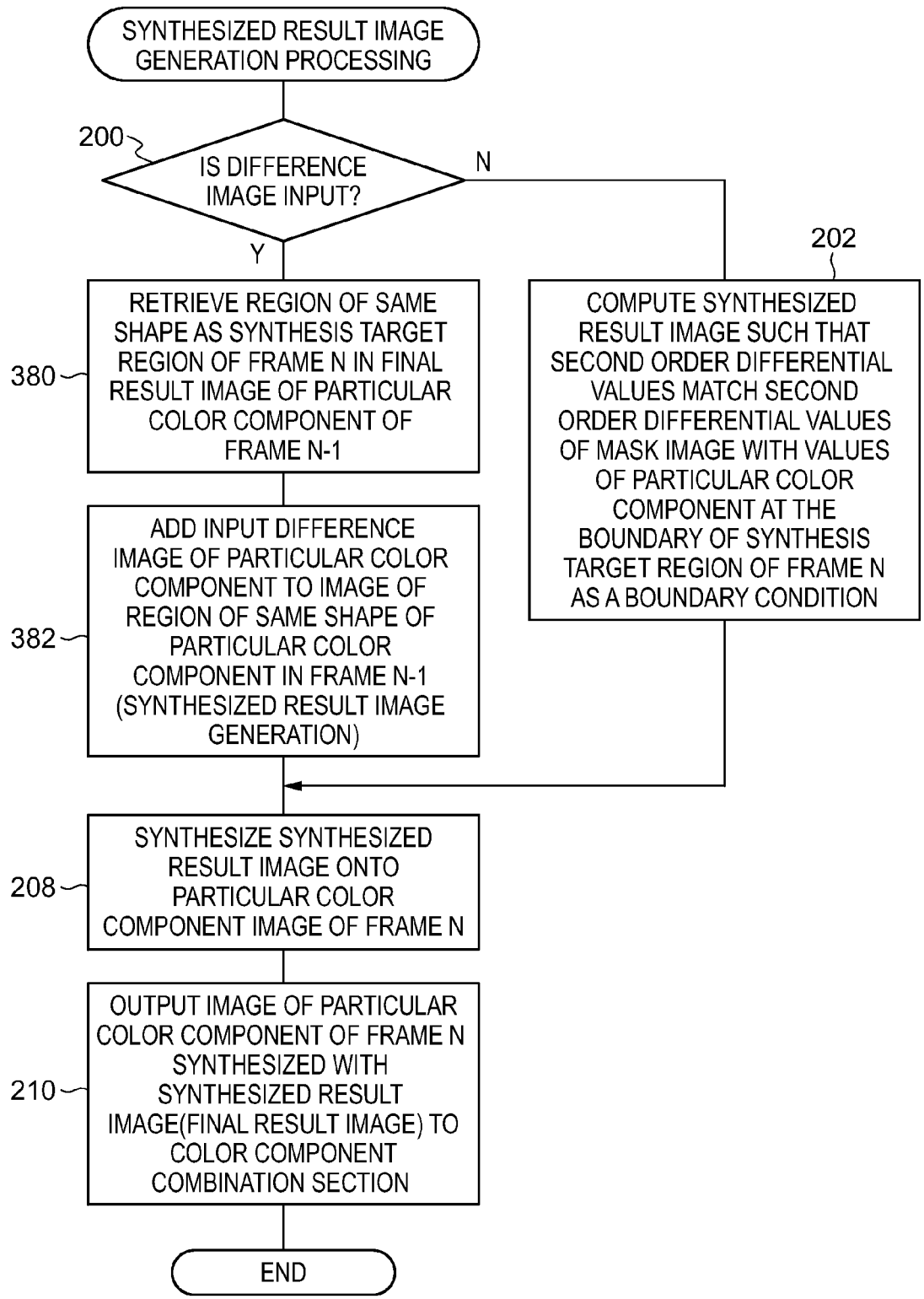
FIG. 28 is a flow chart illustrating synthesized result image generation processing according to the fifth exemplary embodiment.

In each of the image synthesis sections 22B, 24B, 26B of the image processing apparatus 300, the synthesized result image generation processing illustrated in FIG. 28 is performed by the synthesis result image generation section 46. Explanation follows regarding the synthesized result image generation processing illustrated in FIG. 28, focusing mainly on portions that differ from the synthesized result image generation processing explained in the first exemplary embodiment (FIG. 6).

In the synthesized result image generation processing according to the fifth exemplary embodiment, processing proceeds to step 380 when affirmative determination is made at step 200. In step 380, the synthesis result image generation section 46 retrieves data $F_{N-1}$ of a region that has the same shape as the synthesis target region of the $N^{th}$ frame from the final result image of the particular color component of the $N-1^{th}$ frame held in the previous-frame final result image holding section 304.

At step 382, the synthesis result image generation section 46 adds the difference image $D_N(x, y)$ of the image of the $N^{th}$ frame input from the switching section 42 to the image of the region of the same shape as the synthesis target region of the $N^{th}$ frame retrieved from the final result image of the $N-1^{th}$ frame. This addition is similar to the computation of Equation (22), and a synthesized result image $F_N$ (the image appended with the reference numeral "336" in FIG. 30) of the particular color component corresponding to the $N^{th}$ frame image is generated by this computation.

Note that processing from the next step 208 onwards is similar to the synthesized result image generation processing explained in the first exemplary embodiment (FIG. 6) and further explanation thereof is omitted.

In the fifth exemplary embodiment, the shape of the synthesis target region of the $N^{th}$ frame is detected, and the region $F_{N-1}$ of the same shape as the synthesis target region of the $N^{th}$ frame is retrieved from the final result image of the $N-1^{th}$ frame. The region $F_{N-1}$ with the same shape as the synthesis target region of the $N^{th}$ frame is retrieved from the final result image of the $N-1^{th}$ frame, and the boundary difference $\gamma D_N(x, y)$ and the difference $LSd_N$ of the Laplacian filter application results, and the difference image $D_N(x, y)$, are computed. Accordingly, the shape of the difference image $D_N(x, y)$ for replacing the image of the synthesis target region is changed according to changes in the shape of the synthesis target region in respective frames of the video image. Consequently, as illustrated in FIG. 29, a natural video image is obtained that accommodates changes to the shape of the synthesis target region in respective frames of the video image.

Moreover, similarly to in the third exemplary embodiment, since the difference image $D_N$ is an image whereby the closer it is to 0, the smaller becomes the difference $\gamma D_N$ of the boundary pixels between frames and the smaller becomes the difference between mask images, computation is quickly converged by computing with 0 as the initial values. Consequently, in the fifth exemplary embodiment, similarly to in the third exemplary embodiment, computation of the difference image D is completed by the difference image computation section 40 within a short period of time.

Sixth Exemplary Embodiment

Explanation follows regarding a sixth exemplary embodiment of technology disclosed herein. Note that the sixth exemplary embodiment is configured similarly to the fifth exemplary embodiment, and so similar portions are appended with the same reference numerals and further explanation omitted. Explanation follows regarding operation of the sixth exemplary embodiment.

Figure 31:
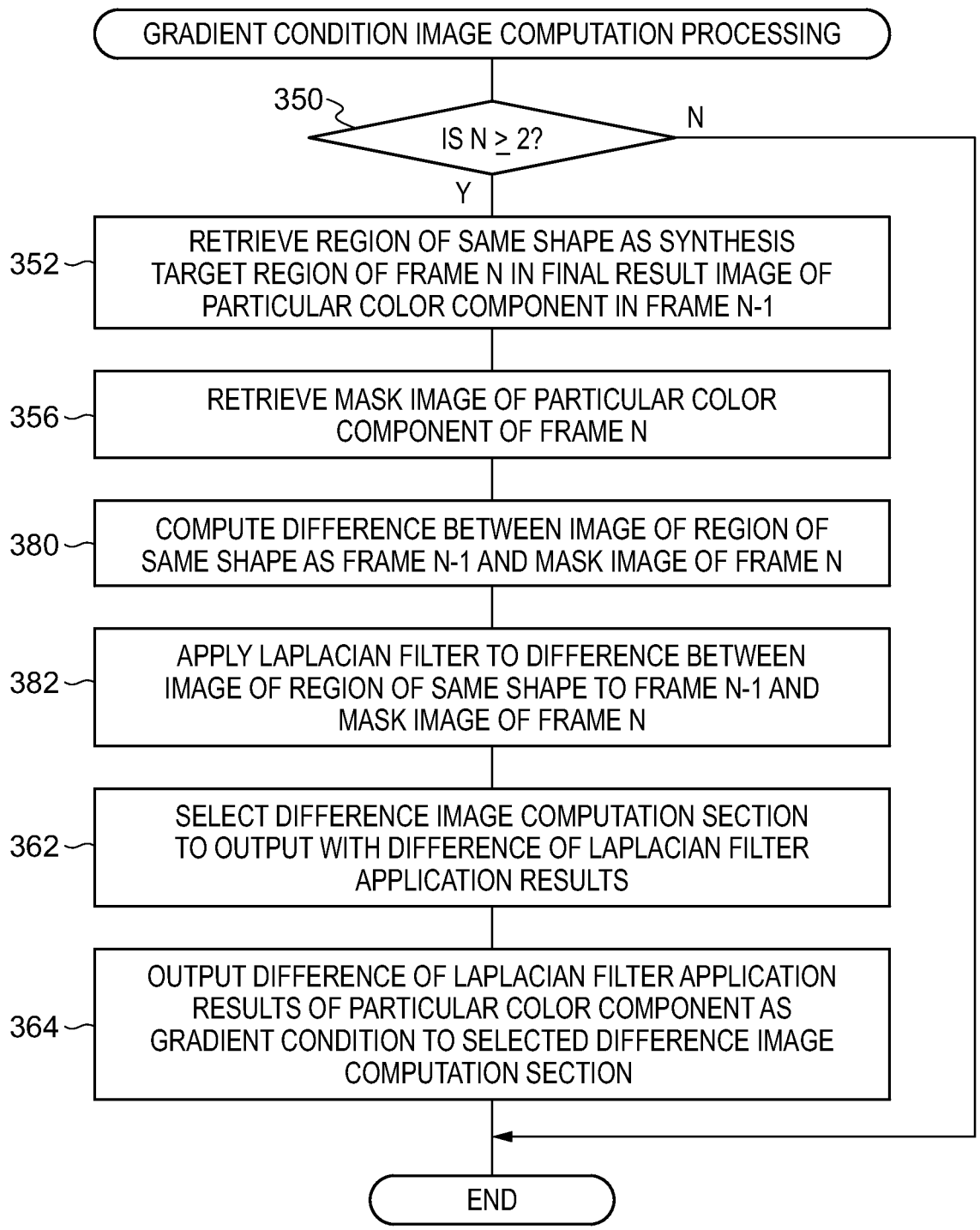
FIG. 31 is a flow chart illustrating an example of gradient condition image computation processing according to a sixth exemplary embodiment.

In the sixth exemplary embodiment, the gradient condition image computation processing illustrated in FIG. 31 is performed in place of the gradient condition image computation processing explained in the fifth exemplary embodiment (FIG. 26). At step 350 of the gradient condition image computation processing according to the second exemplary embodiment, the gradient condition image computation section 302 determines whether or not the variable N is 2 or greater. Since the value of the variable N is initially 1, negative determination is made at step 350, and the mask image difference computation processing is ended.

Figure 32:
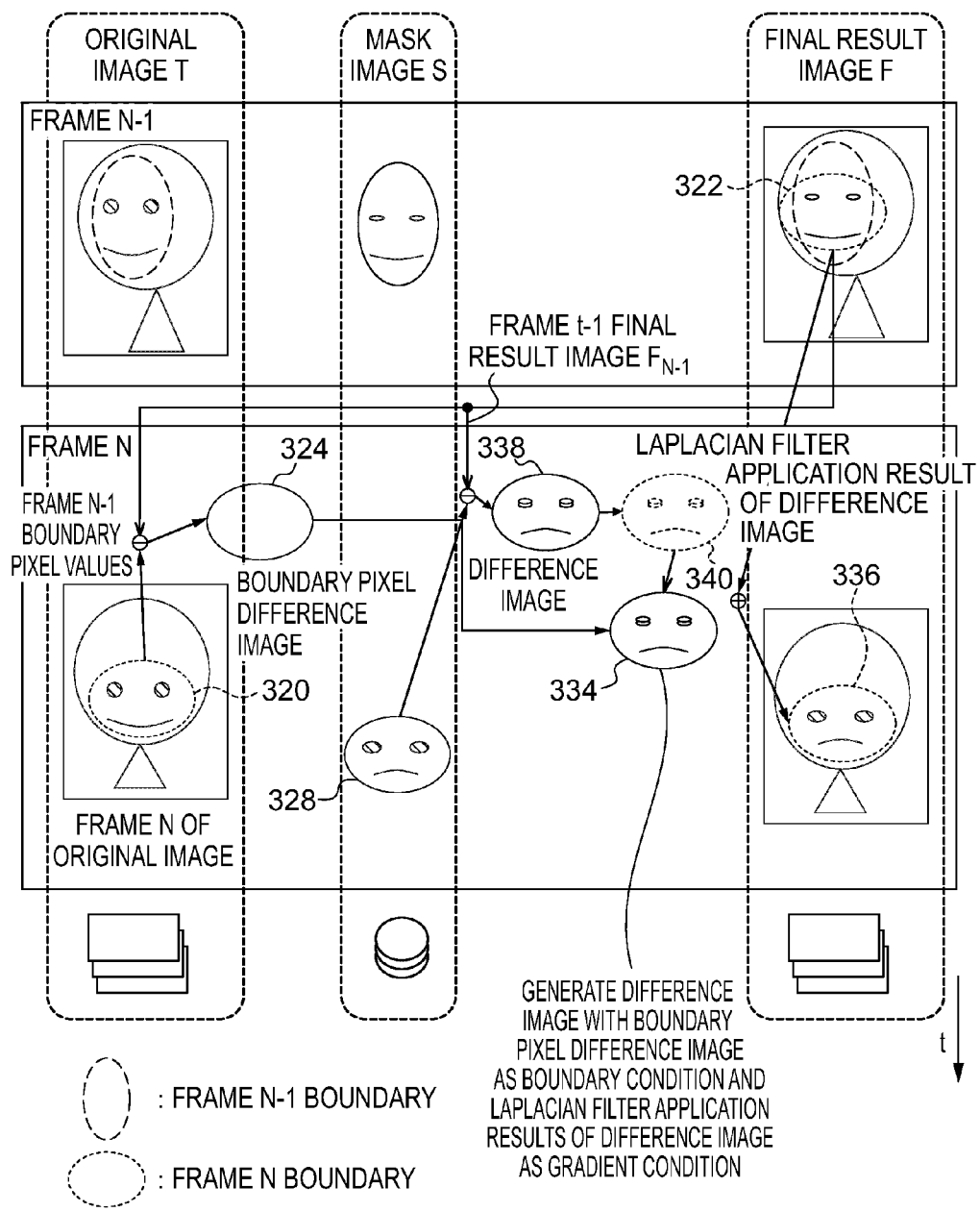
FIG. 32 is a schematic diagram to explain the generation of a synthesized result image of the sixth exemplary embodiment.

Affirmative determination is made at step 350 when the value of the variable N is 2 or greater, and processing proceeds to step 352. At step 352, the gradient condition image computation section 302 retrieves data of a region of the same shape as the synthesis target region of the $N^{th}$ frame from the final result image of the particular color component of the $N-1^{th}$ frame held in the previous-frame final result image holding section 304. Data is accordingly retrieved of a region appended with the reference numeral "322" in FIG. 32. In the next step 356, the gradient condition image computation section 302 retrieves the data of the mask image of the particular color component corresponding to the $N^{th}$ frame input from the color component separation section 20. FIG. 32 illustrates the mask image of data retrieved at step 356 appended with the reference numeral "328".

At the next step 380, the gradient condition image computation section 302 computes the difference between the image of the region of the same shape as the synthesis target region of the $N^{th}$ frame retrieved from the final result image of the particular color component of the $N-1^{th}$ frame, and the mask image corresponding to the $N^{th}$ frame. A difference image is accordingly obtained, illustrated appended with the reference numeral "338" in FIG. 32. At step 382, the gradient condition image computation section 302 applies a Laplacian filter to the difference image obtained by the computation at step 380, and computes the Laplacian filter application image (second order differential values) $LSd_N$ (see the following Equation (26)).

$$LSd_N(x, y)=L(S_N(x, y)-F_{N-1}(x, y)) \qquad \text{Equation (26)}$$

The image (Laplacian filter application result) appended with the reference numeral "340" in FIG. 32 is thus generated.

The processing from the next step 362 onwards is similar to that of the gradient condition image computation processing explained in the fifth exemplary embodiment, and further explanation thereof is omitted.

In the fifth exemplary embodiment, after the respective Laplacian filter application values have been computed for the image of the region that is the same shape as the synthesis target region of the $N^{th}$ frame and is retrieved from the final result image of the $N-1^{th}$ frame for the mask image corresponding to the $N^{th}$ frame, the difference is computed therebetween. In contrast thereto, as illustrated in FIG. 32, in the sixth exemplary embodiment, the difference image is computed between the image of the region that is of the same shape as the synthesis target region of the Nth frame and is retrieved from the final result image of the $N-1^{th}$ frame, and the mask image of the particular color component corresponding to $N^{th}$ frame. The Laplacian filter application values are then computed for the computed difference image. The number of times of Laplacian filter application value computation is thus comparatively fewer than in the configuration explained in the fifth exemplary embodiment, enabling the computational load to be reduced.

Note that in the fifth and the sixth exemplary embodiments, it is presupposed that there is a change in the boundary shape of the synthesis target region between two successive frames in the video image. However, in contrast thereto, in cases in which there is no change to the boundary shape of the synthesis target regions between two successive frames in the video image, configuration may be adopted such that a boundary difference between the synthesis target region of the original image $T_{N-1}$ of the $N-1^{th}$ frame and the synthesis target region of the original image $T_N$ of the $N^{th}$ frame is computed as a boundary difference $\gamma$ $D_N$ (x, y).

Similarly, a difference between the Laplacian filter application results $LS_{N-1}$ of the mask image of the $N-1^{th}$ frame and the Laplacian filter application results $LS_N$ of the mask image of the $N^{th}$ frame may be computed as a difference image $D_N$ (x, y). In such cases, computation of Equation (11) may be performed in place of Equation (24), and computation of Equation (20) may be performed in place of Equation (25).

When there is no change in the boundary shape of the synthesis target region between two successive frames in the video image, a difference of the Laplacian filter application results of the mask images of two successive frames may be computed and held in advance, so as to be read out as needed. Such cases enable the computational load to be further reduced.

Furthermore, explanation has been giving regarding cases in which a mask image, employed to protect the privacy of a person captured as a subject in a video image, is, for example, an image representing the face of another person than the person captured as a subject in the video image, or an image representing an average face of plural people. However, the technology disclosed herein is not limited to privacy protection applications, and may be applied, for example in video images for video phones, in "best shot synthesis" to synthesize images of a person with a favorable expression onto images lacking such an expression. In best shot synthesis, instruction is given to automatically or manually cut out a "best shot" of a given person as a mask image (video image), and a given location of a given frame is automatically or manually instructed for synthesis. Synthesis is accordingly performed of the cut-out mask image at the given location of the given frame.

Moreover, although explanation has been given above of cases in which a color video image is applied as the video image subject to processing, there is no limitation thereto, and application may be made to a monochrome video image as the video image to be subjected to processing.

Moreover, although the values of four pixels, respectively positioned above and below and to the left and right of the computation subject pixel, are employed in Equations (1), (4), (14) and (19) to compute the Laplacian filter application values, computation may be performed employing values of more pixels (for example, 8 peripheral pixels). Moreover, another filter may be employed in place of a Laplacian filter to obtain values corresponding to second order differentials.

Moreover, although explanation has been given above of cases in which a face region corresponding to the face of a person is applied as the synthesis target region, there is no limitation thereto and a region other than a face region may be employed therefor. For example, in order to protect privacy, identification of an individual may be effectively blocked by using an eye region in a face region as the synthesis target region, and synthesizing a mask image representing an eye region of a different person onto the synthesis target region, and, therefore, such a method is favorably employed. When an eye region is employed as the synthesis target region, an image representing an eye region of a person other than the person captured as a subject in the video image, or an image representing an average eye region of plural people, may be set as the mask image.

Moreover, cases have been explained above in which the technology disclosed herein is applied to synthesize a mask image set to protect privacy onto a synthesis target region corresponding to a person present in each frame of a video image; however, there is no limitation thereto. For example, it is possible to employ the technology disclosed herein to synthesize a general image other than a mask image, the synthesis target region is also not limited to a region corresponding to a person present in each frame of a video image, and the synthesis image is also not limited to a mask image set to protect privacy. The synthesis image is also not limited to a still image, and a video image may be applied as the synthesis image.

Moreover, explanation has been given above of cases in which, as an example of the image processing program according to the technology disclosed herein, a mask synthesizing program is pre-stored (installed) at the storage section 66; however, there is no limitation thereto. For example, the image processing program according to the technology disclosed herein may be provided in a format stored on a recording medium such as a CD-ROM or DVD-ROM.

All cited documents, patent applications and technical standards mentioned in the present specification are incorporated by reference in the present specification to the same extent as if the individual cited documents, patent applications and technical standards were specifically and individually incorporated by reference in the present specification.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing method, comprising:
   (a) computing difference values between a boundary equivalent to an outer edge of a synthesis target region corresponding to an $N^{th}$ frame of a video image, and a boundary equivalent to an outer edge of a synthesis target region corresponding to an $N-1^{th}$ frame of the video image, the $N-1^{th}$ frame being a frame immediately before the $N^{th}$ frame;
   (b) generating a difference image such that, whilst pixel values at a boundary of the difference image maintain the computed difference values, a region surrounded by the boundary of the difference image matches a specific gradient condition; and
   (c) deriving, by a processor, as a synthesized result image for the $N^{th}$ frame, the $N^{th}$ frame being a frame immediately after the $N-1^{th}$ frame, an image that is the generated difference image added to a synthesized result image derived for the $N-1^{th}$ frame that is equivalent to a result of synthesizing a synthesis image at the synthesis target region in the $N-1^{th}$ frame, and substituting the synthesized result image derived for the $N^{th}$ frame for an image of the synthesis target region in the $N^{th}$ frame,
   wherein:
   as the difference values, difference values are computed between the boundary equivalent to the outer edge of the synthesis target region present in the Nth frame of the video image and the boundary equivalent to the outer edge of the synthesis target region present in the N-1th frame of the video image; or
   as the difference values, difference values are computed between a first boundary equivalent to an outer edge of a synthesis target region present in the Nth frame of a video image and a second boundary that has the same shape as the first boundary and is present in a final result image in which a synthesized result image corresponding to a result of synthesizing a synthesis image at a synthesis target region present in the N-1 th frame of the video image has been substituted for an image of the synthesis target region in the N-1 th frame of the video image.

2. The image processing method of claim 1, wherein:
   in (b), the difference image is generated such that, while the pixel values of a boundary of the difference image maintain the computed difference values, inside the boundary of the difference image, second order differential values of the region surrounded by the boundary of the difference image are made to approach 0 as the specific gradient condition.

3. The image processing method of claim 2, wherein parallel processing is performed for cycles of (a)+(b)+(c), with a number of parallel processing streams substantially equal to a number of frames of the video image input during a total processing time for (a)+(b) +(c).

4. The image processing method of claim 2, wherein:
   the synthesized result image is derived, and an error image is derived from a difference between a second order differential image of the synthesized result image for the $N^{th}$ frame derived by substitution for the image of the synthesis target region, and a second order differential image of the synthesis image; and
   in (b), when the error image has been derived from the synthesized result image for the $N^{th}$ frame, a difference image is generated such that the second order differential values of the region surrounded by the boundary match the error image as a difference image corresponding to the $N+1^{th}$ frame.

5. The image processing method of claim 1, wherein:
   a difference between second order differential values of a synthesis image for synthesizing at the $N^{th}$ frame of a video image, and second order differential values of the synthesis image for synthesizing at the $N-1^{th}$ frame of the video image, are derived as a gradient condition image; and
   in (b), matching is performed such that, whilst pixel values of the boundary maintain the computed difference values, the region surrounded by the boundary is matched to the gradient condition image as the specific gradient condition.

6. The image processing method of claim 5, wherein a difference is derived between the synthesis image for synthesizing at the $N^{th}$ frame of the video image and the synthesis image for synthesizing at the $N-1^{th}$ frame of the video image, and second order differential values of the derived difference are derived as the gradient condition image.

7. The image processing method of claim 5, wherein:
   the gradient condition image is derived in advance and held; and
   the gradient condition image is read and employed to derive the synthesized result image.

8. The image processing method of claim 1, wherein:
   as a gradient condition image, a difference is derived between second order differential values of a synthesis image for synthesizing at an $N^{th}$ frame of a video image and second order differential values of an image surrounded by the second boundary in the final result image of the $N-1^{th}$ frame of the video image;
   (b) is performed such that, whilst pixel values of the boundary maintain the computed difference values, the inside of the boundary is matched to the gradient condition image as the specific gradient condition; and an image of the generated difference image added to an image surrounded by the second boundary in the final result image for the N-1$^{th}$ frame is derived as the synthesized result image for the N$^{th}$ frame, and the derived synthesized result image for the N$^{th}$ frame is then substituted for an image of the synthesis target region in the N$^{th}$ frame.

9. The image processing method of claim 8, wherein a difference is derived between a synthesis image for synthesizing at an N$^{th}$ frame of a video image, and an image surrounded by the second boundary in the final result image for the N-1$^{th}$ frame of the video image, and second order differential values of the derived difference are derived as the gradient condition image.

10. The image processing method of claim 1, wherein:
(a) and (b) are performed from a 2$^{nd}$ frame of the video image onwards; and
in (c), for a 1$^{st}$ frame of the video image, the synthesized result image is generated such that, whilst pixel values of a boundary maintain pixel values of a boundary of a synthesis target region present in the first frame of the video image, second order differential values of a region surrounded by the boundary match the second order differential values of the synthesis image.

11. The image processing method of claim 1, wherein:
the video image includes respective color images for each of the frames;
(a) the difference values are computed for each color component;
(b) the difference image is generated for each color component;
generation of the image synthesized result image generates the synthesized result image for each color component; and
the generated synthesized result images for each color component are substituted for a respective image of the synthesis target region in images of each color component of the N$^{th}$ frame.

12. The image processing method of claim 1, wherein the synthesis target region is a region corresponding to a face of a person or a portion of a face.

13. A non-transitory computer-readable recording medium having stored therein a computer program for causing a computer to execute a process, the process comprising:
(a) computing difference values between a boundary equivalent to an outer edge of a synthesis target region corresponding to an N$^{th}$ frame of a video image, and a boundary equivalent to an outer edge of a synthesis target region corresponding to an N-1$^{th}$ frame of the video image, the N-1$^{th}$ frame being a frame immediately before the N$^{th}$ frame;
(b) generating a difference image such that, whilst pixel values at a boundary of the difference image maintain the computed difference values, a region surrounded by the boundary of the difference image matches a specific gradient condition;
(c) deriving, as a synthesized result image for the N$^{th}$ frame, the N$^{th}$ frame being a frame immediately after the N-1$^{th}$ frame, an image that is the generated difference image added to the synthesized result image derived for the N-1$^{th}$ frame that is equivalent to a result of synthesizing a synthesis image at the synthesis target region in the N-1$^{th}$ frame, and substituting the synthesized result image derived for the N$^{th}$ frame for an image of the synthesis target region in the N$^{th}$ frame, wherein:

as the difference values, difference values are computed between the boundary equivalent to the outer edge of the synthesis target region present in the Nth frame of the video image and the boundary equivalent to the outer edge of the synthesis target region present in the N-1th frame of the video image; or as the difference values, difference values are computed between a first boundary equivalent to an outer edge of a synthesis tartlet region present in the Nth frame of a video image and a second boundary that has the same shape as the first boundary and is present in a final result image in which a synthesized result image corresponding to a result of synthesizing a synthesis image at a synthesis target region present in the N-1th frame of the video image has been substituted for an imaqe of the synthesis target region in the N-1th frame of the video image.

14. The non-transitory computer-readable recording medium of claim 13, wherein:
as a gradient condition image, a difference is derived between second order differential values of a synthesis image for synthesizing at an N$^{th}$ frame of a video image and second order differential values of an image surrounded by the second boundary in the final result image of the N-1$^{th}$ frame of the video image;
(b) is performed such that, whilst pixel values of a boundary maintain the computed difference values, the inside of the boundary is matched to the gradient condition image as the specific gradient condition; and
an image of the generated difference image added to an image surrounded by the second boundary in the final result image for the N-1$^{th}$ frame is derived as the synthesized result image for the N$^{th}$ frame, and the derived synthesized result image for the N$^{th}$ frame is then substituted for an image of the synthesis target region in the N$^{th}$ frame.

15. The non-transitory computer-readable recording medium of claim 14, wherein a difference is derived between a synthesis image for synthesizing at an N$^{th}$ frame of a video image and an image surrounded by the second boundary in the final result image for the N-1$^{th}$ frame of the video image, and second order differential values of the derived difference are derived as the gradient condition image.

16. An image processing apparatus, comprising:
at least one processor; and
memory storing instructions, which when executed by the at least one processor perform a procedure, the procedure including:
(a) computing difference values between a boundary equivalent to an outer edge of a synthesis target region corresponding to an N$^{th}$ frame of a video image, and a boundary equivalent to an outer edge of a synthesis target region corresponding to an N-1$^{th}$ frame of the video image, the N-1$^{th}$ frame being a frame immediately before the N$^{th}$ frame;
(b) generating a difference image such that, whilst pixel values at a boundary of the difference image maintain the computed difference values, a region surrounded by the boundary of the difference image matches a specific gradient condition;
(c) deriving, as a synthesized result image for the N$^{th}$ frame, the N$^{th}$ frame being a frame immediately after the N-1$^{th}$ frame, an image that is the generated difference image added to a synthesized result image derived for the N−1$^{th}$ frame that is equivalent to a result of synthesizing a synthesis image at the synthesis target region in the N−1$^{th}$ frame, and substituting the synthesized result image derived for the N$^{th}$ frame for an image of the synthesis target region in the N$^{th}$ frame, wherein:

as the difference values, difference values are computed between the boundary equivalent to the outer edge of the synthesis target region present in the Nth frame of the video image and the boundary equivalent to the outer edge of the synthesis target region present in the N−1th frame of the video image; or as the difference values, difference values are computed between a first boundary equivalent to an outer edge of a synthesis target region present in the Nth frame of a video image and a second boundary that has the same shape as the first boundary and is present in a final result image in which a synthesized result image corresponding to a result of synthesizing a synthesis image at a synthesis target region present in the N−1th frame of the video image has been substituted for an image of the synthesis target region in the N−1th frame of the video image.

17. The image processing apparatus of claim 16, wherein:

as a gradient condition image, a difference is derived between second order differential values of a synthesis image for synthesizing at an N$^{th}$ frame of a video image and second order differential values of an image surrounded by the second boundary in the final result image of the N−1$^{th}$ frame of the video image;

(b) is performed such that, whilst pixel values of a boundary maintain the computed difference values, the inside of the boundary is matched to the derived gradient condition image as the specific gradient condition; and an image of the generated difference image added to an image surrounded by the second boundary in the final result image for the N−1$^{th}$ frame is derived as the synthesized result image for the N$^{th}$ frame, and the derived synthesized result image for the N$^{th}$ frame is then substituted for an image of the synthesis target region in the N$^{th}$ frame.

18. The image processing apparatus of claim 17, wherein:

a difference is derived between a synthesis image for synthesizing at an N$^{th}$ frame of a video image, and an image surrounded by the second boundary in the final result image for the N−1$^{th}$ frame of the video image, and second order differential values of the derived difference are derived as the gradient condition image.

* * * * *